United States Patent
Shinomiya et al.

(10) Patent No.: US 7,428,066 B2
(45) Date of Patent: Sep. 23, 2008

(54) PRINTING APPARATUS AND METHOD FOR VERIFYING A PRINTER CONTROLLER

(75) Inventors: Takeshi Shinomiya, Tokyo (JP); Yukihiko Ogata, Saitama (JP); Isamu Ozawa, Kanagawa (JP); Masami Kato, Kanagawa (JP); Akihito Mochizuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 10/114,945

(22) Filed: Apr. 4, 2002

(65) Prior Publication Data
US 2002/0159086 A1  Oct. 31, 2002

(30) Foreign Application Priority Data
Apr. 9, 2001 (JP) ............................ 2001-110529
Jul. 19, 2001 (JP) ............................ 2001-220427
Jul. 19, 2001 (JP) ............................ 2001-220689

(51) Int. Cl.
*G06F 15/00* (2006.01)
(52) U.S. Cl. ................ 358/1.13; 358/1.15; 703/21; 703/24
(58) Field of Classification Search ............... 358/1.13, 358/1.15; 715/527; 703/21, 24
See application file for complete search history.

(56) References Cited

U.S. PATENT DOCUMENTS

| | | | | |
|---|---|---|---|---|
| 5,130,805 | A | 7/1992 | Rikima | 358/296 |
| 5,845,084 | A * | 12/1998 | Cordell et al. | 709/234 |
| 5,951,704 | A * | 9/1999 | Sauer et al. | 714/736 |
| 5,991,783 | A * | 11/1999 | Popa et al. | 715/522 |
| 6,236,462 | B1 * | 5/2001 | Terasaka | 358/1.13 |
| 6,246,485 | B1 * | 6/2001 | Brown et al. | 358/1.13 |
| 6,614,546 | B1 * | 9/2003 | Kurozasa | 358/1.15 |
| 6,614,548 | B1 * | 9/2003 | Kisono | 358/1.15 |
| 6,891,631 | B1 * | 5/2005 | Nakazato | 358/1.13 |

FOREIGN PATENT DOCUMENTS

| | | |
|---|---|---|
| JP | 03-227681 | 10/1991 |
| JP | 4-55935 A2 | 2/1992 |
| JP | 04-316277 | 11/1992 |
| JP | 07-013724 | 1/1995 |
| JP | 2000-255116 | 9/2000 |
| JP | 2001-110529 A | 4/2001 |

OTHER PUBLICATIONS

Takashi, Mikio. Matsushiro, Nobuhito. "Printer Simulator—Virtual Printer" OKI Technical Review. Aug. 1998, pp. 85-88.*

* cited by examiner

*Primary Examiner*—Twyler L. Haskins
*Assistant Examiner*—Mark R Milia
(74) *Attorney, Agent, or Firm*—Fitzpatrick, Cella, Harper & Scinto

(57) ABSTRACT

A printer emulating apparatus obtains a command signal which is outputted from a controller unit via an interface, and emulates a state of an engine unit in accordance with a notification of an elapsed time by a timer for notifying the elapse of a predetermined time and the obtained command signal. A response signal is transmitted via the interface in accordance with the emulated state of the engine unit and the obtained command signal. An image sync signal is generated to the controller unit in accordance with the emulated state of the engine unit.

40 Claims, 46 Drawing Sheets

FIG. 9

| DETAILS SETTING | ☒ |

A4 PORTRAIT

MAIN SCAN START POSITION : 128

THE NUMBER OF VALID PIXELS IN MAIN SCAN : 1440

SUB-SCAN START POSITION : 118

THE NUMBER OF VALID PIXELS IN SUB-SCAN : 2160

NOTE : SET VALUE CONCERNING MAIN SCAN IS AN INTEGER VALUE OF 16

CHANGE    CANCEL

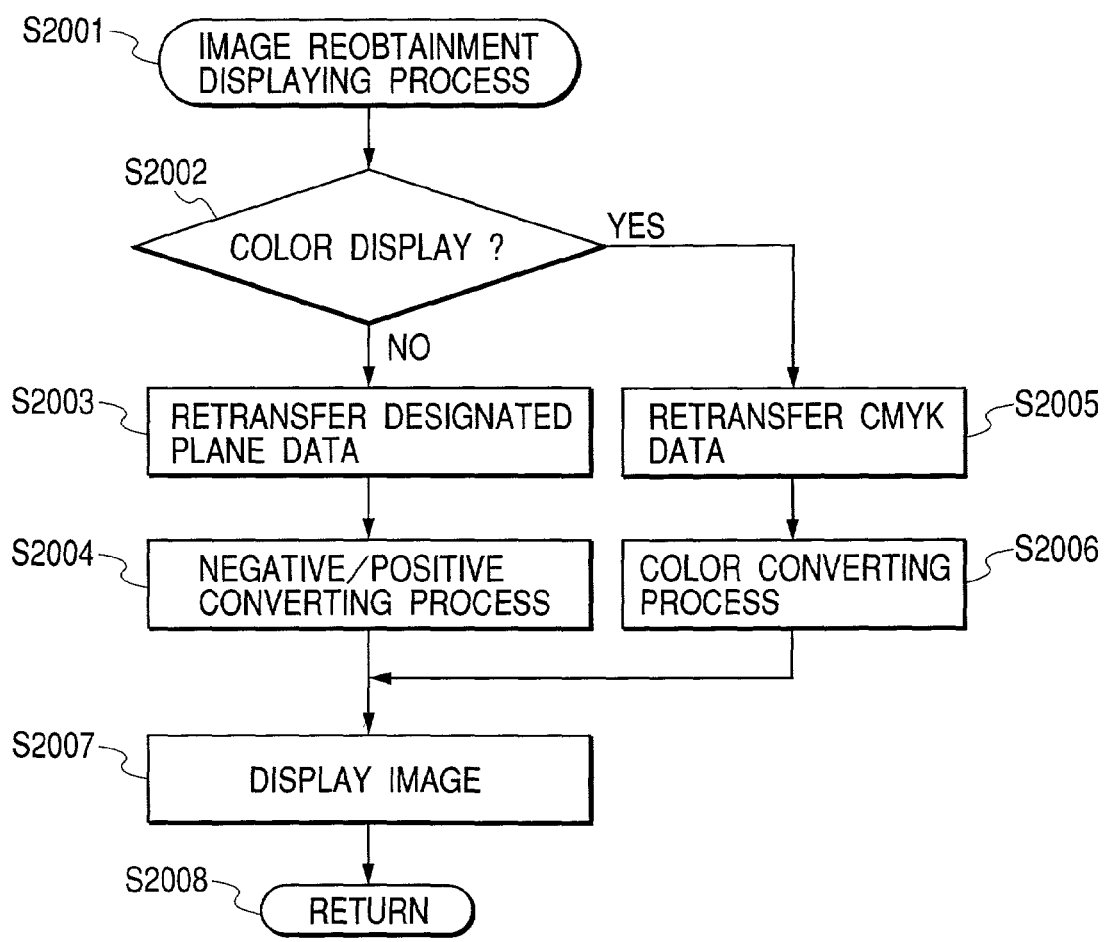

FIG. 34

| DETAILS SETTING | ☒ |

A4 PORTRAIT

MAIN SCAN START POSITION : 0

THE NUMBER OF VALID PIXELS IN MAIN SCAN : 4864

SUB-SCAN START POSITION : 0

THE NUMBER OF VALID PIXELS IN SUB-SCAN : 6849

CHANGE      CANCEL

FIG. 45

DETILS SETTING

A4 PORTRAIT

MAIN SCAN START POSITION : 0

THE NUMBER OF VALID PIXELS IN MAIN SCAN : 4864

SUB-SCAN START POSITION : 0

THE NUMBER OF VALID PIXELS IN SUB-SCAN : 6849

CHANGE  CANCEL

FIG. 49

```
START
  ↓
TRANSFER PSEUDO IMAGE — S4901
  ↓
MEASURE PROCESSING ABILITY — S4902
  ↓
PRESENT PROCESSING LOAD — S4903
  ↓
SET PROCESSING MODE — S4904
  ↓
END
```

FIG. 50

| PROCESSING LOAD PREDICTION | | |
|---|---|---|
| PRINTER PRINTING SPEED: 10PPM<br>PAGE INTERRUPTION TIME: 6.0 SEC. | | |
| DISPLAY IMAGE SIZE | PROCESS CONTENTS | PRESUMED TIME |
| 1/4 TIME | IMAGE TRANSFER<br>INTERPOLATING PROCESS<br>COLOR CONVERSION 1<br>COLOR CONVERSION 2 | 5.5<br>16.0<br>1.6<br>32.0 |
| 1/8 TIME | IMAGE TRANSFER<br>INTERPOLATING PROCESS<br>COLOR CONVERSION 1<br>COLOR CONVERSION 2 | 1.5<br>4.0<br>0.4<br>8.0 |
| 1/16 TIME | IMAGE TRANSFER<br>INTERPOLATING PROCESS<br>COLOR CONVERSION 1<br>COLOR CONVERSION 2 | 0.5<br>1.0<br>0.1<br>2.0 |

5001

PRINTING APPARATUS AND METHOD FOR VERIFYING A PRINTER CONTROLLER

BACKGROUND OF THE INVENTION

1. Field of the Invention

The invention relates to a testing apparatus having a function for supplying image data to an image forming apparatus and, more particularly, to a verifying apparatus for verifying a printer controller.

2. Related Background Art

As shown in FIG. 27, a printer as an image output apparatus is connected to a host computer having a printer driver via a network, USB, an interface, or the like. The printer comprises: a controller unit for converting intermediate output data formed by an apparatus such as a host computer or the like from printing source data into output image data suitable to be outputted; and an engine unit for obtaining the output image data outputted from the controller unit and outputting an image to a media such as paper or the like.

When an image is outputted to a laser beam printer as an example of the printer, intermediate output data suitable for the controller unit of the printer is formed by an apparatus such as a host computer or the like. The intermediate output data is generally formed by software called a printer driver. The intermediate output data is inputted to the controller unit of the printer via a network line such as parallel line, universal serial bus, Ethernet (registered trademark), or the like. The controller unit converts the intermediate output data into output image data suitable for the engine unit and outputs it as a video signal to the engine unit synchronously with an image transfer permission signal from the engine unit. In the engine unit, a video signal inputted by controlling and driving an electrophotographic process is outputted as an image onto a media such as paper or the like. Output timing of the image transfer permission signal from the engine unit is determined by a conveyance state of the paper, a state of the electrophotographic process, or the like.

The controller unit and the engine unit are connected by a communication path called a video interface. The video interface makes communication of a video signal for transferring the output image data, a control signal for controlling timing or the like of the video signal, a command signal for allowing the controller unit to instruct the engine unit, a status signal for allowing the engine unit to inform the controller unit of an engine state, or the like.

The conveyance state of the paper indicates a state of the paper in the engine, such as "during paper feed", "during print", "during paper ejection", or the like. The state of the electrophotographic process indicates an idle state, an initialization state, a state showing "during a post-process", or the like. The engine unit is not always in a printable state but, when the engine unit enters the printable state, it outputs the image transfer permission signal to the controller unit. The controller unit and the engine unit operate in intimate cooperation with each other by using the control signal, command signal, and status signal.

Also in a printer system such as an ink jet printer other than the laser beam printer, a data flow up to the print is similar to that mentioned above. The controller unit of the ink jet printer converts the intermediate output data from the host computer into the output image data suitable for the engine unit and outputs it as a raster signal synchronously with the engine unit. The engine unit controls and drives an ink jet process and forms the inputted raster signal as an image onto the media such as paper or the like.

In the development of the printer constructed by the controller unit and the engine unit as mentioned above, the following two points are particularly important.

1. Whether the printer operates at normal timing and a desired print speed has been accomplished or not.
2. Whether the image has been outputted normally or not.

In a developing step or an operation verifying step of the conventional printer, the intermediate output data is created by the host computer and transmitted to the controller unit, thereby actually making the engine unit operative and obtaining an output image (printed matter). By measuring an output time and directly observing the output image, the operation of the printer is evaluated and verified. Such a process for the creation of the intermediate output data, the measurement of the engine output and the output time, and the evaluation of the output image is repetitively executed.

According to the conventional method of obtaining the output image by actually making the printer operative, the printing operation cannot be executed unless the development has reached a stage where the development of both of the controller unit and the engine unit has progressed enough that both of them operate. It is difficult to reduce the development time and develop them in parallel. There are also problems in that the amount of printed matter which is subjected to the evaluation of an image and the measurement of the print time is very large, and a very long time and a large quantity of consumables such as toner, print paper, and the like are needed.

To solve the above problem, according to Japanese Patent Application Laid-open No. 04-055935, the printer emulating apparatus such that intermediate output data formed by a printer driver on a host computer is received and displayed as an image onto a display system such as a CRT or the like has been proposed. According to that printer emulating apparatus, the intermediate output data from the host computer can be verified without obtaining an output image by actually making the printer operative in the developing step of the printer.

In Japanese Patent Application Laid-open No. 2001-110529, the image processing apparatus such that a video signal which is outputted from a controller unit is received and visualized as an image onto a display system such as a CRT or the like has been proposed. According to such an image processing apparatus, the video signal which is outputted from the controller unit can be visualized and the output image can be verified without using the engine unit by a developing step of a printer.

By using the methods according to the above two proposals, the time which is needed to actually output the image and the consumables such as toner, print paper, and the like can be saved. The output image can be verified without using the engine unit. Distributed and parallel development of the engine unit and the controller unit can be realized.

However, the above two propositions have been made to confirm the intermediate output data and the output image data, and its function has been limited to a function of confirming the image at the printer development stage. Although importance is attached to "the normal timing and the desired print speed are accomplished" as mentioned above in the development of the printer, there is a problem such that the above two propositions are not effective with respect to the timing and the print speed.

The print speed of the printer is also influenced not only by ability of the engine unit for actually outputting the image but also by ability of forming the output image data of the controller unit. That is, even if the engine unit which operates at a high speed is used, the controller unit has to form the output image data at a high-enough speed and output the video signal. On the contrary, even if the controller unit formed the output image data at a high speed, unless the engine unit can operate in response to it, the whole printer cannot operate at a high speed. Since the speed of the whole printer is mutually influenced by the controller unit and the engine unit as mentioned above, it is hard to separate factors of restricting the print speed upon evaluation.

Further, since the speed of the printer is determined by intimate conditions of the engine unit and the controller unit as mentioned above, in the developing step of the controller unit, although detailed state change information of the engine unit upon execution of the print is necessary, since the controller unit is connected to the engine unit, it is difficult to obtain the state change information. Therefore, hitherto, an electrical waveform has been observed by a logic analyzer or the like, thereby presuming the state change of the engine, or a skilled engineer presumes the state change of the engine from an operation sound or the like of the engine by experience.

SUMMARY OF THE INVENTION

It is an object of the invention to provide a printer emulating apparatus and method and a software product, in which verification of a timing process and a processing speed of a controller unit constructing a printer can be made in cooperation with a printer unit even in a situation where the engine unit is not completed.

To accomplish the above object, a printer emulating apparatus obtains a command signal which is outputted from a controller unit via an interface and emulates a state of an engine unit in accordance with a notification of an elapsed time by a timer for notifying the elapse of a predetermined time and the obtained command signal. A response signal is transmitted via the interface in accordance with the emulated state of the engine unit and the obtained command signal. An image sync signal is also formed for the controller unit in accordance with the emulated state of the engine unit.

The above and other objects and features of the present invention will become apparent from the following detailed description and the appended claims with reference to the accompanying drawings.

BRIEF DESCRIPTION OF THE DRAWINGS

FIG. 9 is an explanatory diagram of a details setting window which is displayed on the CRT 25 when a button 803 in FIG. 8 is pressed;

FIG. 20 is a flowchart for an image reobtainment displaying process in step S1902 in FIGS. 19A and 19B;

FIG. 34 is a diagram showing display examples of the image processing apparatus in the second embodiment;

FIG. 45 is a diagram showing display examples of the image processing apparatus in the third embodiment;

FIG. 49 is a flowchart for a deciding process of image process contents in modification 2 of the third embodiment; and FIG. 50 is a diagram showing a display example of the image processing apparatus in modification 2 of the third embodiment.

DETAILED DESCRIPTION OF THE PREFERRED EMBODIMENTS

First Embodiment

A printer emulating apparatus according to an embodiment of the invention will be described hereinbelow with reference to the drawings.

Figure 1:
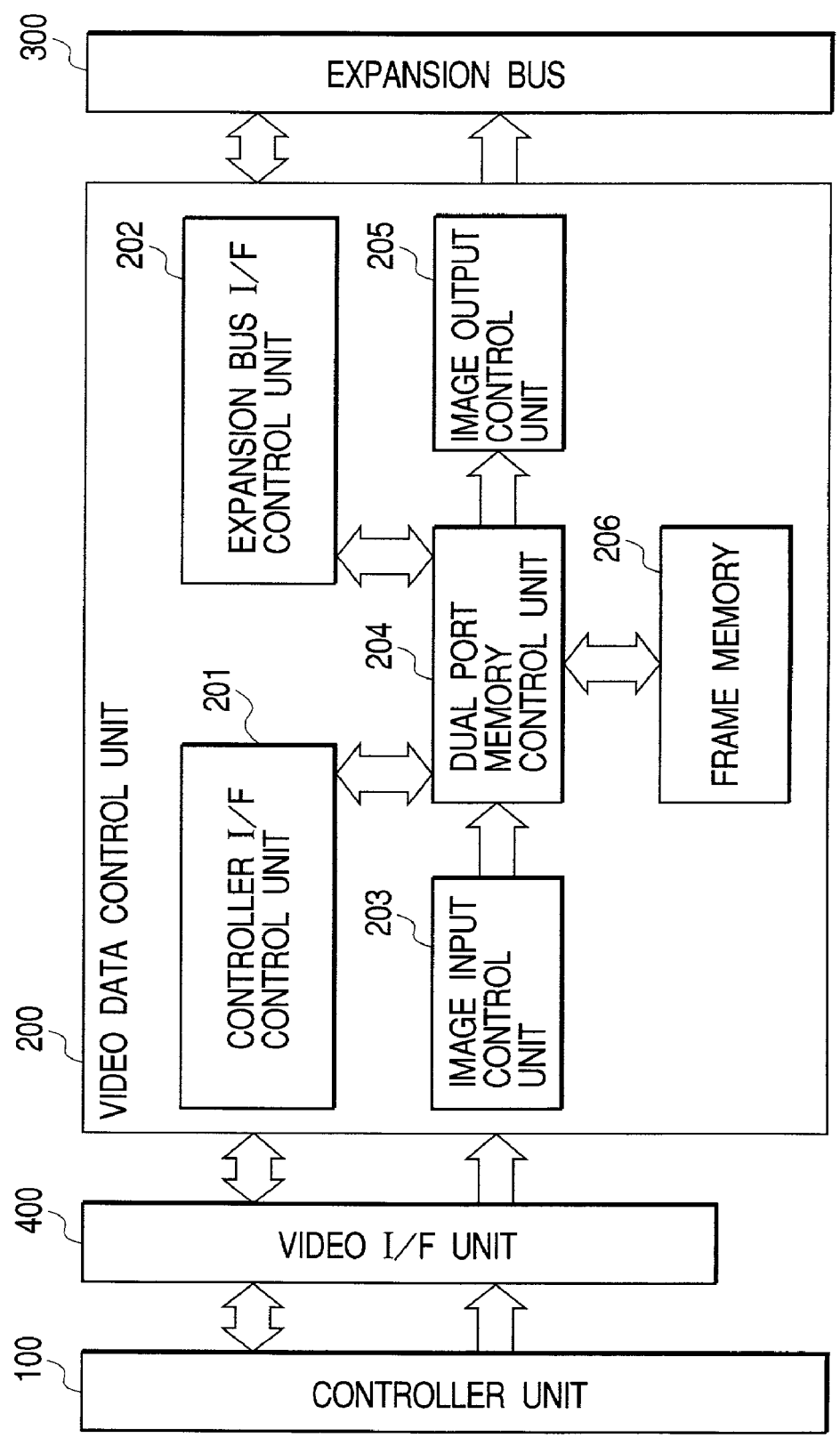
FIG. 1 is a block diagram showing a schematic construction of an image processing apparatus having a printer emulating apparatus according to an embodiment of the invention.

FIG. 1 is a block diagram showing a schematic construction of an image processing apparatus having the printer emulating apparatus according to the first embodiment of the invention.

In FIG. 1, the printer emulating apparatus according to the first embodiment of the invention comprises a video data control unit 200 for forming output image data. The video data control unit 200 is connected to a controller unit 100 via a video interface unit 400 and connected directly to an expansion bus 300 of a personal computer. The controller unit 100, video interface unit 400, video data control unit 200, and expansion bus 300 construct the image processing apparatus.

The video data control unit 200 has: an image input control unit 203, a dual port memory control unit 204, and an image output control unit 205 which are mutually and serially connected; and a controller interface control unit 201, an expansion bus interface control unit 202, and a frame memory 206 which are connected to the dual port memory control unit 204.

The video data control unit 200 as a printer emulating apparatus has a function for accumulating image data which is outputted from the controller unit 100 into the frame memory 206 and, further, transferring the accumulated image data to a processing unit of the personal computer via the expansion bus 300.

The controller interface control unit 201 generates an image transfer permission signal in response to an image transfer request signal from the controller unit 100, so that the controller unit 100 starts the transfer of the image data synchronously with the image transfer permission signal.

The image input control unit 203 transfers the image data which is outputted by the controller unit 100 to the dual port memory control unit 204. Further, the dual port memory control unit 204 writes the image data transferred from the image input control unit 203 into the frame memory 206.

The expansion bus interface control unit 202 notifies a transfer state of the image data via the expansion bus 300, reads out an image held in frame memory 206 in accordance with a transfer request, and transfers it to the image output control unit 205. The image output control unit 205 further outputs the image data to the expansion bus 300.

Figure 2:
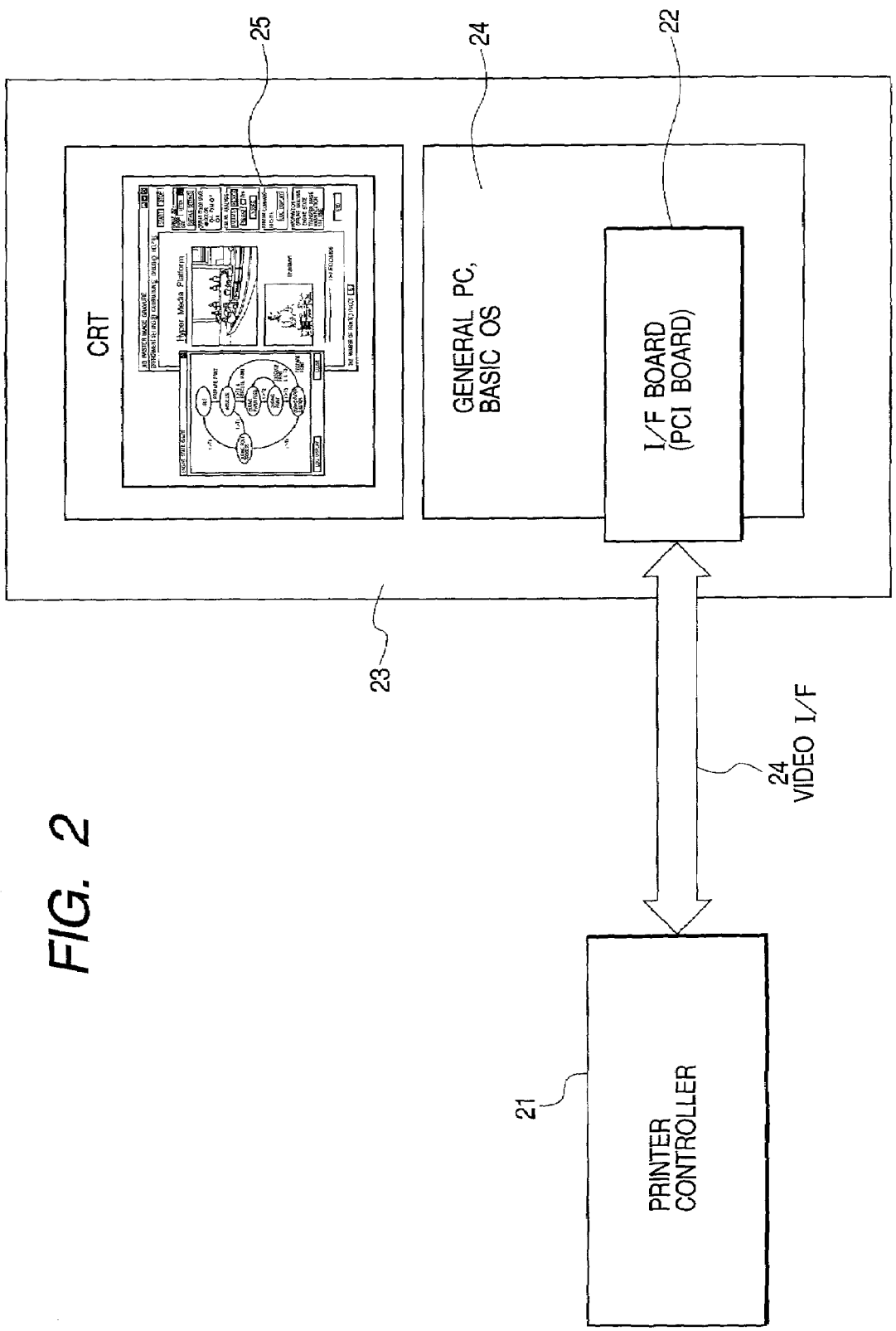
FIG. 2 is an explanatory diagram of a connecting construction of the image processing apparatus of FIG. 1.

FIG. 2 is an explanatory diagram of a connecting construction of the image processing apparatus of FIG. 1.

An image processing apparatus 23 is connected to an output of a printer controller 21 via a cable. The printer controller 21 is connected to a personal computer or the like via a parallel interface, a USB interface, or a network (not shown).

The image processing apparatus 23 comprises: a general computer 24 having an interface unit (PCI board) 22; and a CRT 25.

An output of the printer controller 21 is inherently connected to an engine controller of the printer. For example, in case of the printer of an electrophotographic system, the engine controller drives a laser driver, transfers raster image data formed by the controller onto the surface of a photosensitive drum as an electrostatic latent image, allows toner to be magnetically adhered to the latent image, and develops it onto recording paper.

In a case of performing verification of the printer controller 21 by using the printer emulating apparatus, a video interface is connected to the interface unit 22 of the image processing apparatus 23. The interface unit 22 generates sync signals (horizontal sync signal and vertical sync signal) in accordance with an output command or the like of the printer controller 21, and holds the raster image data outputted from the printer controller 21 into a memory on the interface unit 22. The held image data is reconstructed by software which operates on the general computer 24 and displayed onto the CRT 25. As mentioned above, the image processing apparatus 23 is connected in place of a printer engine and used for development or the like of hardware/software of the controller.

Figure 3:
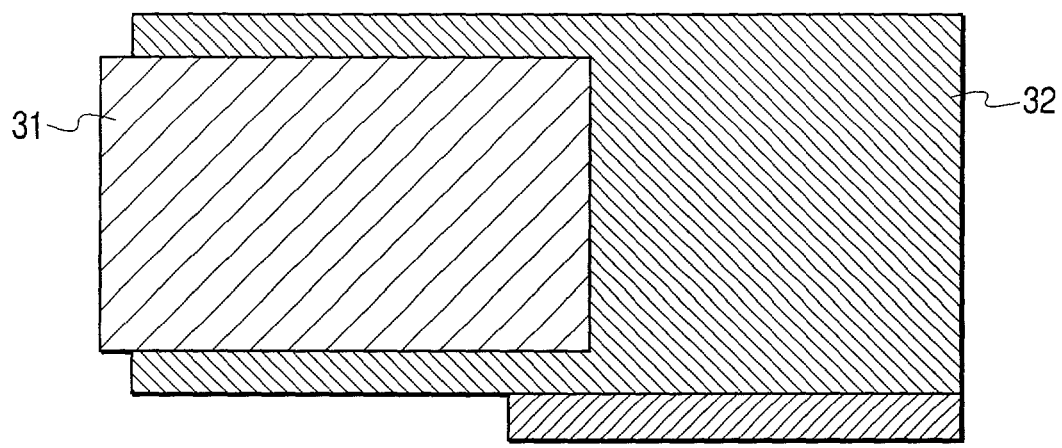
FIG. 3 is an explanatory diagram of an interface unit 22 in FIG. 2.

FIG. 3 is an explanatory diagram of the interface unit 22 in FIG. 2.

The interface unit 22 comprises a video interface unit 31 and a video data control unit 32. The video data control unit 32 comprises a video interface logic, a memory controller, a memory, a PCI interface, and the like. The video data control unit 32 executes an accumulation control of the data, the generation of the sync signals (horizontal sync signal and vertical sync signal), a process of a printer command, and the like via the video interface unit 31. The video data control unit 32 is attached as an expansion board of the PCI interface to an expansion slot of the general computer 24. The video interface unit 31 is a unit which is coupled with the video data control unit 32 and has an exchangeable structure. Since the interface unit 22 can be attached to a general expansion slot, a computer serving as a system control unit can be exchanged in accordance with a necessary processing speed. By using the construction such that the video interface unit 31 can be exchanged, the printer emulating apparatus can be made to be easily adapted to the development of an image output apparatus of another different interface. Thus, the hardware can cope with it by merely changing the video interface unit 31.

Figure 4:
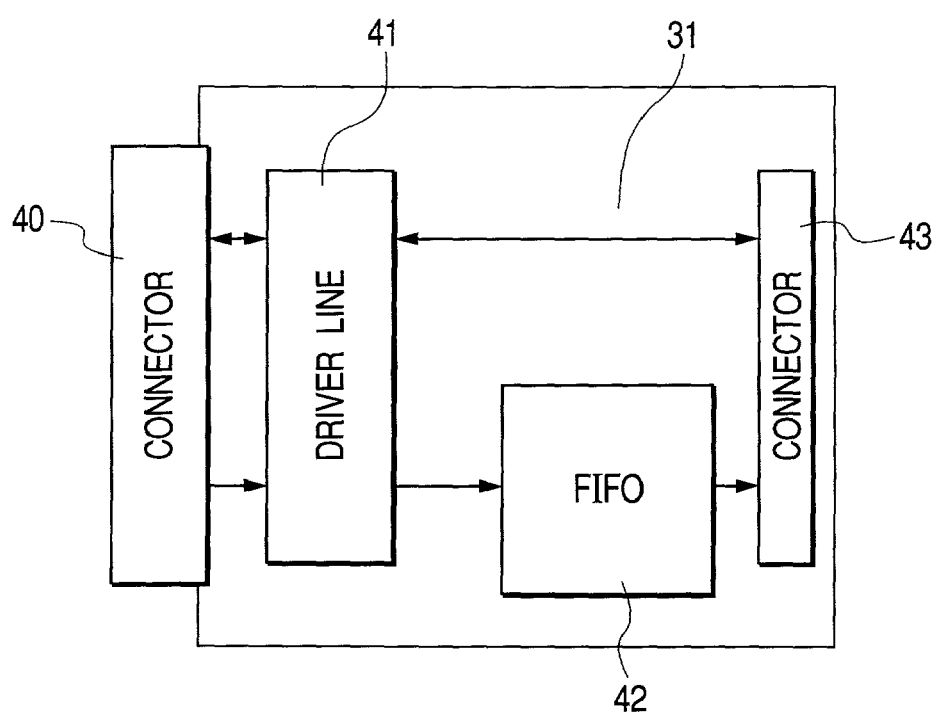
FIG. 4 is a block diagram showing an internal construction of a video interface unit 31 in FIG. 3.

FIG. 4 is a block diagram showing an internal construction of the video interface unit 31 in FIG. 3.

The video interface unit 31 comprises: a connector 40; a line driver 41 connected to the connector 40; and a connector 43 connected to the line driver 41 directly or via an FIFO 42. The line driver 41 comprises a signal interface driver/receiver device of a balanced type for connecting a high speed video signal via a cable. The FIFO 42 holds the image data in accordance with a video sync clock.

The connector 40 is connected to the controller unit 100 via a dedicated video cable. Various sync signals, CMYK image data synchronized with the sync signals, a serial command signal for interfacing with a printer engine, a status signal, various control signals, and the like are inputted to the controller unit 100. The connector 43 serves as a physical interface with the video data control unit 32. The video data control unit 32 (generating means) generates the sync signals (horizontal sync signal and vertical sync signal) in accordance with a print command or the like which is sent from the controller unit 100 and extracts the image data which is sent from the printer controller 21 in accordance with the sync signals from the FIFO 42.

Figure 5:
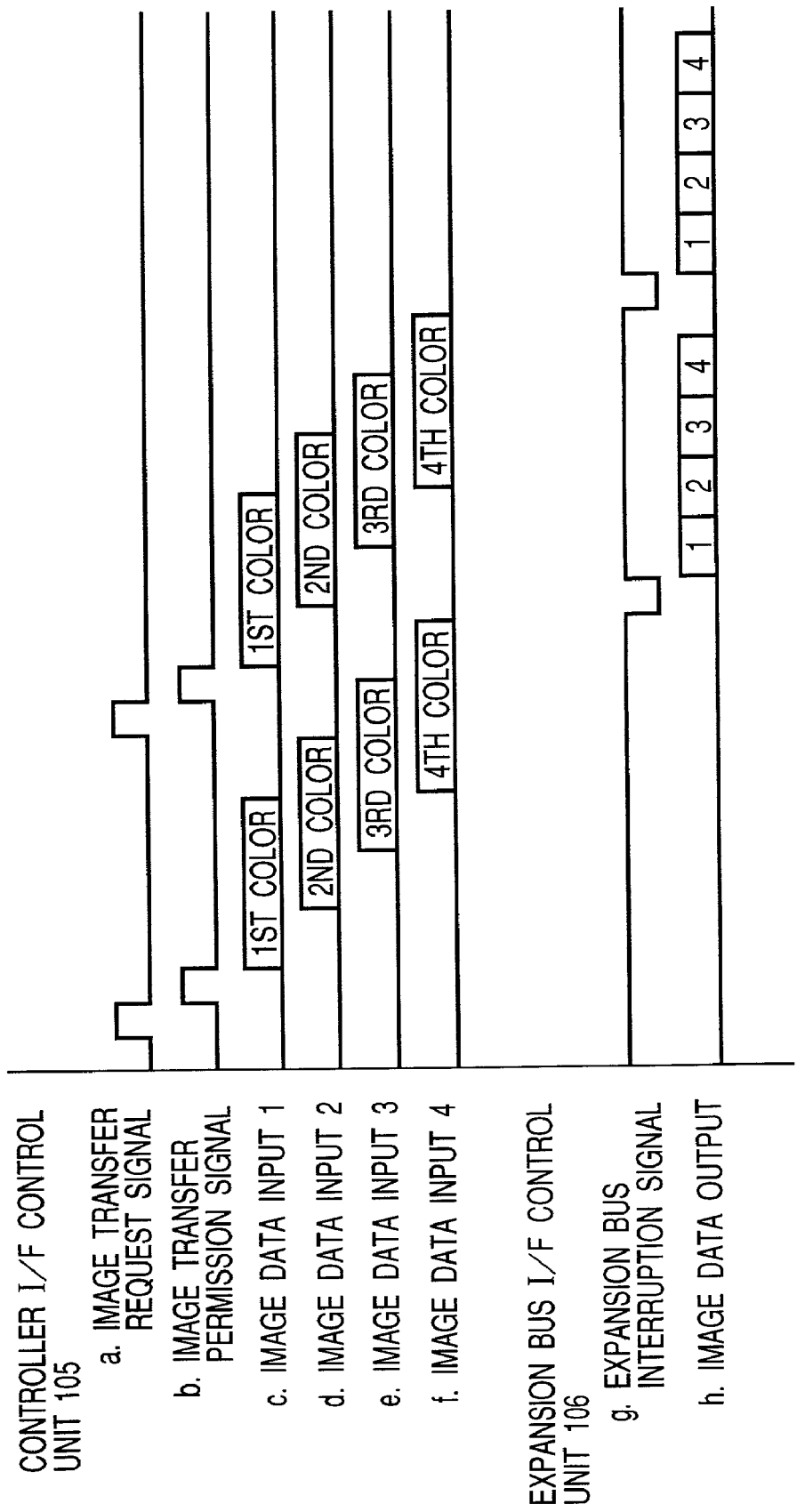
FIG. 5 is a timing chart showing the operation of the printer emulating apparatus in FIG. 1.

FIG. 5 is a timing chart showing the operation of the printer emulating apparatus in FIG. 1.

The printer emulating apparatus in FIG. 1 sequentially performs an image transferring process to the image data of four colors in parallel. To execute this process smoothly, the frame memory of the printer emulating apparatus has a capacity of two pages. By continuously outputting the data of two pages and starting the image data transfer of the second page before completion of the data transfer of the first page by using a deviation of image data transfer timing of each color, the page interval is reduced. The whole processing time can be remarkably reduced.

In FIG. 5, when an image transfer request signal a is generated from the controller unit 100, the controller interface control unit 201 returns an image transfer permission signal b in response to the signal a. The controller unit 100 to which the image transfer permission signal b has been returned transfers image data c to f in accordance with predetermined timings.

The image input control unit 203 stores the transferred image data c to f into the frame memory 206 via the dual port memory control unit 204. At a point when the transfer of the image data input 4 of the first page is finished, the expansion bus interface control unit 202 generates an expansion bus interruption signal g and notifies the system side of the completion of the data storage of the first page.

On the system side, the image data stored in the video data control unit 200 is obtained on the basis of the interruption signal which passed through the expansion bus 300.

As a method of transferring the data from the video data control unit to the system side, any method which can execute such a data transfer on the basis of the expansion bus interface can be used. For example, it is possible to use a method whereby the frame memory 206 is mapped into a memory space on the expansion bus and the data is read out by an ordinary memory read access, or a method whereby the printer emulating apparatus side is allowed to have a master transfer function which can operate on the expansion bus and transfer the data into a memory which has previously been designated.

By the above series of operations, the image data of the first page is transferred from the controller unit 100 to the expansion bus 300 via the video data control unit 200, and the data of the second page is also transferred by substantially the same procedure as that of the data transfer of the first page.

As shown in FIG. 5, the image processing apparatus of FIG. 1 executes, in parallel, the transfer of the image data of the second page from the controller unit 100 to the video data control unit 200 and the transfer of the image data of the first page from the video data control unit 200 to the expansion bus 300.

Since the video data control unit 200 has a memory capacity of two pages and has means for controlling the reading and writing operations in parallel in order to execute the data output of the first page and the data input of the second page in parallel, the page interval can be shortened, and the throughput of the process can be improved.

The software (general computer 24 serving as a host) which is executed by the printer emulating apparatus according to the embodiment of the invention will now be described.

Figure 6:
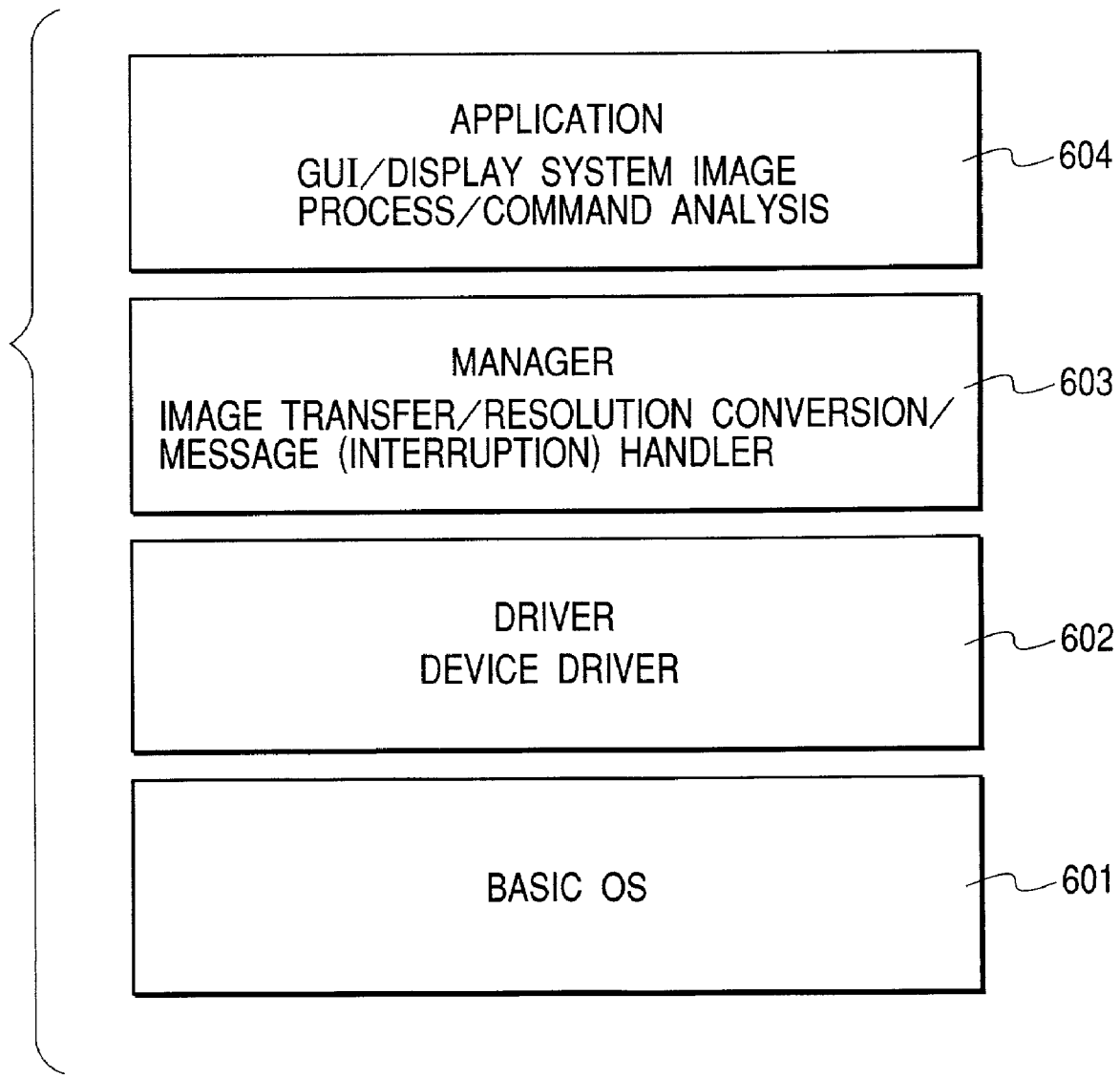
FIG. 6 is a diagram showing a construction of software on a general computer 24 in FIG. 2.

FIG. 6 is a diagram showing a construction of the software on the general computer 24 in FIG. 2.

The general computer 24 has an operating system (basic OS) 601, a driver 602, a manager 603, and an application 604.

In the embodiment, Windows™ 2000 of Microsoft Corporation in U.S.A. is used as a basic OS. The operating system 601 manages resources such as memory of the personal computer, interruption, hard disk, and the like. The driver 602 has a device driver as software for providing the fundamental operation to the interface unit 22 as hardware which is necessary in the embodiment. The fundamental operation denotes a process such as access to a register on the interface unit 22, access to a buffer memory, interrupting process from the interface unit 22, or the like. The manager 603 is middleware for providing the more advanced operation to the interface unit 22. The advanced operation denotes a function such that the image data stored in a buffer on the interface unit 22 is obtained in a DIB format (device independent bit map format), or the like. When it is obtained, a reduction, an enlargement, a dither correction, and the like can be simultaneously executed. The manager 603 uses a device driver therein. The application 604 is software serving as a user interface for the operator of the present apparatus. The operator can issue an instruction of activation, stop, analysis, or the like to the apparatus via the application 604. The application 604 uses middleware therein.

Figure 7:
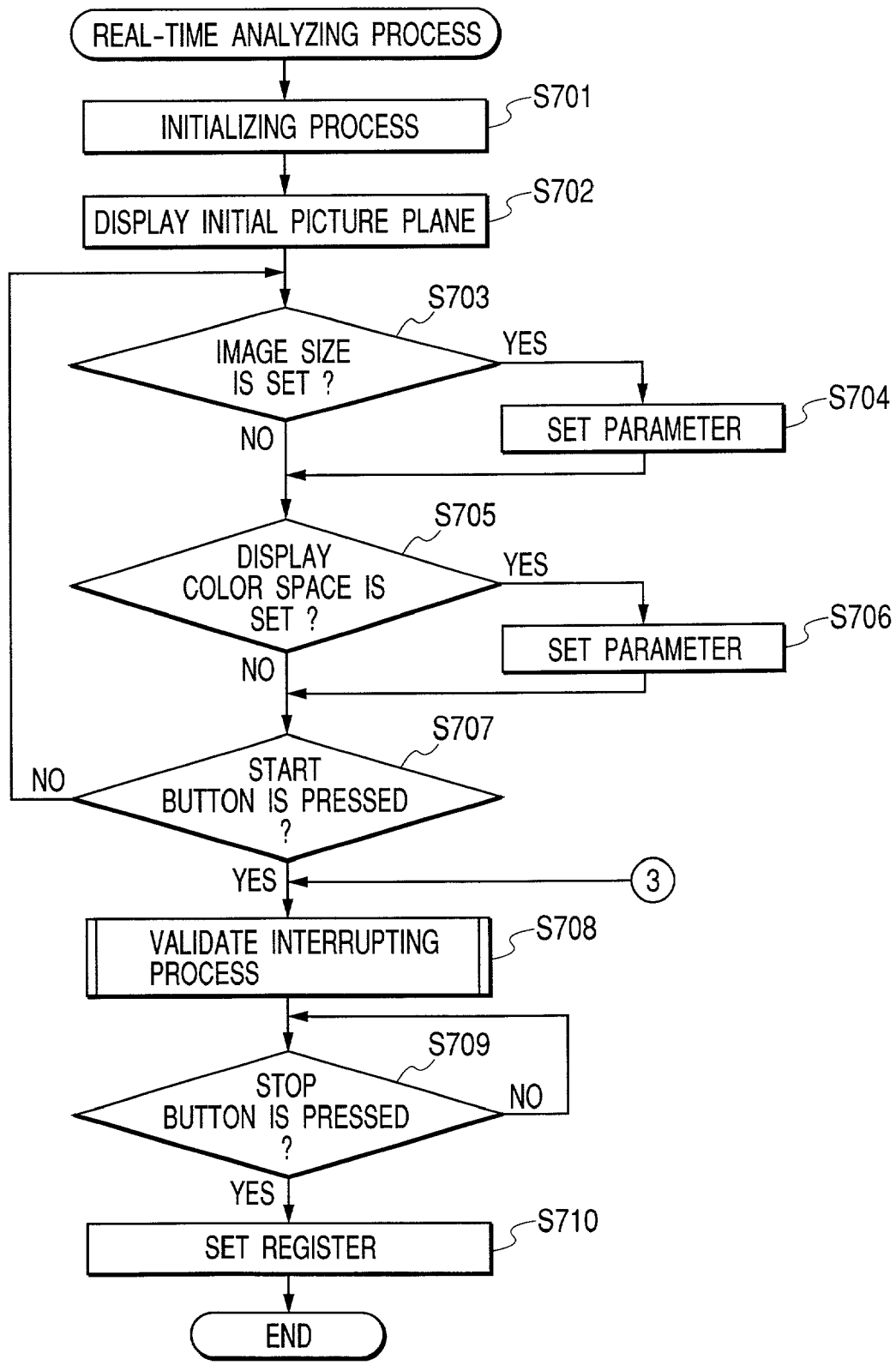
FIG. 7 is a flowchart for a real-time analyzing process which is executed by the printer emulating apparatus in FIG. 1.

FIG. 7 is a flowchart for a real-time analyzing process which is executed by the printer emulating apparatus in FIG. 1.

All software shown by this flowchart is software which operates on the general computer 24. This software provides a GUI to the user and controls the interface unit 22.

In FIG. 7, when this software is activated, an initializing process is executed (step S701). This initializing process executes not only initialization of variables or the like regarding the software but also an initializing process of hardware such as setting or the like of a register regarding the video data control unit 200.

In subsequent step S702, an initial picture plane of FIG. 8, which will be explained hereinlater, is displayed by the CRT 25.

Figure 8:
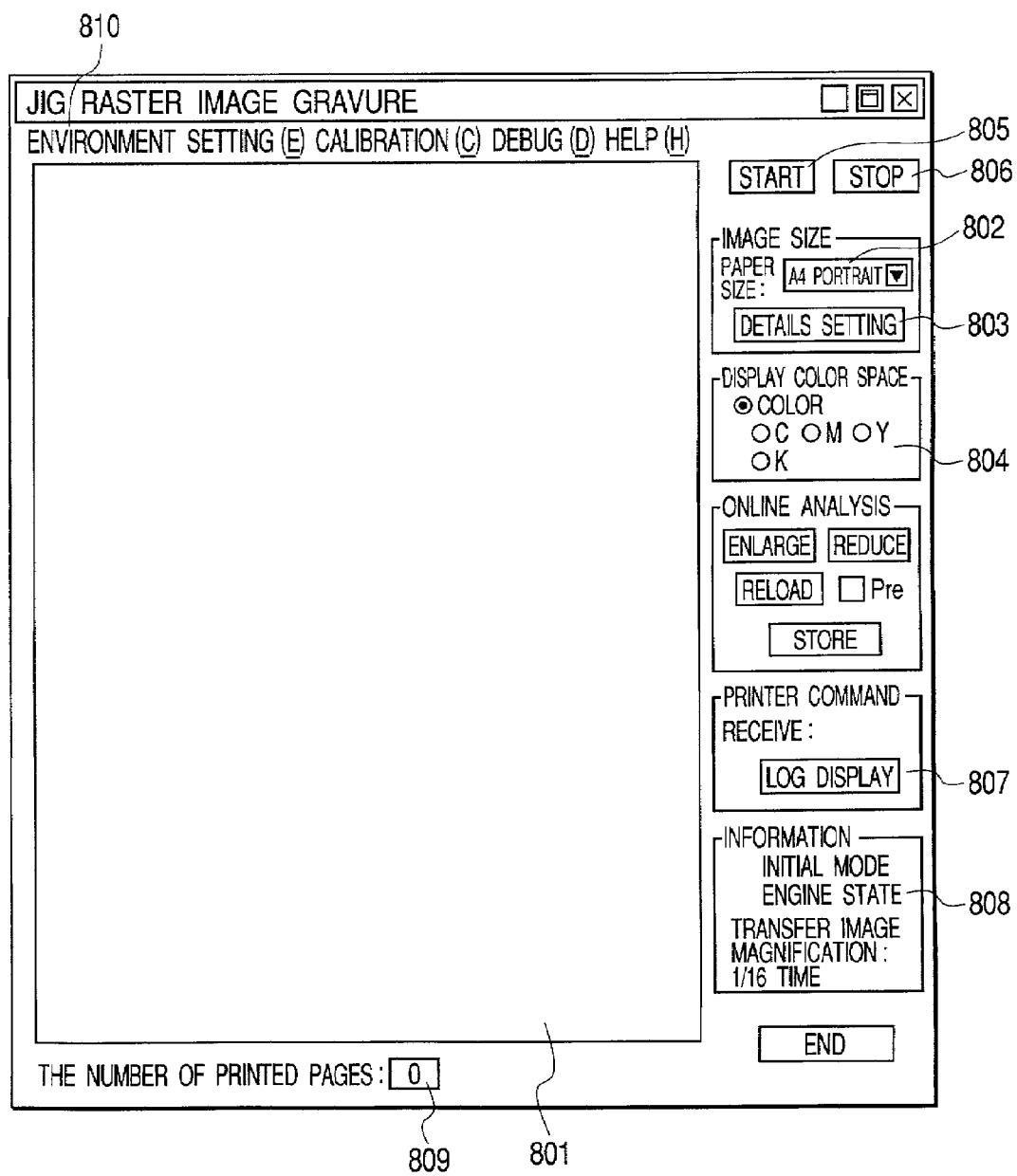
FIG. 8 is an explanatory diagram of an initial picture plane on a CRT 25 which is displayed in step S702 in FIG. 7.

FIG. 8 is an explanatory diagram of the initial picture plane on the CRT 25 which is displayed in step S702 in FIG. 7.

In FIG. 8, reference numeral 801 denotes an image display area. The image data which is formed by the printer controller 21 is displayed in the area 801. First, the user designates a size and a color space of image data to be displayed. Reference numeral 802 denotes a combo box area for designating a paper size. The number of pixels in the main scan, a start position of the main scan, the number of lines in the sub-scan, and a start position of the sub-scan corresponding to the preset paper size are set in the area 802. Reference numeral 803 denotes a button for displaying a user interface for setting details. By pressing the button 803, an operator causes a details setting window shown in FIG. 9 to be displayed. Preset parameters can be changed here.

Returning to FIG. 7, when a change in image size is instructed (YES in step S703), parameters are set so as to display the designated image data (step S704). After that, step S705 follows. The video data control unit 200 holds only the image data of a valid area into the image memory in accordance with the set parameters.

When a change in display color space is instructed (YES in step S705), parameters are set so as to display the designated image data (step S706). After that, step S707 follows. As a display color space, one of five kinds of display color spaces of a color, a C plane, an M plane, a Y plane, and a K plane can be selected (radio button 804). Since the image data which is outputted by the printer controller 21 usually corresponds to a CMYK color space, if the color is selected here, CMYK image data accumulated in the image memory is extracted, color-converted into RGB data, and subsequently displayed in the display area. In case of displaying the C/M/Y/K plane, only necessary color plane data is extracted from the image memory and displayed. After completion of the setting of the image size and the display color space as mentioned above, the actual image fetching operation can be started. Since default values have been set into those parameters, there is no need to reset them if it is not necessary.

In step S707, whether the depression of a start button 805 has been detected or not is discriminated. If it is not detected, the processes in step S703 and subsequent steps are repeated. If it has been detected, the start of the image data obtaining operation is set into the control unit via software of a manager layer by application software. Simultaneously with the setting of a process start register of the video data control unit 200, interrupting processes in FIGS. 10, 14, and 15, which will be explained hereinlater, to the present software are validated (step S708).

The interrupting processes are executed to notify the software of the following items:

1. Completion of accumulation of the image data of one page by the video data control unit 200.
2. Reception of the command signal which is outputted by the controller unit 100.
3. Reception of the control signal such as image request signal, image transfer permission signal, or the like.

Those processes are called a page-end interrupting process, a command reception interrupting process, and a control signal reception interrupting process hereinbelow. Those processes correspond to the process in FIG. 10, the process in FIG. 14, and the process in FIG. 15, respectively. As interrupting processes, besides a hardware interruption from the interface unit 22, there is also a software interrupting process for executing the interrupting process after the elapse of a predetermined time. The software interrupting process is called a timer interruption and corresponds to the process in FIG. 28. When the interruption is validated, the present software keeps waiting for the interrupting process until a stop button 806 is pressed (YES in step S709). After that, the register is set (step S710) and the processing routine is finished.

Figure 10:
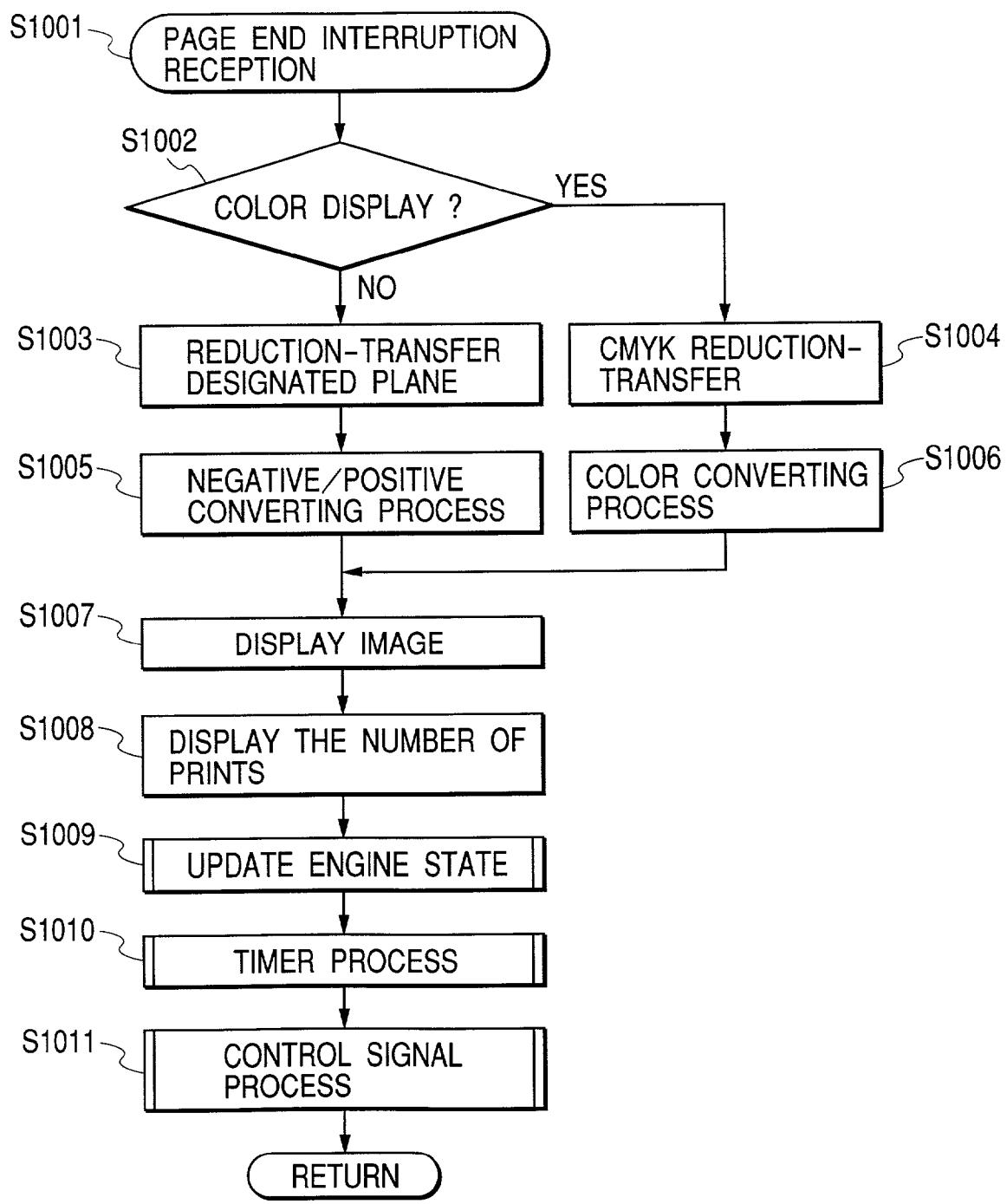
FIG. 10 is a flowchart for a page-end interrupting process in step S708 in FIG. 7.

FIG. 10 is a flowchart for the page-end interrupting process in step S708 in FIG. 7.

In FIG. 10, first, in response to receipt of a page-end interrupt (S1001), whether the color display has been designated as a display color space or not is discriminated (step S1002). If the color display is not designated, while the designated plane is reduction-converted, the image data accumulated in the image memory is transferred onto a work memory of the general computer 24 (step S1003). Since the size of an image display area is often smaller than that of the image data which is outputted from the printer controller, the image data is extracted while it is reduction-converted. Specifically speaking, the high precision image data in which the number of pixels in the main scan is equal to 4864 pixels, the number of lines in the sub-scan is equal to 6849 pixels, and the like and which has been accumulated in the image memory is reduced into ⅛, so that the image data of 608 pixels×856 lines, is transferred to the personal computer. Further, in this instance, in order to suppress the influence of aliasing noise or the like due to sub-sampling, a band limitation is made in a predetermined space filter. Owing to the reduction conversion here, an amount of data which is transferred from the image memory to the image display apparatus is reduced and the high speed operation can be realized. By further reducing the display area, the operation of a higher speed can be also realized. As image data to be extracted, if the display image color space has been set to the C/M/Y/K plane, only the designated plane is extracted. In a case of displaying only the designated plane, since the data transfer amount and an amount of processes are smaller than those in case of color-displaying, processing ability which is required of the general computer 24 can be lowered. Further, the data of each plane can be observed as it is, plane by plane, as data formed by the controller.

In step S1005, a negative/positive inverting process is executed in order to improve ease of look, and the inverted image plane is displayed in the image display area (step S1007). The number of displayed prints, that is, the number of printed pages is displayed (step S1008). The negative/positive inversion in step S1007 can also be omitted if it is not necessary.

If the color display is not designated as a result of the discrimination in step S1002, the image data of each of the CMYK planes is extracted at a predetermined reduction magnification (step S1004). A color converting process is executed on the extracted image data (step S1006). After that, steps S1007 and S1008 are executed.

According to the color converting process in step S1006, the CMYK image data is converted into the RGB image data for display, by means of general converting equations. Examples of the converting equations for color conversion are shown below:

$$R = 1-(C+K)$$

$$G = 1-(M+K)$$

$$B = 1-(Y+K)$$

The RGB image data obtained by those converting equations is color-displayed into the image display area in step S1007. In a case of color display, since there is a difference of the color converting processes, a difference of color reproducibility between a printer engine and a display device such as a CRT, or the like, a CMYK image which is formed by the controller is not reproduced as it is. However, since it is reproduced as a color image, the color converting process is effective in finding out an obvious rasterization error or the like.

By means of the processes in steps S1002 to S1008 in FIG. 10, in accordance with the occurrence of the page-end interruption, in a manner similar to the output to the paper in the case where the printer engine is connected, the image data which is rasterized by the printer controller can be displayed at the display unit in a real-time manner.

In subsequent steps S1009 to S1011, an engine state updating process of FIG. 11, which will be explained hereinlater, for updating an engine state which is emulated by the application 604, is executed (step S1009). A timer process of FIG. 12, which will be explained hereinlater, is executed (step S1010). A control signal process of FIG. 13, which will be explained hereinlater, is executed (step S1011). The present processing routine is then finished.

Figure 11:
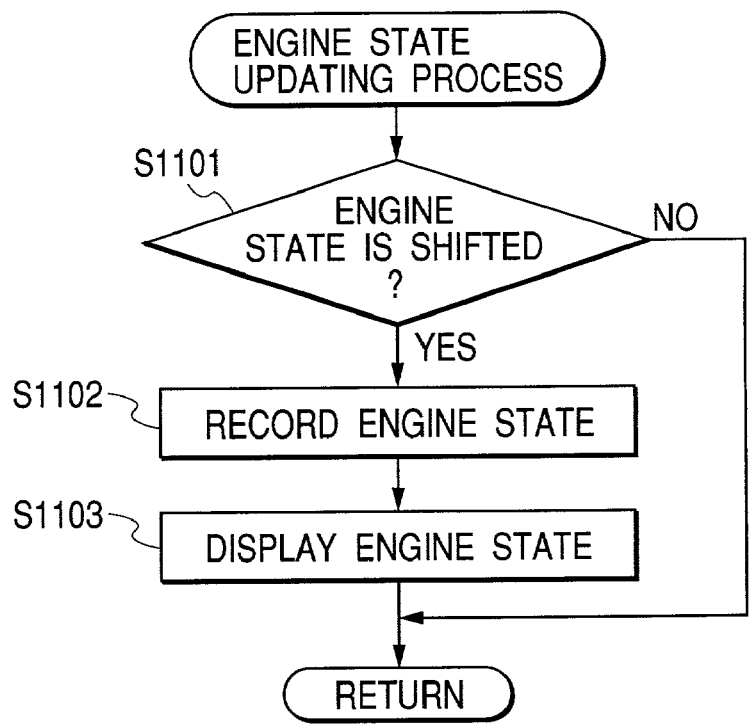
FIG. 11 is a flowchart for an engine state updating process in step S1009 in FIG. 10.

FIG. 11 is a flowchart for the engine state updating process in step S1009 in FIG. 10.

In FIG. 11, when the engine state is shifted by the page-end interrupting process (YES in step S1101) (emulating means), the engine state is recorded together with the time into the personal computer (step S1102). A new engine state is displayed into an area 808 on the CRT 25 (step S1103). In step S1103, if an engine state window of FIG. 16, which will be explained hereinlater, is displayed, the display of this window is updated.

Figure 12:
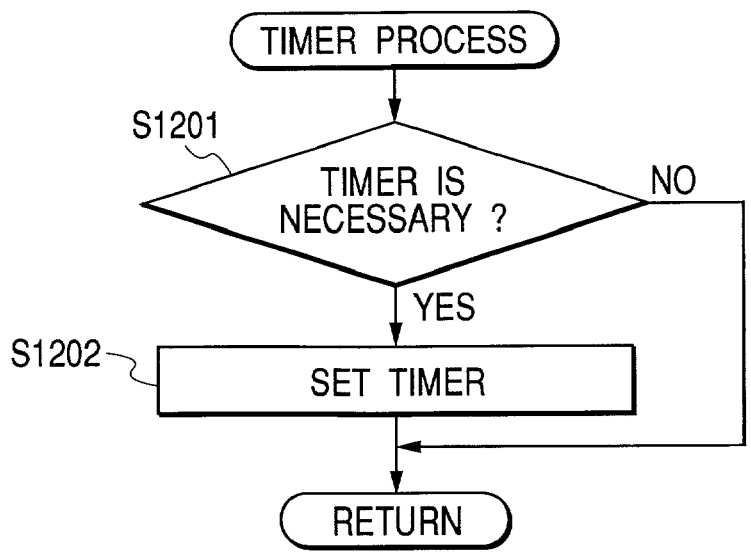
FIG. 12 is a flowchart for a timer process in step S1010 in FIG. 10.

FIG. 12 is a flowchart for the timer process in step S1010 in FIG. 10.

In FIG. 12, when it is necessary to set the timer interruption, for example, when there is a possibility that the engine state is shifted depending on the time like "during post-process" (YES in step S1201), the timer interruption corresponding to the time necessary for shifting the engine state is set (step S1202).

Figure 13:
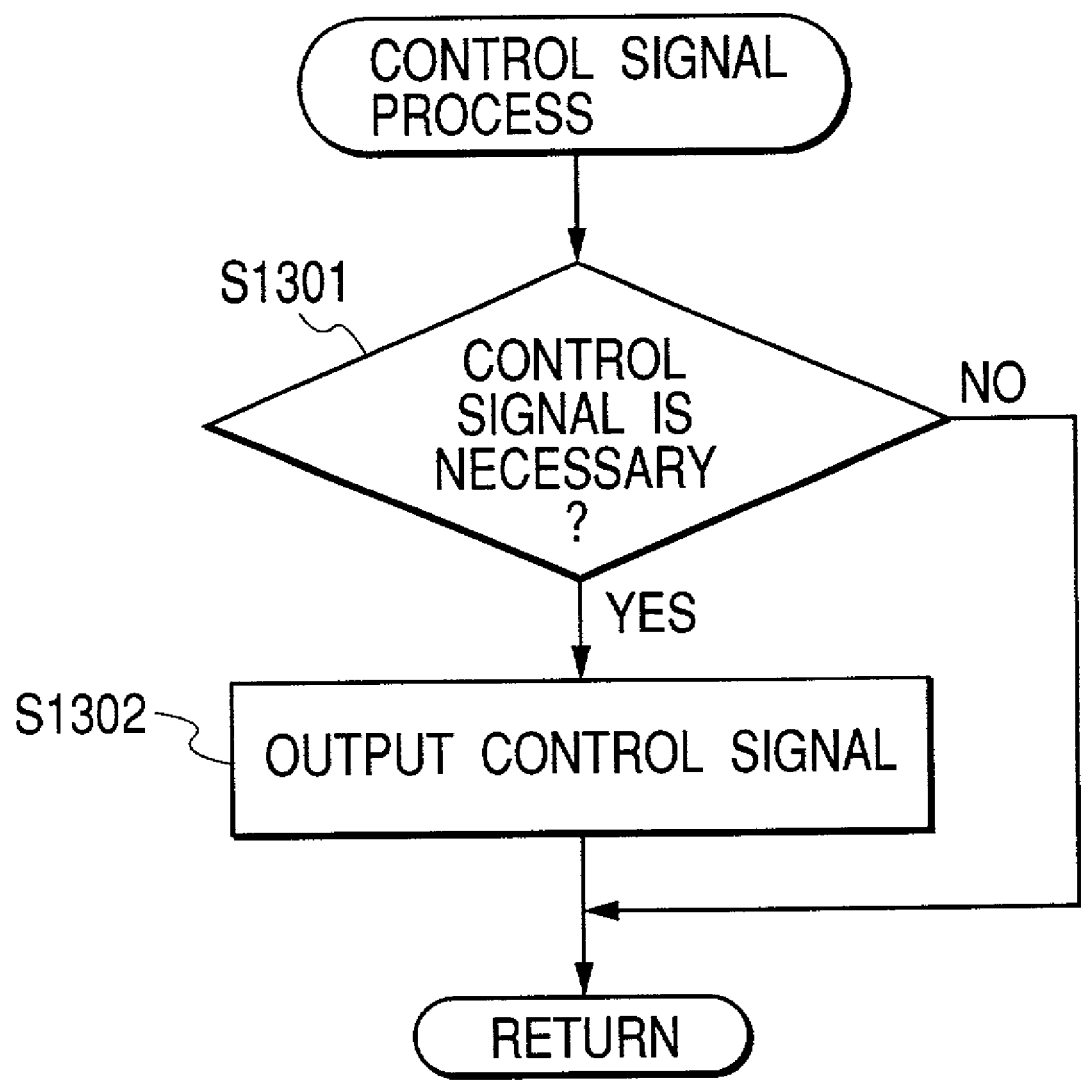
FIG. 13 is a flowchart for a control signal process in step S1011 in FIG. 10.

FIG. 13 is a flowchart for the control signal process in step S1011 in FIG. 10.

In FIG. 13, if it is necessary to output the control signal due to the received command or the shift of the engine state (YES in step S1301), the control signal is outputted via the manager 603 (step S1302) (transmitting means).

Figure 14:
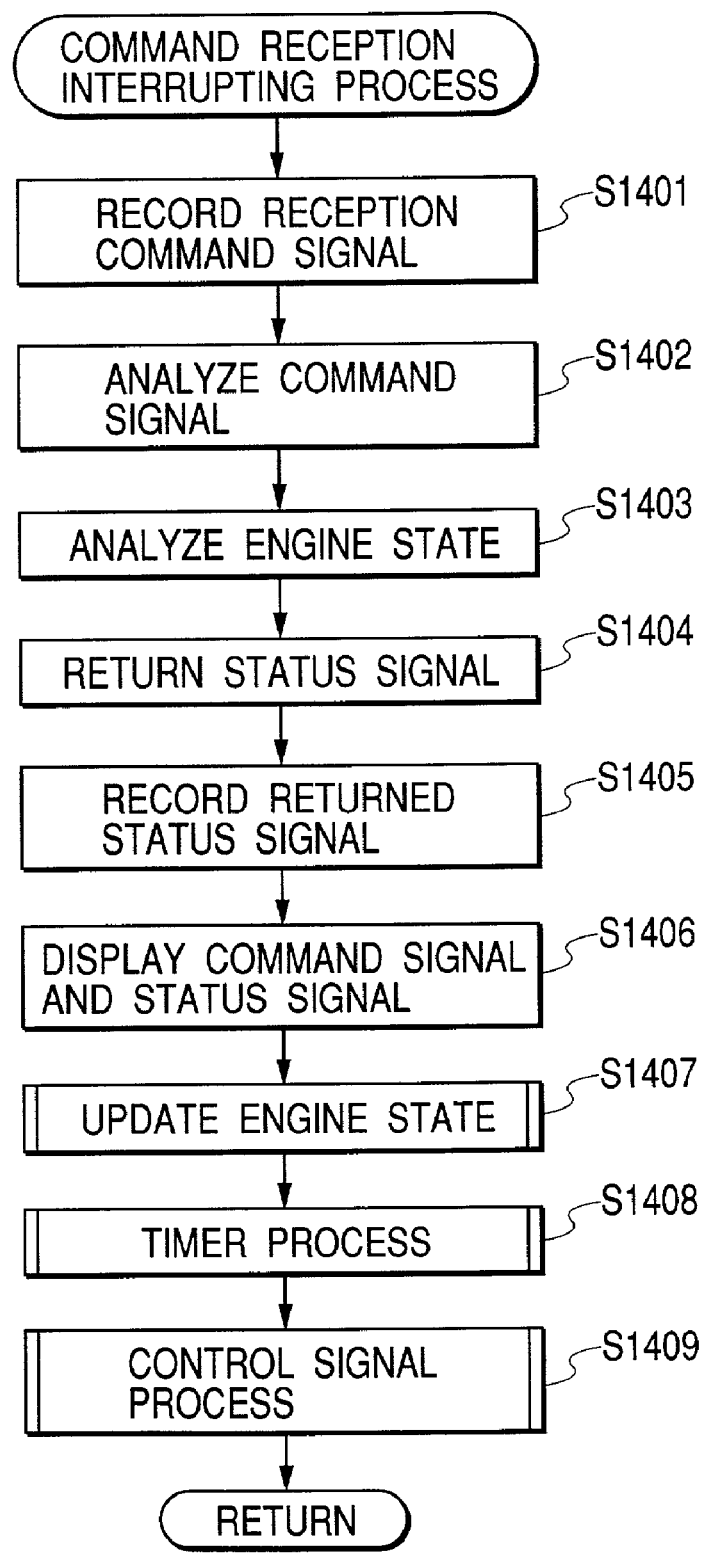
FIG. 14 is a flowchart for a command reception interrupting process in step S708 in FIG. 7.

FIG. 14 is a flowchart for the command reception interrupting process in step S708 in FIG. 7.

In FIG. 14, the personal computer reads out the received command signal from the video data control unit 200 and records it together with the reception time (step S1401) (obtaining means). The personal computer analyzes the received command signal (step S1402), analyzes the engine state held in the application 604 (step S1403), and determines the new engine state and a command signal which is returned.

The engine state denotes a state of the engine such as "idle", "initialization", "during paper feed", or the like. In the embodiment, the engine state is emulated in the application 604. The engine state just after the start button 805 was pressed is the "idle" state. For example, if the command signal indicative of "start print preparation" is received when the engine state is in the "idle" state, a status signal which is returned is determined to be "normal execution" and the next engine state is determined to be "initialization".

In subsequent step S1404, the status signal is returned from the video data control unit 200 via the manager 603 (transmitting means). The returned status signal is recorded so that the correspondence to the command signal received in step S1401 is known (step S1405). The received command signal and the status signal are displayed in an area 807 on the CRT 25 in correspondence to each other so that the operator can easily understand them in a manner like "start print preparation→normal execution" (step S1406). In steps S1407 to S1409, processes similar to those in steps S1009 to S1011 in FIG. 10 are executed. As an operation example, when the engine state is shifted from "idle" to "initialization", the system operates so as to set the timer interruption of time T1, or the like.

Figure 15:
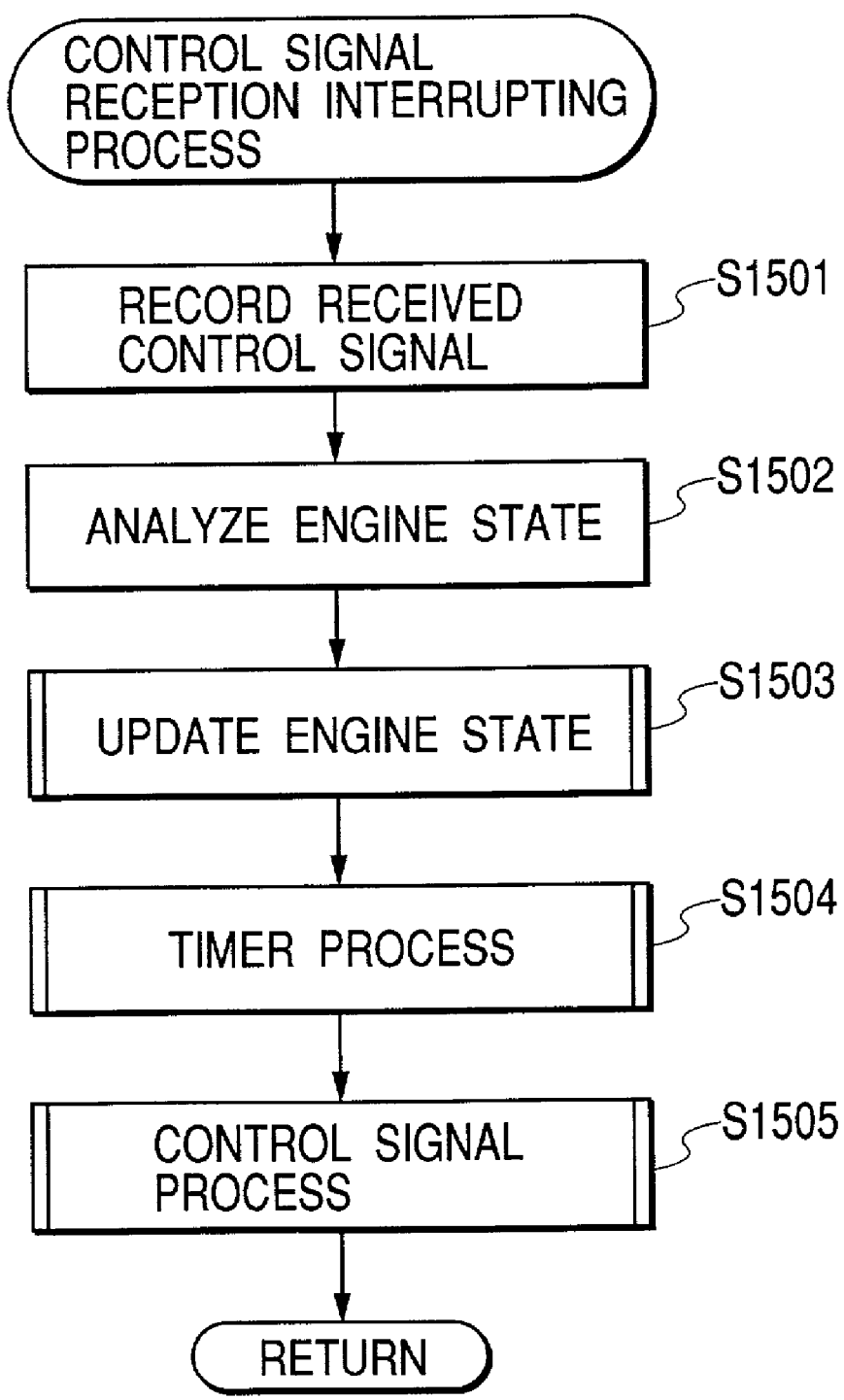
FIG. 15 is a flowchart for a control signal reception interrupting process in step S708 in FIG. 7.

FIG. 15 is a flowchart for the control signal reception interrupting process in step S708 in FIG. 7.

In FIG. 15, the personal computer reads the received control signal from the video data control unit 200 and records it together with the reception time (step S1501) (obtaining means). The personal computer analyzes a new engine state from the engine state held in the application 604 and the received control signal (step S1502).

In subsequent steps S1503 to S1505, processes similar to those in steps S1009 to S1011 in FIG. 10 are executed. As an operation example, when the control signal "image transfer request signal" is received in the case where the engine state is "during paper feed", the system operates so as to shift the engine state to "during print" and output the "image transfer permission signal", or the like.

Figure 28:
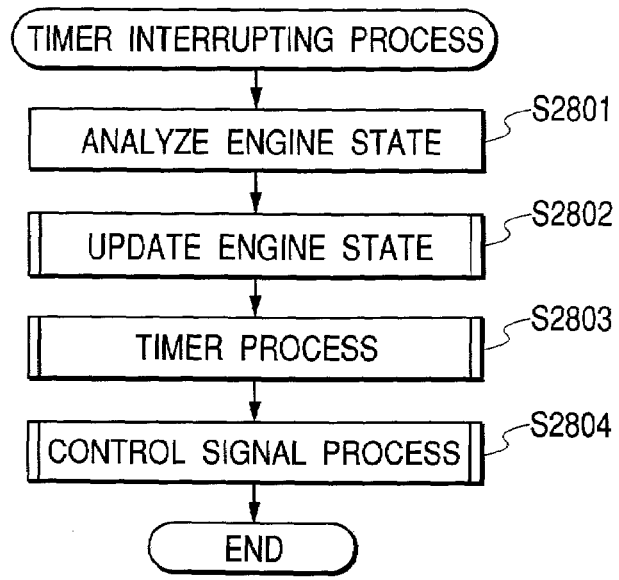
FIG. 28 is a flowchart for a timer interrupting process in step S708 in FIG. 7.

FIG. 28 is a flowchart for the timer interrupting process in step S708 in FIG. 7.

In FIG. 28, a new engine state is analyzed from the engine state held in the application 604 and the timer which generated the interruption (step S2801).

In subsequent steps S2802 to S2804, processes similar to those in steps S1009 to S1011 in FIG. 10 are executed. As an operational example, when the timer interruption which notifies the elapse of time T4 (1603 in FIG. 16) occurs in the case where the engine state is "during paper ejection", the system operates so as to change the engine state to "during post-process", or the like.

Figure 16:
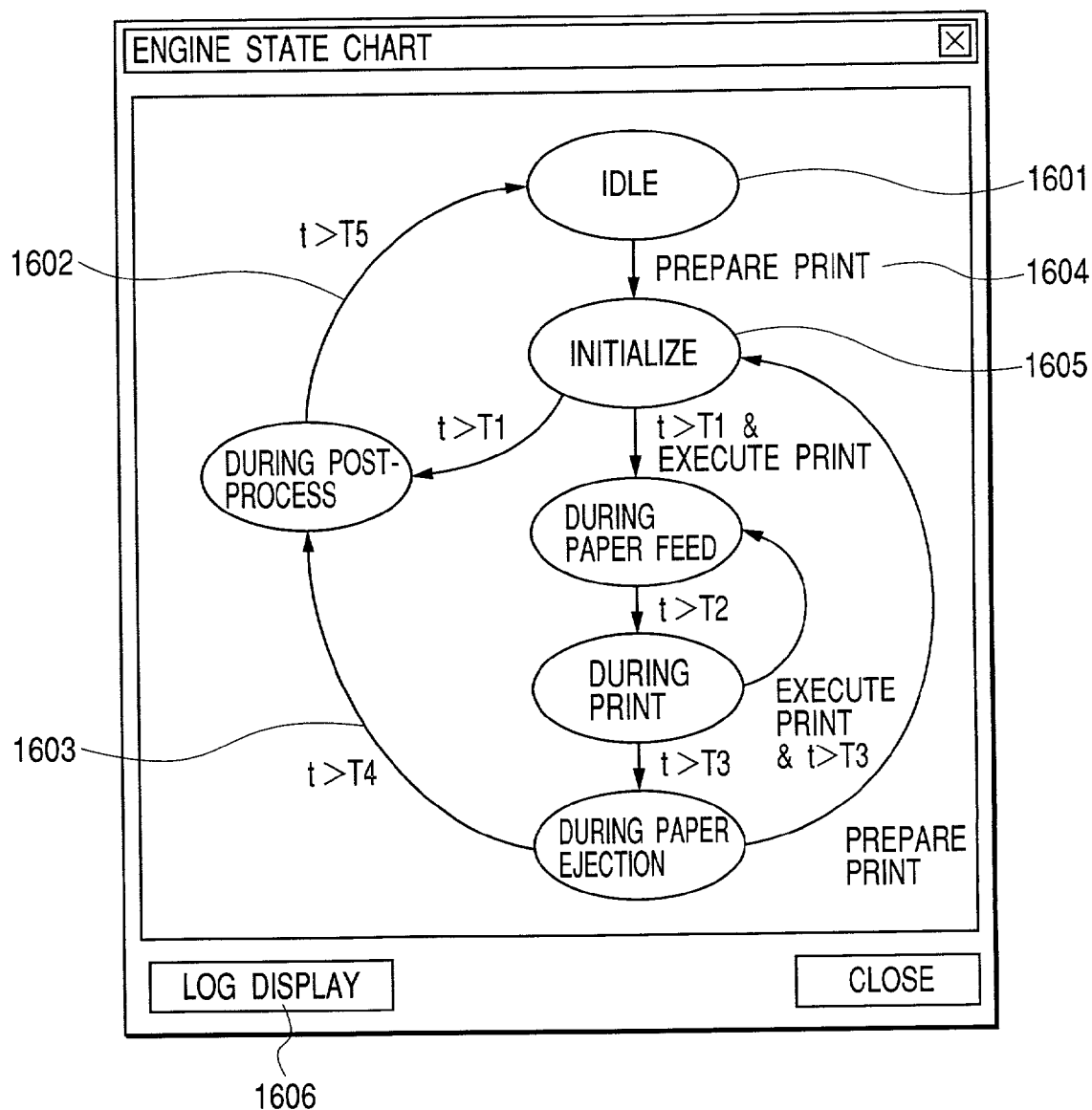
FIG. 16 is an explanatory diagram of an engine state chart window which is displayed in step S1103 in FIG. 11.

FIG. 16 is an explanatory diagram of the engine state chart window which is displayed in step S1103 in FIG. 11.

In FIG. 16, the engine state is displayed as an area surrounded by an ellipse as shown at 1601. It will be understood that the engine unit in the embodiment has six internal states. An arrow 1602 indicates a shifting direction of the engine state. An abnormality of the engine unit can be found by detecting the occurrence of a state transition in the direction out of the arrow or a transition between the states without an arrow. An inequality shown at 1603 denotes time necessary for transition of the engine state. In this case, it shows that when the engine state is "during paper ejection", if time T3 elapses, the engine state is shifted to "during post-process". A character string shown at 1604 denotes a command necessary for transition of the engine state. In this case, it shows that when the engine state is "idle", if the command "execute print preparation" is received, the engine state is shifted to "during initialization". The engine state held in the application software 604 is colored and displayed like 1605 so as to be conspicuous. The engine state before it is shifted to the relevant state is also colored and displayed like 1601. Therefore, the operator can easily understand the engine state.

Figure 17:
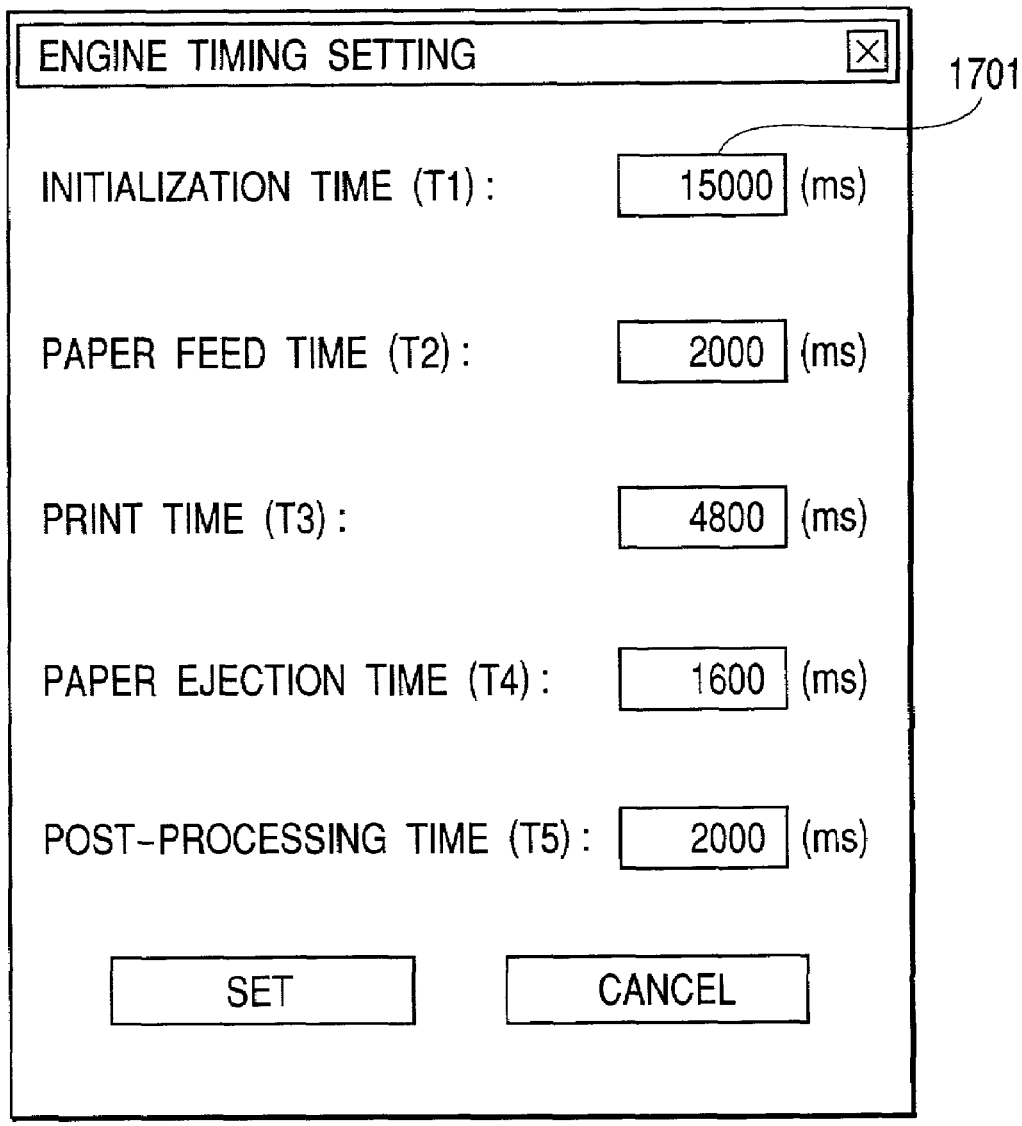
FIG. 17 is an explanatory diagram of an engine timing setting window which is displayed when an inequality 1603 in FIG. 16 is clicked by a mouse.

Further, in the engine state chart window of FIG. 16, if the inequality shown at 1603 is clicked on using a mouse, an engine timing setting window of FIG. 17 is displayed. In the engine timing setting window of FIG. 17, the time of each timing can be set on a unit basis of $1/1000$ second (1701). For example, in the printer emulating apparatus of the present embodiment, in the case of emulating the high speed printer engine, each numerical value as well as a print time is set to a small value. The numerical value designated here exercises an influence on the time of the timer which is set in step S1202 of a timer processing subroutine. Since each timing of the engine unit can be easily changed as mentioned above, it is possible to cope promptly with a change in the specifications of the engine unit. In the printer controller for verifying by using the printer emulator in the present embodiment, if the operator wants to confirm mainly the image data instead of the processing timing, by setting an initialization time, a paper feed time, a paper ejection time, and a post-processing time to 0, respectively, the time which is necessary for the portions which are not concerned with the image data can be reduced. The time necessary for confirming and analyzing the image data can be shortened. The engine timing setting window of FIG. 17 can also be displayed by an environment setting menu 810 in the window of FIG. 8.

When the stop button 806 is pressed, the system operates in a mode called an "offline analyzing mode" hereinafter.

Figure 18:
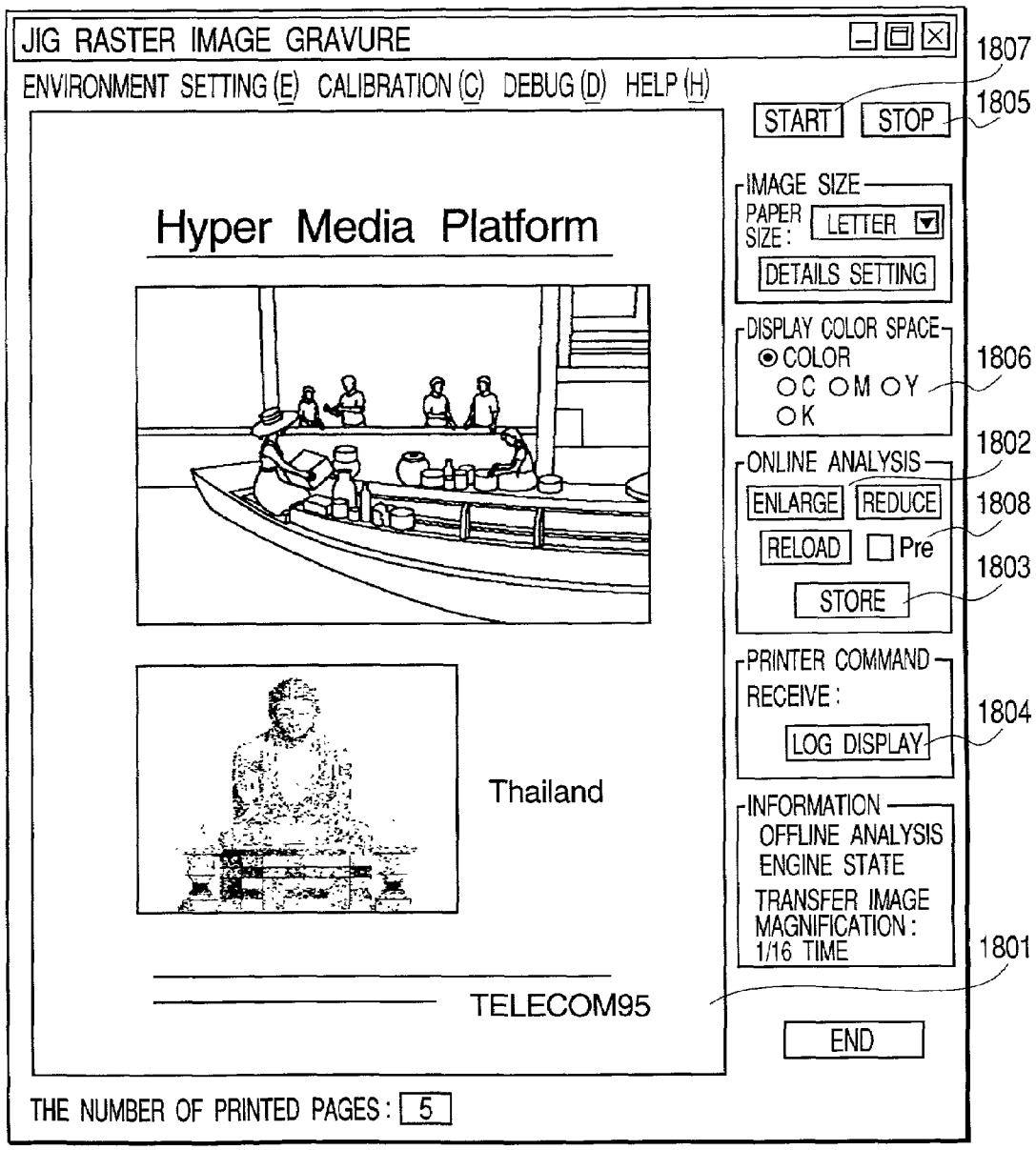
FIG. 18 is an explanatory diagram of a display picture plane on the CRT 25 in an offline analyzing mode.

In the offline analyzing mode, an analyzing function for the image data of the last page accumulated in the image memory upon operation in a real-time analyzing mode is provided. FIG. 18 shows a user interface in the offline analyzing mode. The image of the last page is displayed in an image display area 1801. In the case of the offline analyzing mode, a button for promoting the operation such as enlarging/reducing function 1802, data storing function 1803, log display function 1804, Pre button 1808, or the like is validated.

In FIG. 7, when the user presses the stop button 1805 (YES in step S709), the application software inhibits the generation of the interrupting process via manager software and driver software and instructs the video data control unit 32 to stop the printer emulating process for the printer command. At this time, the system operates in the offline analyzing mode in FIG. 18. In the offline analyzing mode, the function for analyzing the image data of the last page accumulated in the image memory upon operation in the real-time analyzing mode is provided.

FIG. 18 is an explanatory diagram of a display picture plane on the CRT 25 in the offline analyzing mode, and in addition to the feature mentioned above, has a radio button 1806 for the color space of what is displayed.

Figures 19, 19A:
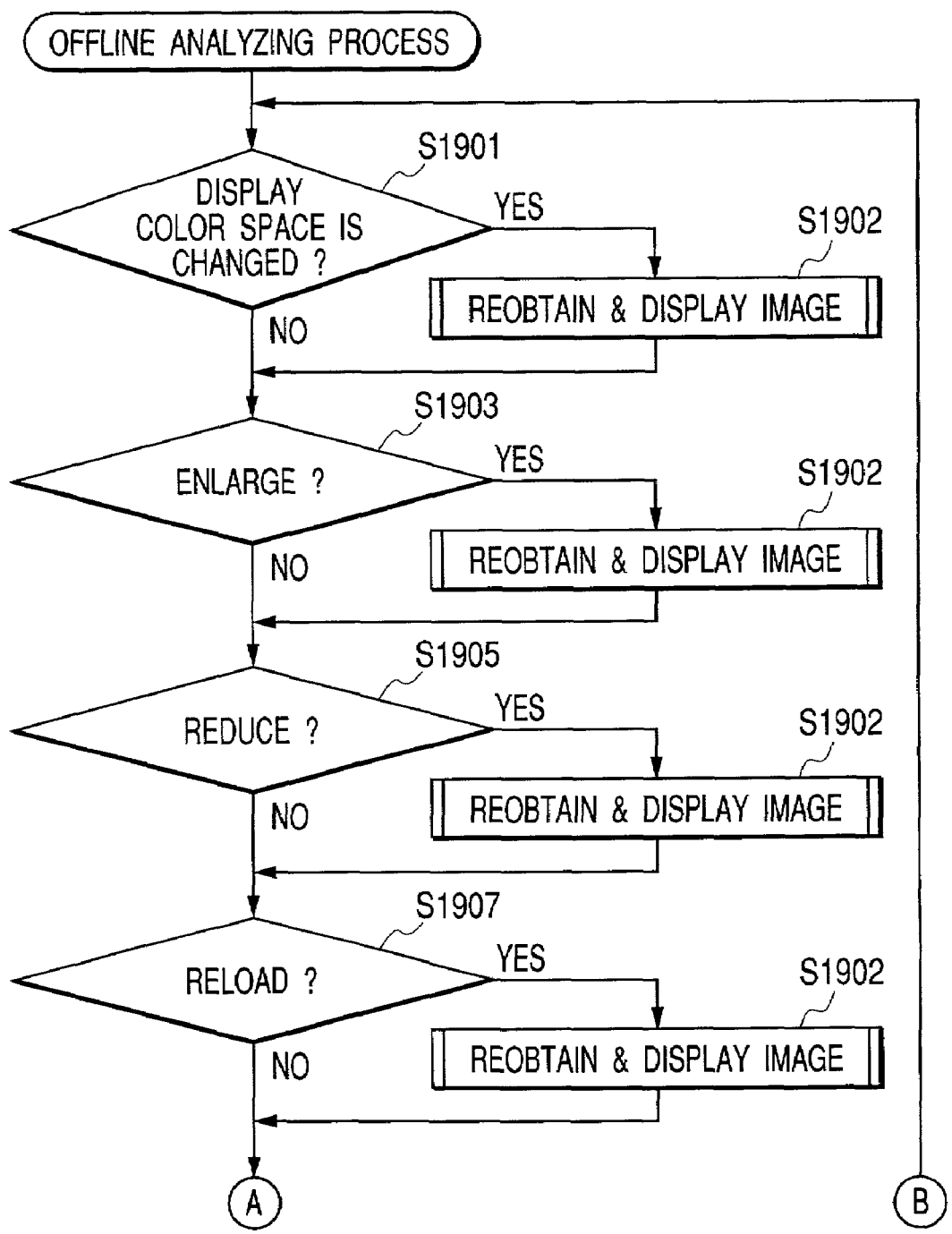
FIG. 19 is comprised of FIGS. 19A and 19B showing flowcharts for an offline analyzing process which is executed after the process in FIG. 7.
Figure 19B:
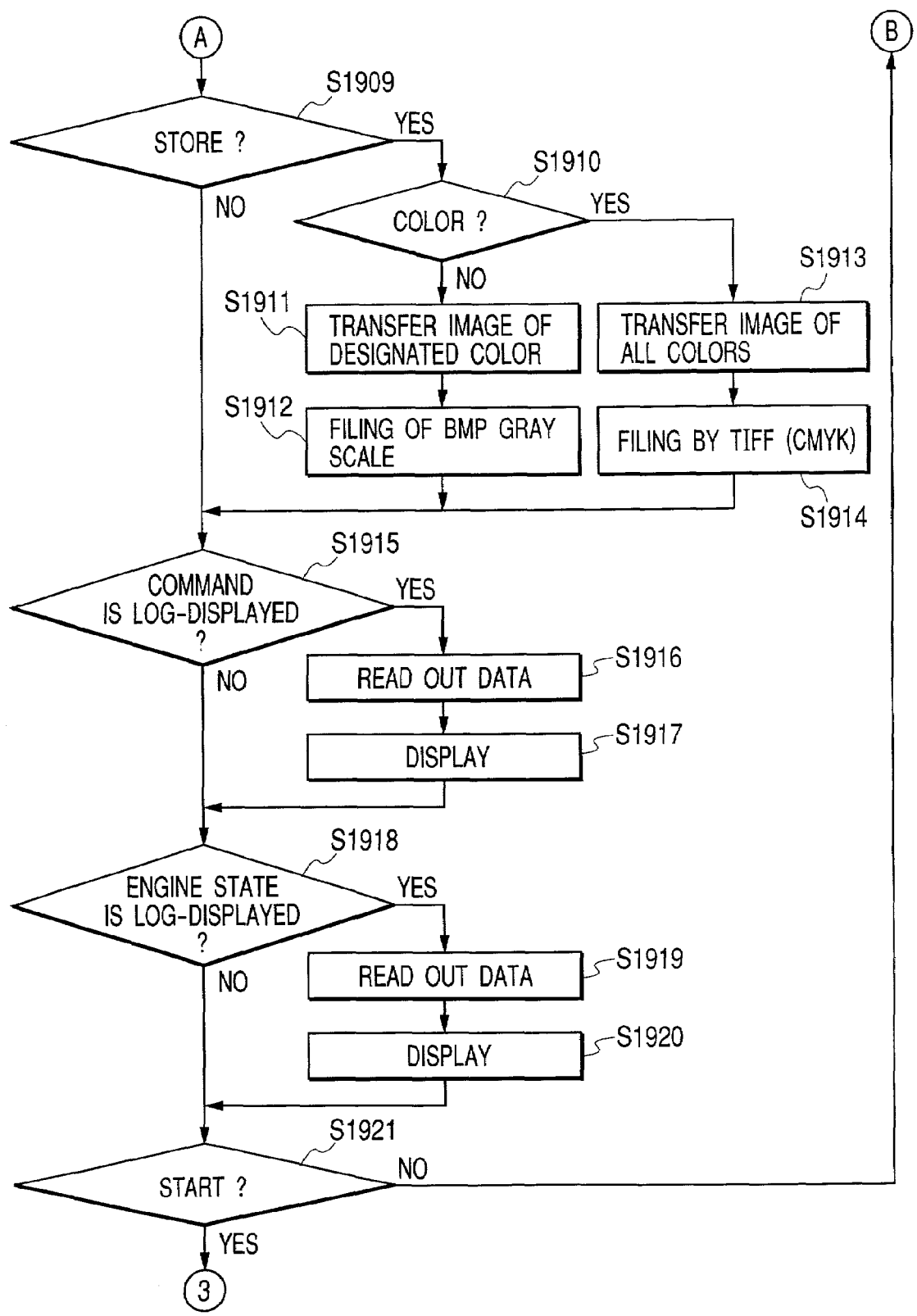

FIGS. 19A and 19B are a flowchart for the offline analyzing process which is executed by the printer emulating apparatus in FIG. 1.

In FIGS. 19A and 19B, when a change in display color space is instructed using radio button 1806 (YES in step S1901), an image reobtainment displaying process S2001 through S2008 in FIG. 20, which will be explained hereinlater, is executed (step S1202). Step S1903 follows.

FIG. 20 is a flowchart for the image reobtainment displaying process in step S1902 in FIGS. 19A and 19B.

According to this process, image data of a desired plane reduced to a predetermined magnification is transferred from the image memory and displayed into the display area.

In FIG. 20, first, whether the color display has been designated as a display color space or not is discriminated (step S2002). If the color display is not designated but the C/M/Y/K independent plane is designated, while only the image data of the designated plane is reduction-converted at a desired reduction magnification, it is transferred into a memory device of the general computer 24 (step S2003). The transferred image data is negative/positive converted (step S2004). After that, it is displayed as monochromatic gray scale image data in the image display area (step S2007).

If the color display is designated as a result of the discrimination in step S2002, while the image data of each of the CMYK planes is reduced to a predetermined magnification, it is transferred to a storing device of the personal computer (step S2005). The color converting process is executed on the transferred image data (step S2006). The obtained RGB data is displayed in the image display area (step S2007).

Returning to FIGS. 19A and 19B, when the enlarge button 1802 is pressed (YES in step S1903), the image reobtainment displaying process in FIG. 20 is executed (step S1902) and step S1905 follows. By the operator pressing the enlarge button once, the image data enlarged by +10% is retransferred from the image memory. Also in this case, the necessary image data is transferred from the image memory at a predetermined reduction magnification.

Figure 21:
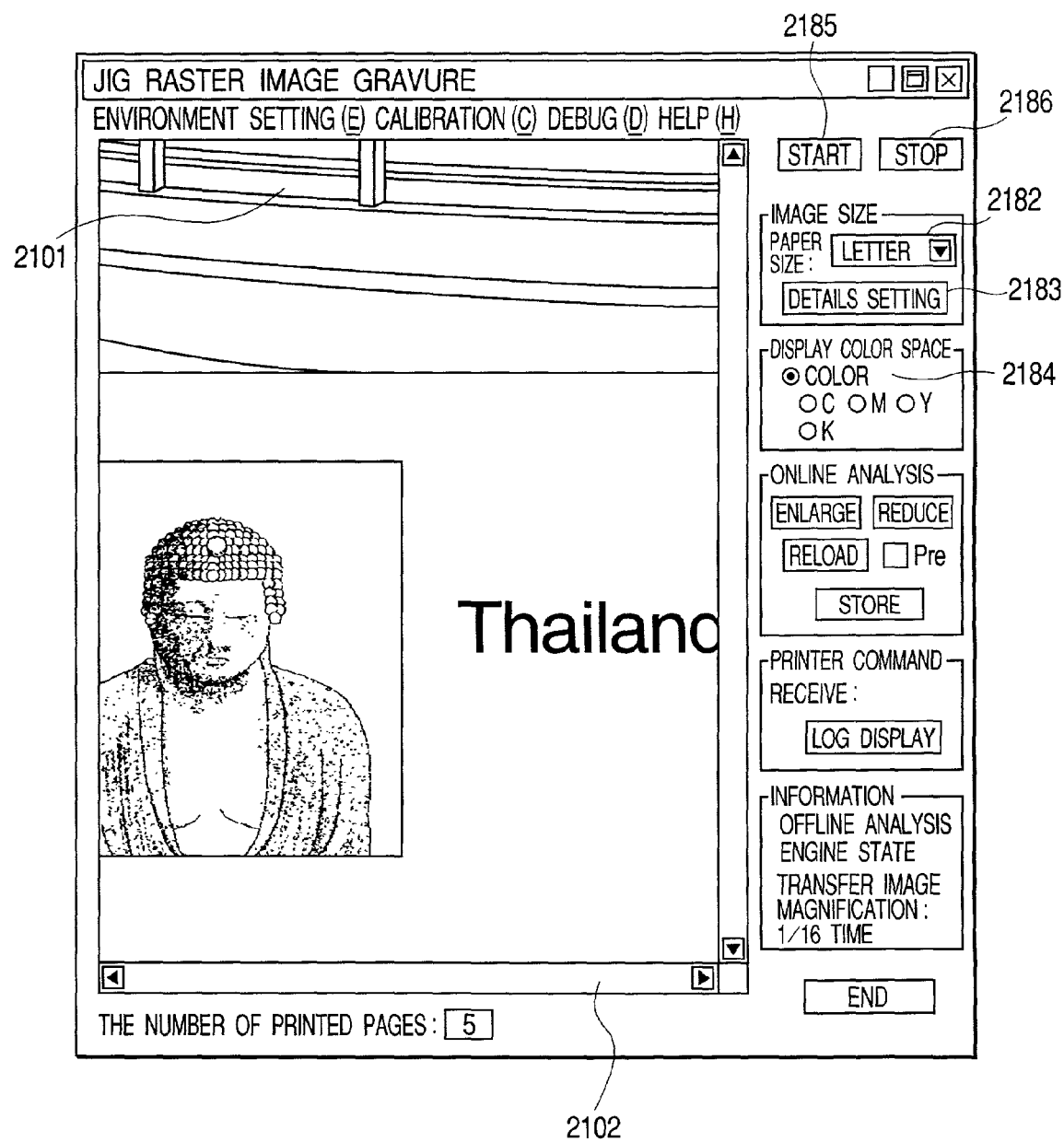
FIG. 21 is an explanatory diagram of a display picture plane on the CRT 25 which is displayed when an enlarge button is pressed in step S1903 in FIGS. 19A and 19B.

FIG. 21 is an explanatory diagram of a display picture plane on the CRT 25 which is displayed when the enlarge button is pressed in step S1903 in FIGS. 19A and 19B.

The image data of high resolution is transferred and displayed by an image display area 2101. In this case, since it is not possible for the entire image to be displayed at one time inside of the image display area, a scroll bar 2102 is automatically displayed. By operating the scroll bar, the whole image can be confirmed.

Returning to FIGS. 19A and 19B, when a reduce button is pressed (YES in step S1905), the image reobtainment displaying process in FIG. 20 is executed (step S1902) and step S1907 follows. By the operator pressing the reduce button once, the image data reduced by 10% is retransferred from the image memory.

Subsequently, when a whole display button is pressed (YES in step S1907), the image reobtainment displaying process in FIG. 20 is executed (step S1902) and step S1909 follows. By the operator pressing the whole display button, the image data is retransferred from the image memory at a reduction magnification at which the whole image can be displayed in the image display area. Further, an enlargement display by the area designation by the mouse is also possible as shown in FIG. 21.

Figure 22:
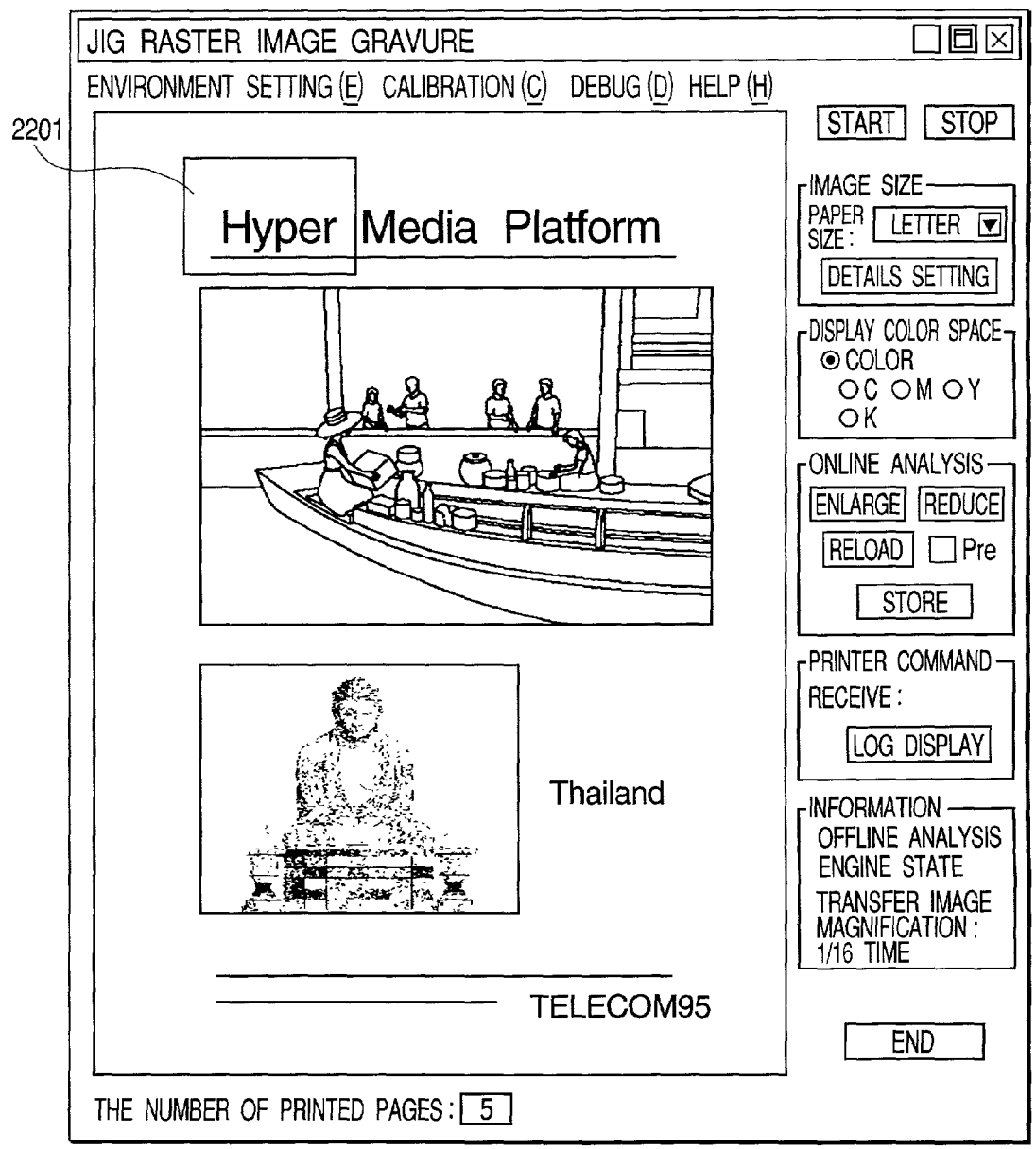
FIG. 22 is a diagram showing a state of an area designation by the mouse.

FIG. 22 is a diagram showing a state of the area designation by the mouse.

Reference numeral 2201 denotes a designated area. The data is retransferred from the image memory at a magnification at which this area is displayed in the whole image display area.

Processing steps regarding the operation by the mouse are not shown in the flowchart of FIGS. 19A and 19B.

Subsequently, when the user presses a store button 1803 (YES in step S1909), whether the display color space has been set to the color display or not is discriminated (step S1910).

Figure 23:
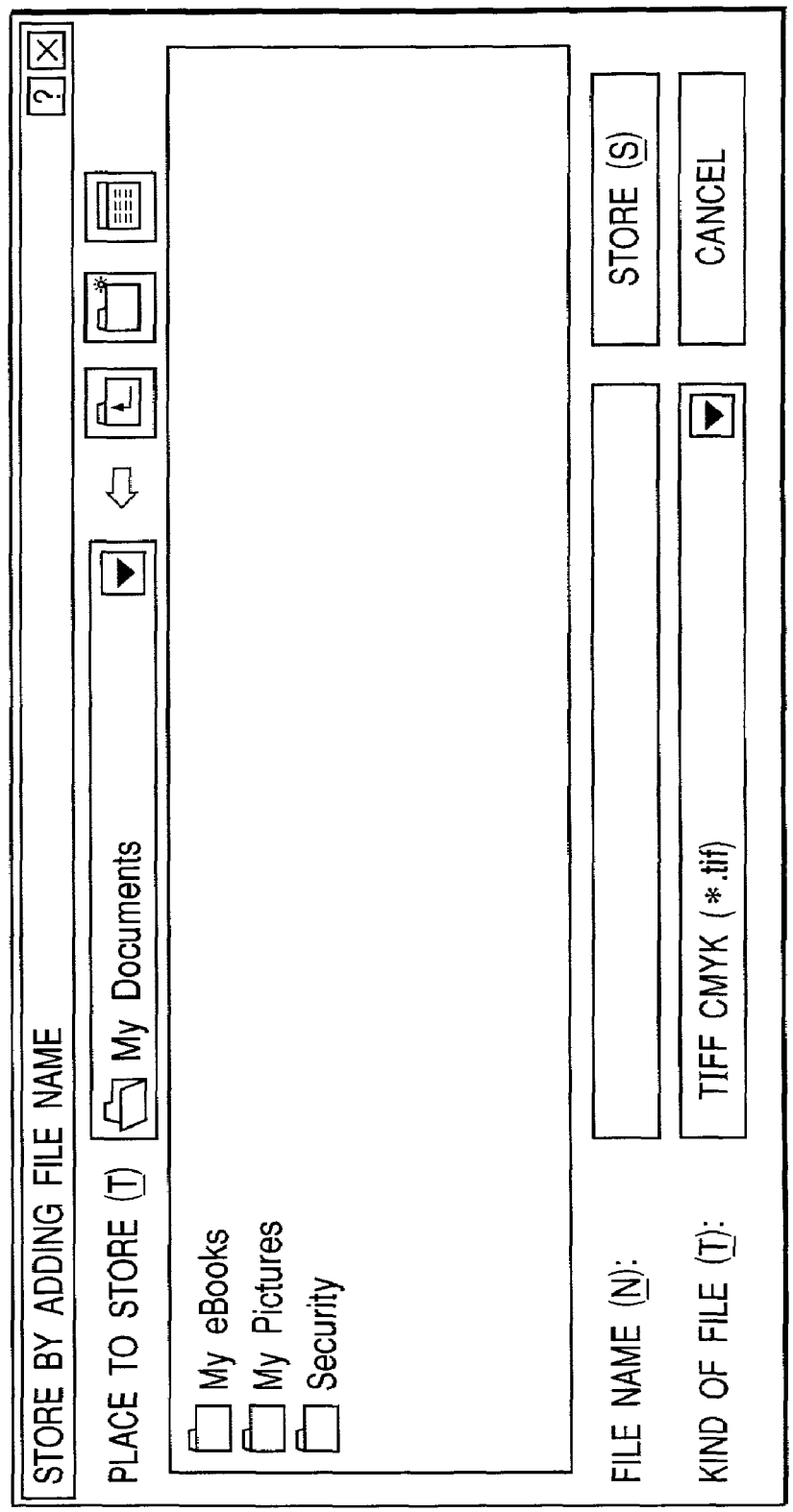
FIG. 23 is an explanatory diagram of a display picture plane on the CRT 25 which is displayed when a store button is pressed in step S1909 in FIGS. 19A and 19B.

When the store button is pressed, for example, if the display color space has been set to the color display, a display picture plane on the CRT 25 is as shown in FIG. 23 (storage in a TIFF (CMYK) format).

If the display color space has been set to the color display as a result of the discrimination in step S1910, the CMYK image data of all colors accumulated in the image memory is transferred to a main storing unit of the general computer 24 (step S1913), filed in the TIFF (CMYK) format, and recorded onto a hard disk or the like of the general computer 24 (step S1914).

If the designation of the C/M/Y/K plane is set instead of the color as a result of the discrimination in step S1910, only the whole image data of the designated plane is transferred from the image memory to the main storing unit of the general computer 24 (step S1911) and recorded as a DIB format image file of a monochromatic (BMP) gray scale (step S1912). By this process, the image data which was rasterized by the printer controller can be filed in a general format in accordance with the display color space of the image data displayed in the display area. Thus, the image data can be also analyzed by using another analyzing tool or the like.

Figure 24:
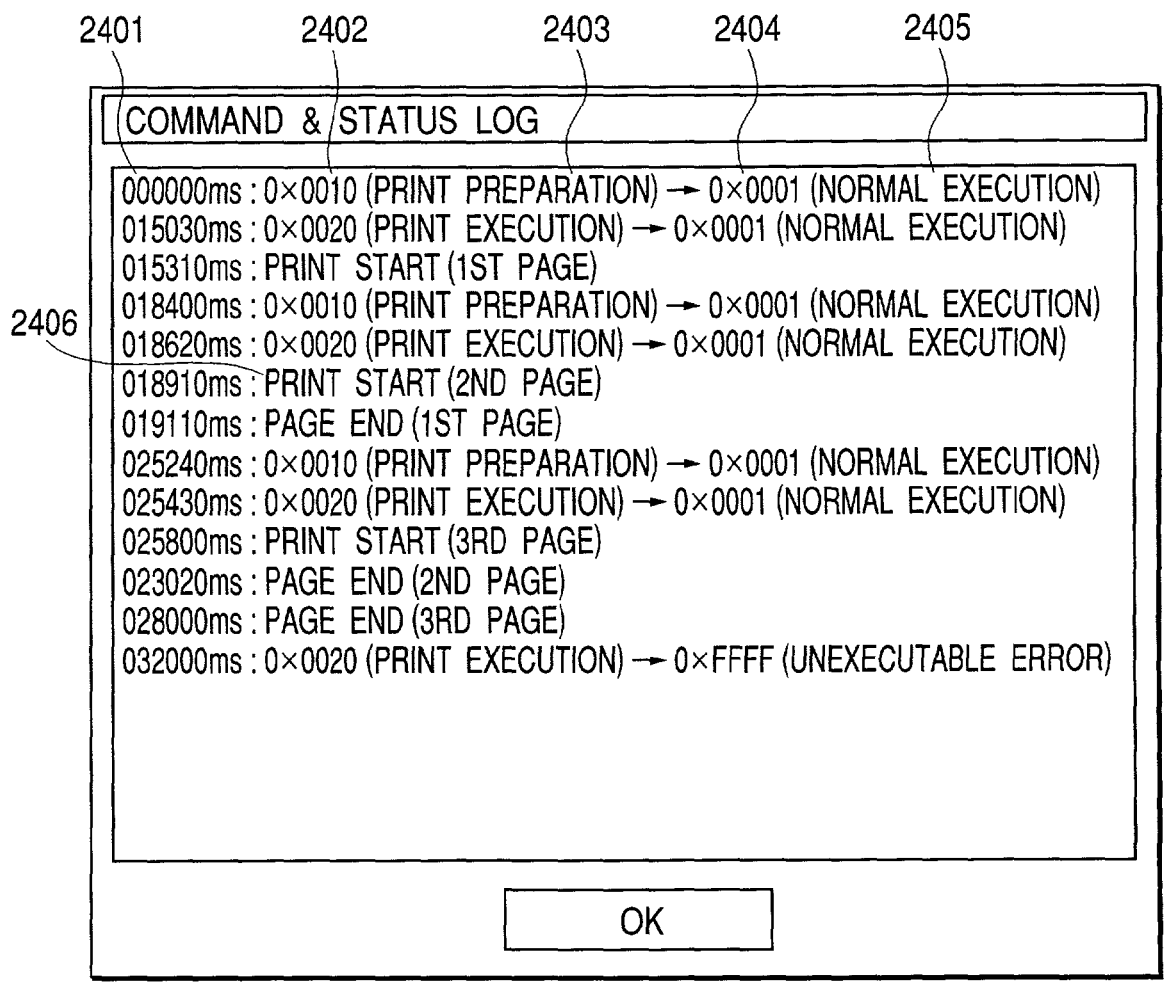
FIG. 24 is an explanatory diagram of a display picture plane on the CRT 25 which is displayed in step S1917 in FIGS. 19A and 19B.

Subsequently, when a command display button 1804 is pressed on the picture plane of FIG. 18 (YES in step S1915), the command signal, status signal, and control signal accumulated in steps S1401, S1404, and S1501 are read out (step S1916). The read-out signals are transferred to the CRT of the general computer and displayed (step S1917). A display picture plane on the CRT 25 at this time is as shown in FIG. 24. Time when the command signal is received (2401), a command of a hexadecimal indication (2402), a decoded command (2403), a status of a hexadecimal indication (2404), a decoded status (2405) are displayed. Further, information regarding the print start, page end, and the like obtained by the control signal is also displayed together with the time (2406). By confirming the command, status, and control signal between the controller unit and the engine unit, whether the controller unit and the engine unit are normally operating or not or the like can be verified.

Figure 25:
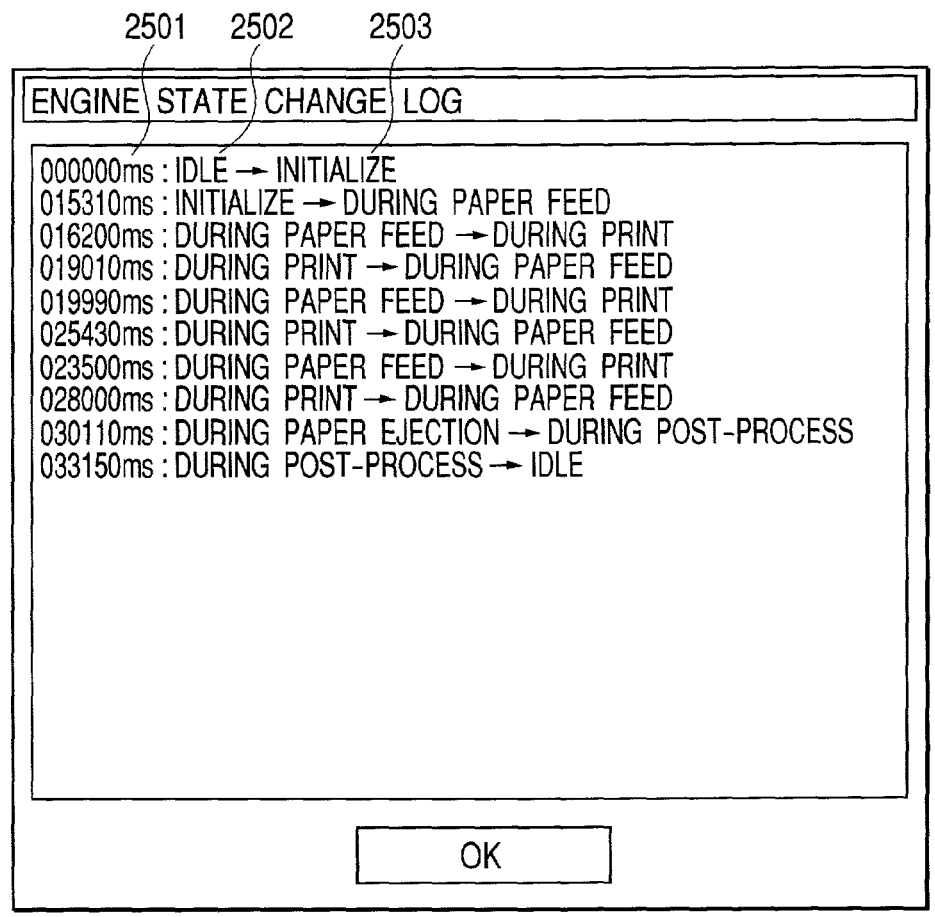
FIG. 25 is an explanatory diagram of a display picture plane on the CRT 25 which is displayed in step S1920 in FIGS. 19A and 19B.

Subsequently, when a log display button 1606 of the engine state chart window of FIG. 16 is pressed (YES in step S1918), the record of the engine state accumulated in step S1102 is read out (step S1919). The read-out signal is transferred to the CRT 25 of the general computer 24 and displayed (step S1920). A display picture plane on the CRT 25 at this time is as shown in FIG. 25. The time at which the state was shifted (2501), an engine state before the transition (2502), and an engine state after the transition (2503) are displayed. By confirming the state change timing of the engine unit, whether the controller unit and the engine unit are normally operating or not or the like can be verified in greater detail.

In the offline analyzing mode, those analyzing operations can be performed on the image data accumulated in the image memory. Thus, the verification or the like of a pixel level unit for the image data can be performed by the easy operation immediately after the stop of the real-time analyzing mode. That is, a situation of the continuous operation in the real-time analyzing mode is observed and, if it is determined that an abnormality has occurred, merely by pressing the stop button 1805, the target image data can be analyzed in detail in an offline manner.

Subsequently, when the start button 1807 is pressed (YES in step S1921), the processing routine advances to step S2908 in FIG. 29 in order immediately to shift the operating mode to the real-time analyzing mode. When it is shifted to the real-time analyzing mode, in a manner similar to that upon activation, the raster image data which is outputted by the printer controller is accumulated into the image memory and displayed to the image display unit in a real-time manner. By virtue of the above operation, while the operating mode is shifted to the real-time analyzing mode or the offline analyzing mode at arbitrary timing, the verifying operation of the printer controller can be repeatedly executed by means of a simple operation.

By virtue of the above operation, while the operating mode is shifted to the real-time analyzing mode or the offline analyzing mode at arbitrary timing, the verifying operation of the printer controller can be repeatedly executed by means of a simple operation.

Although the above embodiment has been described with respect to the case where the laser beam printer is used as a target printer, the invention is not limited to it but can be used for development of various printer controllers or the like such as a bubble jet (registered trademark) type printer and the like. In this case, by changing the video interface unit in accordance with a video interface system of the printer or the like, the invention can be used for development of various printer controllers.

Although the above embodiment has been described with respect to the case where the printer state is displayed by using the state chart as a display example of the printer state, it is also possible to display the printer state in a manner such that internal constructions of the printer regarding a paper feed tray, a photosensitive drum, fixing device, a paper ejection tray, and the like can be understood, and a photosensing state of the photosensitive drum, a paper feeding state, or the like can be also displayed as an animation image in accordance with a change in engine state.

Although the above embodiment has been described with respect to the case where the hexadecimal data is displayed as it is as a display example of the print command log, the command can be also decoded and displayed so that it can be more easily understood, in accordance with a command table.

Further, a user interface for generating an error state such as no paper, jam, no toner, or the like can be also provided.

Figure 26:
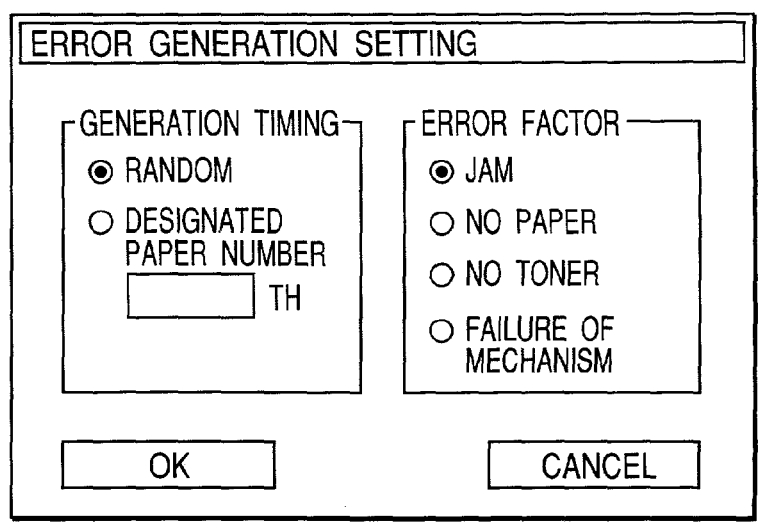
FIG. 26 is an explanatory diagram of a display picture plane on the CRT 25 in case of setting an error response.
Figure 27:
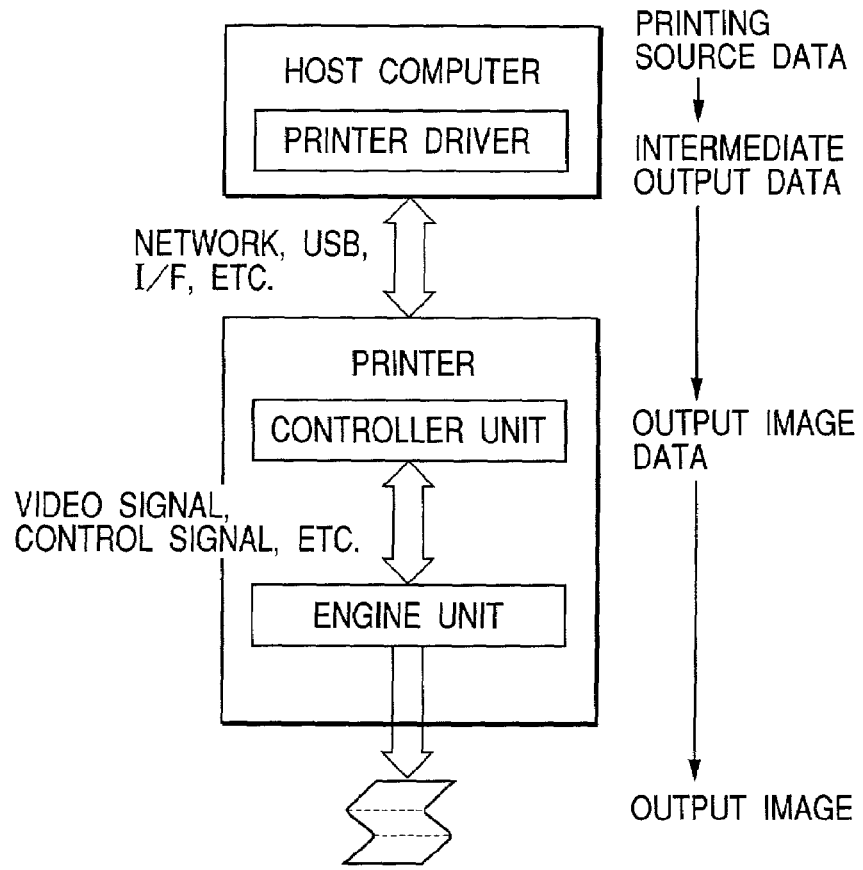
FIG. 27 is a block diagram showing a schematic construction of a conventional printer.

FIG. 26 is a diagram of a user interface in case of generating an error state. In this case an error state designated, for example, at the time of the print of the nth paper or at random timing is generated. Thus, the verification of the command processing function of the printer controller can be made in greater detail.

Moreover, a user interface for returning an error response indicative of no paper, a jam, or the like can be also provided (FIG. 26). In this case, an error response (in this case, "no paper", "jam", "failure of mechanism") designated, for example, at the time of the print of the nth paper or at random timing is generated. That is, it is set so as to generate the error factor designated at predetermined designated generation timing. Thus, not only the verification of the rasterizing function of the printer controller but also the verification of the response processing function to the printer command can be made.

Although the case of using Windows™ of Microsoft Corporation in U.S.A. as an operating system has been described in the above embodiment, the invention is not limited to it but can also be implemented in various other environments.

Although the case of constructing the system by combining with the personal computer has been described in the above embodiment, the invention is not limited to it but can be also realized by combining with various other apparatuses.

The object of the invention is also accomplished by a method whereby a memory medium in which program codes of the software for realizing the functions of the embodiment mentioned above have been stored is supplied to a system or an apparatus, and a computer (or a CPU or an MPU) of the system or apparatus reads out and executes the program codes stored in the memory medium. In this case, the program codes themselves read out from the memory medium realize the functions of the embodiment mentioned above. The memory medium in which the program codes have been stored constructs the invention.

As a memory medium for supplying the program codes, for example, it is possible to use a floppy (registered trademark) disk, a hard disk, an optical disk, a magnetooptic disk, a CD-ROM, a CD-R, a magnetic tape, a non-volatile memory card, a ROM, or the like.

The invention incorporates not only a case where a computer executes the read-out program codes, so that the functions of the embodiment mentioned above are realized, but also a case where an OS (operating system) or the like which is operating on the computer executes a part or all of the actual processes on the basis of instructions of the program codes, and the functions of the embodiment mentioned above are realized.

Further, the invention also incorporates a case where the program codes read out from the memory medium are written into a memory equipped for a function expanding board inserted into a computer or a function expanding unit connected to a computer, and thereafter, a CPU or the like provided for the function expanding board or function expanding unit executes a part or all of the actual processes on the basis of instructions of the program codes, and the functions of the embodiment mentioned above are realized by those processes.

The program codes in this instance may be MPU native codes, codes which have been described in a predetermined interpreter language and are converted into the MPU native codes at the run time, or codes which are script data described in a predetermined format and interpreted and executed by the operating system or the like.

As described in detail above, according to the first embodiment, the state of the engine unit is emulated from the command signal and control signal which are generated by the controller unit which forms the output image data and constructs the image output apparatus in cooperation with the engine unit for outputting the formed output image data to the media, and the proper status signal and control signal can be generated. Thus, the verification of the timing process and processing speed of the controller unit can be made even in a situation where the engine unit is not completed, so that a developing speed of the image output apparatus can be improved and developing costs can be reduced.

A variation of the first embodiment will now be described.

Explanation will be made also by using FIGS. 1 to 6 used in the first embodiment.

FIG. 7 is a flowchart for a program of the real-time analyzing process which is executed by the image processing apparatus in FIG. 1.

All software shown by this flowchart is software which operates on the general computer 24. This software provides a GUI to the user and controls the interface unit 22.

In FIG. 7, when this software is activated, an initializing process is executed (step S701). This initializing process executes not only initialization of variables or the like regarding the software but also an initializing process of hardware such as setting or the like of a register regarding the video data control unit 32.

In subsequent step S702, an initial picture plane of FIG. 21, which will be explained hereinlater, is displayed by the CRT 25.

FIG. 21 is an explanatory diagram of the initial picture plane on the CRT 25 which is displayed in step S702 in FIG. 7.

In FIG. 21, reference numeral 2101 denotes the image display area. The image data which is formed by the printer controller is displayed in this area. First, the user designates a size and a color space of the image data to be displayed. Reference numeral 2182 denotes a combo box for designating a paper size. The number of pixels in the main scan, a start position of the main scan, the number of lines in the sub-scan, and a start position of the sub-scan corresponding to the preset paper size are set in the area 2182. Reference numeral 2183 denotes a button for displaying a user interface for setting details. By pressing the button 2183, the details setting window shown in FIG. 22 is displayed. Preset parameters can be changed here.

Returning to FIG. 7, when a change in image size is instructed (YES in step S703), parameters are set so as to display the designated image data (step S704). After that, step S705 follows. The video data control unit 32 holds only the image data of a valid area in the image memory in accordance with the set parameters.

When a change in display color space is instructed (YES in step S705), parameters are set so as to display the designated image data (step S706). After that, step S707 follows. As a display color space, one of five kinds of display color spaces of a color, a C plane, an M plane, a Y plane, and a K plane can be selected (radio button 2184). Since the image data which is outputted by the printer controller usually corresponds to the CMYK color space, if the color is selected here, CMYK image data accumulated in the image memory is extracted, color-converted into RGB data, and subsequently displayed in the display area. In case of displaying the C/M/Y/K plane, only necessary color plane data is extracted from the image memory and displayed. After completion of the setting of the image size and the display color space as mentioned above, the actual image fetching operation can be started. Since default values have been set into those parameters, there is no need to reset them if it is not necessary.

In step S707, whether the depression of start button 2185 has been detected or not is discriminated. If it is not detected, the processes in step S703 and subsequent steps are repeated. If it has been detected, the start of the image data obtaining operation is set into the control unit via the software of the manager layer by the application software. Simultaneously with the setting of a process start register of the video data control unit 32, the page-end interrupting process in FIG. 10, which will be explained hereinlater, to the present software is validated (step S708).

The page-end interrupting process is executed for allowing the video data control unit 32 to notify the software of the completion of the accumulation of the image data of one page. After the page-end interruption is validated, the present software keeps waiting for this interrupting process until stop button 2186 is pressed.

FIG. 10 is the flowchart for the page-end interrupting process which is validated in step S708 in FIG. 7.

In FIG. 10, first, whether the color display has been designated as a display color space or not, e.g., using radio button 2184, is discriminated (step S1002). If the color display is not designated, while the designated plane is reduction-converted, the image data accumulated in the image memory is transferred onto a work memory of the general computer 24 (step S1003). Since the size of image display area is often smaller than that of the image data which is outputted from the printer controller, the image data is extracted while it is reduction-converted. Specifically speaking, the high precision image data in which the number of pixels in the main scan is equal to 4864 pixels, the number of lines in the sub-scan is equal to 6849 pixels, and the like and which has been accumulated in the image memory is reduced into ⅛, so that the image data of 608 pixels×856 lines is transferred to the personal computer. Further, in this instance, in order to suppress the influence of aliasing noise or the like due to the sub-sampling, a band limitation is made in a predetermined space filter. Owing to the reduction conversion here, the amount of data which is transferred from the image memory to the image display apparatus is reduced, and high speed operation can be realized. By further reducing the display area, operation at a still higher speed can also be realized. As image data to be extracted, if the display image color space has been set to the C/M/Y/K plane, only the designated plane is extracted. In a case of displaying only the designated plane, since the data transfer amount and an amount of processes are smaller than those in a case of color-displaying, the processing ability which is required of the general computer 24 can be lowered. Further, the data of each plane can be observed as it is, plane by plane, as data formed by the controller.

In subsequent step S1005, a negative/positive inverting process is executed in order to improve ease of look, and the inverted image plane is displayed in the image display area (step S1007). The number of displayed image pages, that is, the number of printed pages is displayed in a window 809 (step S1008). The negative/positive inversion in step S1007 can also be omitted if it is not necessary.

If it is judged that the color display is not designated as a result of the discrimination in step S1002, the image data of each of the CMYK planes is extracted at a predetermined reduction magnification (step S1004). A color converting process is executed on the extracted image data (step S1006). After that, steps S1007 and S1008 are executed.

According to the color converting process in step S1006, the CMYK image data is converted into the RGB image data for display by means of general converting equations. Examples of the converting equations for color conversion are shown below:

$$R=1-(C+K)$$

$$G=1-(M+K)$$

$$B=1-(Y+K)$$

The RGB image data obtained by means of those converting equations is color-displayed into the image display area in step S1007. In the case of the color display, since there is a difference of the color converting processes, a difference of color reproducibility between a printer engine and a display device such as a CRT, or the like, a CMYK image which is formed by the controller is not reproduced as it is. However, since it is reproduced as a color image, the color converting process is effective in revealing an obvious rasterization error or the like.

By the processes in FIG. 10, in accordance with the occurrence of the page-end interruption, in a manner similar to the output to the paper in the case where the printer engine is connected, the image data which is rasterized by the printer controller can be displayed to the display unit in a real-time manner.

Returning to FIG. 7, when the user presses the stop button (YES in step S709), the application software inhibits the generation of the interrupting process via the manager software and the driver software and instructs the video data control unit 32 to stop the printer emulating process for the printer command. At this time, the system operates in the offline analyzing mode in FIG. 18. In the offline analyzing mode, the function for analyzing the image data of the last page accumulated in the image memory upon operation in the real-time analyzing mode is provided.

FIG. 18 is the explanatory diagram of the display picture plane on the CRT 25 in the offline analyzing mode.

The image of the last page is displayed in the image display area 1801. In a case of the offline analyzing mode, the button for promoting the operation such as enlarging/reducing function 1802, data storing function 1803, log display function 1804, or the like is validated.

FIGS. 19A and 19B are a flowchart for the offline analyzing process which is executed after completion of the process in FIG. 7.

In FIGS. 19A and 19B, when a change in display color space is instructed (YES in step S1901), an image reobtainment displaying process in FIG. 20, which will be explained hereinlater, is executed (step S1902). Step S1903 follows.

FIG. 20 is the flowchart for the image reobtainment displaying process in step S1902 in FIGS. 19A and 19B.

According to this process, image data of a desired plane reduced to a predetermined magnification is transferred from the image memory and displayed in the display area.

In FIG. 20, first, whether the color display has been designated as a display color space or not, is discriminated (step S2002). If the color display is not designated but the C/M/Y/K independent plane is designated, while only the image data of the designated plane is reduction-converted at a desired reduction magnification, it is transferred into a memory device of the general computer 24 (step S2003). The transferred image data is negative/positive converted (step S2004). After that, it is displayed as monochromatic gray scale image data into the image display area (step S2007).

If it is judged that the color display is designated as a result of the discrimination in step S2002, while the image data of each of the CMYK planes is reduced to a predetermined magnification, it is transferred to a storing device of the personal computer (step S2005). The color converting process is executed on the transferred image data (step S2006). The obtained RGB data is displayed in the image display area (step S2007).

Returning to FIGS. 19A and 19B, when the enlarge button is pressed (YES in step S1903), the image reobtainment displaying process in FIG. 20 is executed (step S1902) and step S1905 follows. By the user pressing the enlarge button once, the image data enlarged by +10% is retransferred from the image memory. Also in this case, the necessary image data is transferred from the image memory at a predetermined reduction magnification in step S1902.

FIG. 21 is the explanatory diagram of the display picture plane on the CRT 25 which is displayed when the enlarge button is pressed in step S1903 in FIGS. 19A and 19B.

The image data of high resolution is transferred and displayed by an image display area 2101. In this case, since it is not possible for the entire image to be displayed at one time inside of the image display area, a scroll bar 2102 is automatically displayed. By the user operating the scroll bar, the whole image can be confirmed.

Returning to FIGS. 19A and 19B, when the reduce button is pressed (YES in step S1905), the image reobtainment displaying process in FIG. 20 is executed (step S1902) and step S1907 follows. By the user pressing the reduce button once, the image data reduced by 10% is retransferred from the image memory.

Subsequently, when the whole display button is pressed (YES in step S1907), the image reobtainment displaying process in FIG. 20 is executed (step S1902) and step S1909 follows. By the user pressing the whole display button, the image data is retransferred from the image memory at the reduction magnification at which the whole image can be displayed in the image display area. Further, the enlargement display by the area designation by the mouse is also possible as shown in FIG. 21.

FIG. 22 is the diagram showing a state of the area designation by the mouse. Reference numeral 2201 denotes the designated area. The data is retransferred from the image memory at the magnification at which this area is displayed in the whole image display area.

Processing steps regarding the operation by means of the mouse are not shown in the flowchart of FIGS. 19A and 19B.

Subsequently, when the user presses the store button (YES in step S1909), whether the display color space has been set to the color display or not is discriminated (step S1910).

When the store button is pressed, for example, if the display color space has been set to the color display, a display picture plane on the CRT 25 is as shown in FIG. 23 (storage in the TIFF (CMYK) format).

If the display color space has been set to the color display as a result of the discrimination in step S1910, the CMYK image data of all colors accumulated in the image memory is transferred to the main storing unit of the general computer 24 (step S1913), filed in the TIFF (CMYK) format, and recorded onto the hard disk or the like of the general computer 24 (step S1914).

If the designation of the C/M/Y/K plane is set instead of the color as a result of the discrimination in step S1910, only the whole image data of the designated plane is transferred from the image memory to the main storing unit of the general computer 24 (step S1911) and recorded as a DIB format image file of the monochromatic (BMP) gray scale (step S1912). By this process, the image data which was rasterized by the printer controller can be filed in a general format in accordance with the display color space of the image data displayed in the display area. Thus, the image data can be also analyzed by using another analyzing tool or the like.

In subsequent step S1915, when the log display button is pressed (YES in step S1915), the video data control unit 32 stores a command train (commands issued from the printer controller) into a predesignated area on the image memory at the time of the real-time analyzing operation (step S1916). The accumulated command train is transferred to the general computer and displayed (step S1917).

When the log analysis button is pressed, the display picture plane on the CRT 25 becomes as shown in FIG. 24. The received command train is displayed as it is by the hexadecimal indication. By confirming the command train which is issued by the printer controller, whether the printer controller is operating normally or not or the like can be verified.

In the offline analyzing mode, those analyzing operations can be performed on the image data accumulated in the image memory. Thus, the verification or the like of a pixel level unit for the image data can be achieved by means of an easy operation immediately after the stop of the real-time analyzing mode. That is, a situation of the continuous operation in the real-time analyzing mode is observed and, if it is determined that an abnormality has occurred, merely by pressing the stop button, the target image data can be analyzed in detail in an offline manner.

Subsequently, when the start button is pressed (YES in step S1921), the processing routine advances to step S2908 in FIG. 29 in order to immediately shift the operating mode to the real-time analyzing mode. When it is shifted to the real-time analyzing mode, in a manner similar to that upon activation, the raster image data which is outputted by the printer controller is accumulated into the image memory and displayed to the image display unit in a real-time manner in accordance with the page-end interrupting process.

By the above operation, while the operating mode is shifted to the real-time analyzing mode or the offline analyzing mode at arbitrary timing, the verifying operation of the printer controller can be repeatedly executed by means of an simple operation.

Although the foregoing variation of the first embodiment has been described with respect to the case where the laser beam printer is used as a target printer, the invention is not limited to it but can be used for development of various printer controllers or the like such as a bubble jet (registered trademark) type printer and the like. In this case, by changing the video interface unit in accordance with a video interface system of the printer or the like, the invention can be used for development of various printer controllers.

Although the above embodiment has been described with respect to the case where the hexadecimal data is displayed as it is as a display example of the print command log, the command can also be decoded and displayed so that it can be more easily understood in accordance with a command table. Further, a user interface for returning an error response such as no paper, jam, or the like can be also provided (FIG. 26). In this case, an error response (in this case, "no paper", "jam", "failure of mechanism") designated, for example, at the time of the print of the nth paper or at random timing is generated. That is, it is set so as to generate the error factor designated at predetermined designated generation timing. Thus, not only the verification of the rasterizing function of the printer controller but also the verification of the response processing function to the printer command can be made.

By the second embodiment mentioned above, when the image output apparatus comprising the controller unit for forming the output image data and the engine unit for outputting the output image data to the media such as paper or the like is developed, the image processing apparatus which visualizes the image data formed by the controller unit in a real-time manner by using it in place of the engine unit can be provided. Thus, even in a situation that the engine unit is not completed, the verifying operation of the controller unit can be made. The developing speed can be improved and the developing cost can be reduced. Further, the data formed by the controller unit can be analyzed on the display apparatus. The analysis of the pixel level which cannot be discriminated from the print result can be performed by the simple operation.

Second Embodiment

The second embodiment will now be described.

Explanation will be made also by using FIGS. 1 to 6 used in describing the first embodiment.

Figure 29:
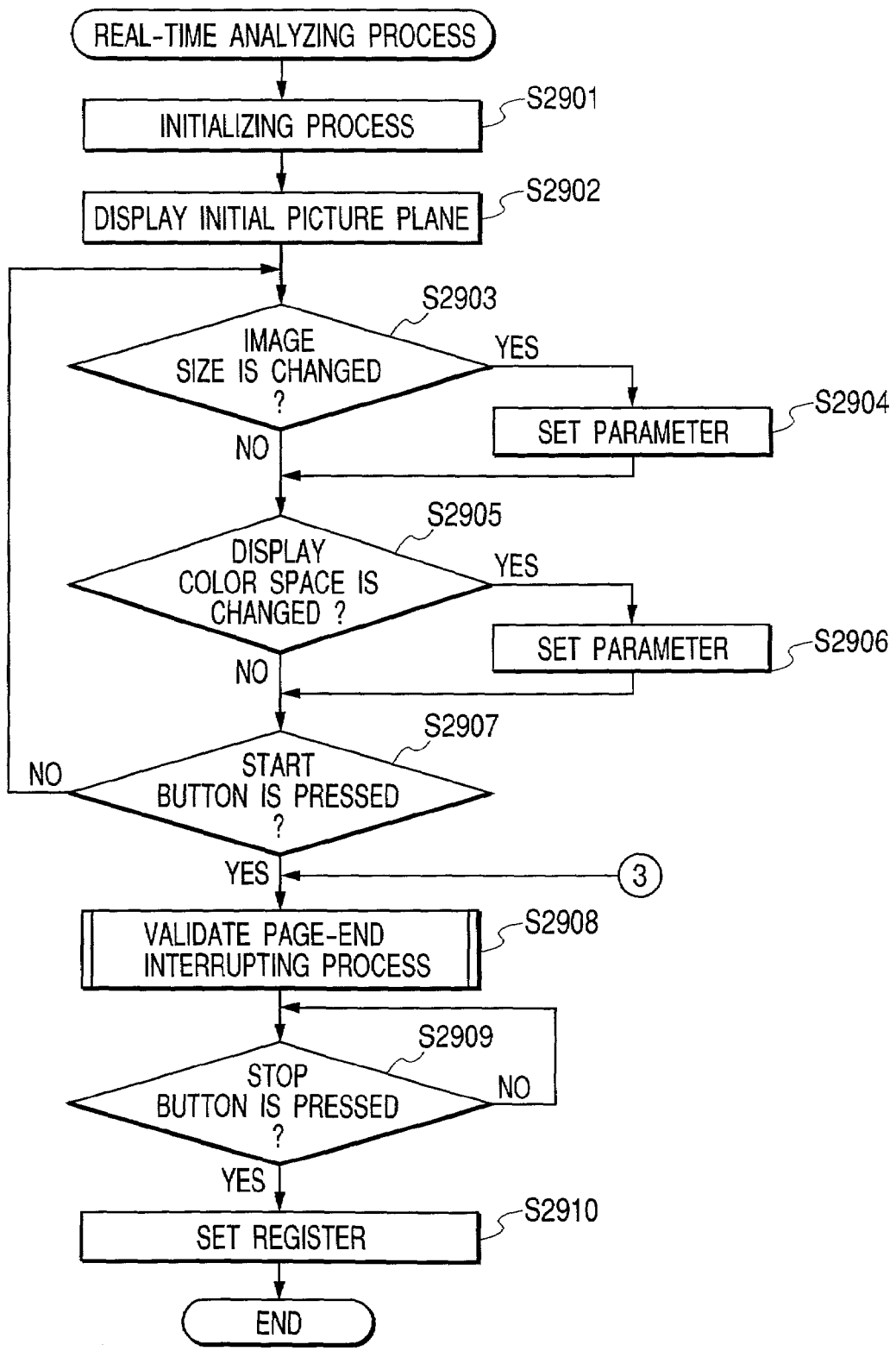
FIG. 29 is a flowchart for an image processing apparatus according to the second embodiment.

FIG. 29 is a flowchart for a program of the real-time analyzing process which is executed by the image processing apparatus in FIG. 1.

All software shown by this flowchart is software which operates on the general computer 24. This software provides a GUI to the user and controls the interface unit 22.

In FIG. 29, when this software is activated, an initializing process is executed (step S2901). This initializing process executes not only the initialization of variables or the like regarding the software but also the initializing process of hardware such as setting or the like of a register regarding the video data control unit 32.

In subsequent step S2902, an initial picture plane of FIG. 33, which will be explained hereinlater, is displayed by the CRT 25.

Figure 33:
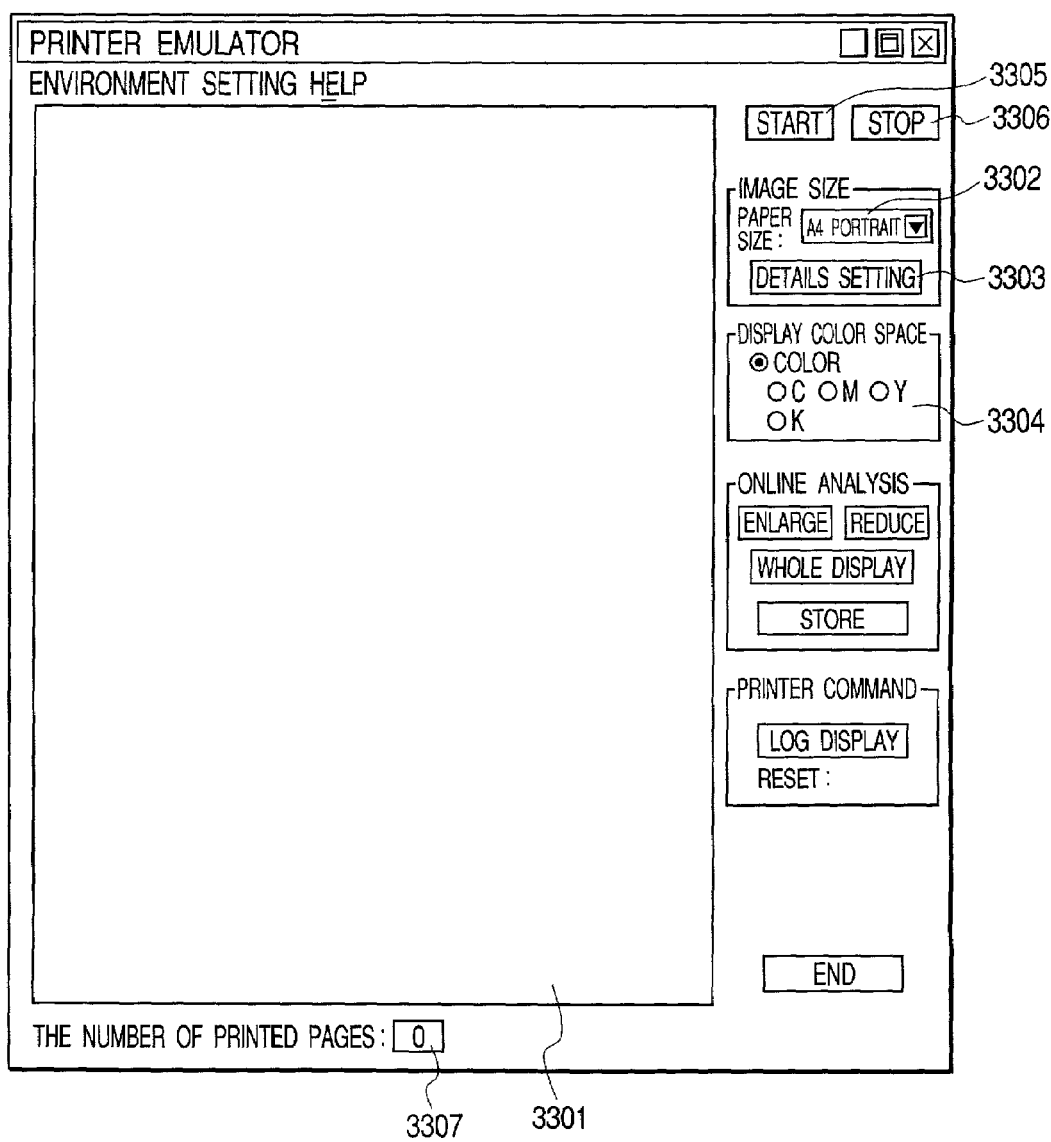
FIG. 33 is a diagram showing display examples of the image processing apparatus in the second embodiment.

FIG. 33 is an explanatory diagram of the initial picture plane on the CRT 25 which is displayed in step S2902 in FIG. 29.

In FIG. 33, reference numeral 3301 denotes an image display area. The image data which is formed by the printer controller is displayed in this area. First, the user designates a size and a color space of the image data to be displayed, using a radio button 3304 provided for that purpose. Reference numeral 3302 denotes a combo box for designating a paper size. The number of pixels in the main scan, a start position of the main scan, the number of lines in the sub-scan, and a start position of the sub-scan corresponding to the preset paper size are set in the area 3302. Reference numeral 3303 denotes a button for displaying a user interface for setting details. By the user pressing the button 3303, a details setting window shown in FIG. 34 is displayed. Preset parameters can be changed here. In addition, at 3307 an indication of the number of pages printed is provided.

Returning to FIG. 29, when a change in image size is instructed (YES in step S2903), parameters are set so as to display the designated image data (step S2904). After that, step S2905 follows. The video data control unit 32 holds only the image data of a valid area into the image memory in accordance with the set parameters.

When a change in display color space is instructed (YES in step S2905), parameters are set so as to display the designated image data (step S2906). After that, step S2907 follows. As a display color space, one of five kinds of display color spaces of a color, a C plane, an M plane, a Y plane, and a K plane can be selected (radio button 3304). Since the image data which is outputted by the printer controller usually corresponds to a CMYK color space, if the color is selected here, CMYK image data accumulated in the image memory is extracted, color-converted into RGB data, and subsequently displayed in the display area. In the case of displaying the C/M/Y/K plane, only necessary color plane data is extracted from the image memory and displayed. After completion of the setting of the image size and the display color space as mentioned above, the actual image fetching operation can be started. Since default values have been set into those parameters, there is no need to reset them unless it is inappropriate to use the default values. In addition, pages printed can be indicated at 3307.

In step S2907, whether the depression of start button 3305 has been detected or not is discriminated. If it is not detected, the processes in step S2903 and subsequent steps are repeated. If it has been detected, the start of the image data obtaining operation is set into the control unit via the software of the manager layer by the application software. Simultaneously with the setting of a process start register of the video data control unit 32, a page-end interrupting process (steps S3101 et seq.) in FIG. 31, which will be explained hereinlater, of interrupting the present software is validated (step S2908).

The page-end interrupting process is executed to allow the video data control unit 32 to notify the software of the completion of the accumulation of the image data of one page. After the page-end interruption is validated, the present software keeps waiting for this interrupting process until a stop button 3306 is pressed, at which time, the register is set as indicated by step S2910.

Figure 31:
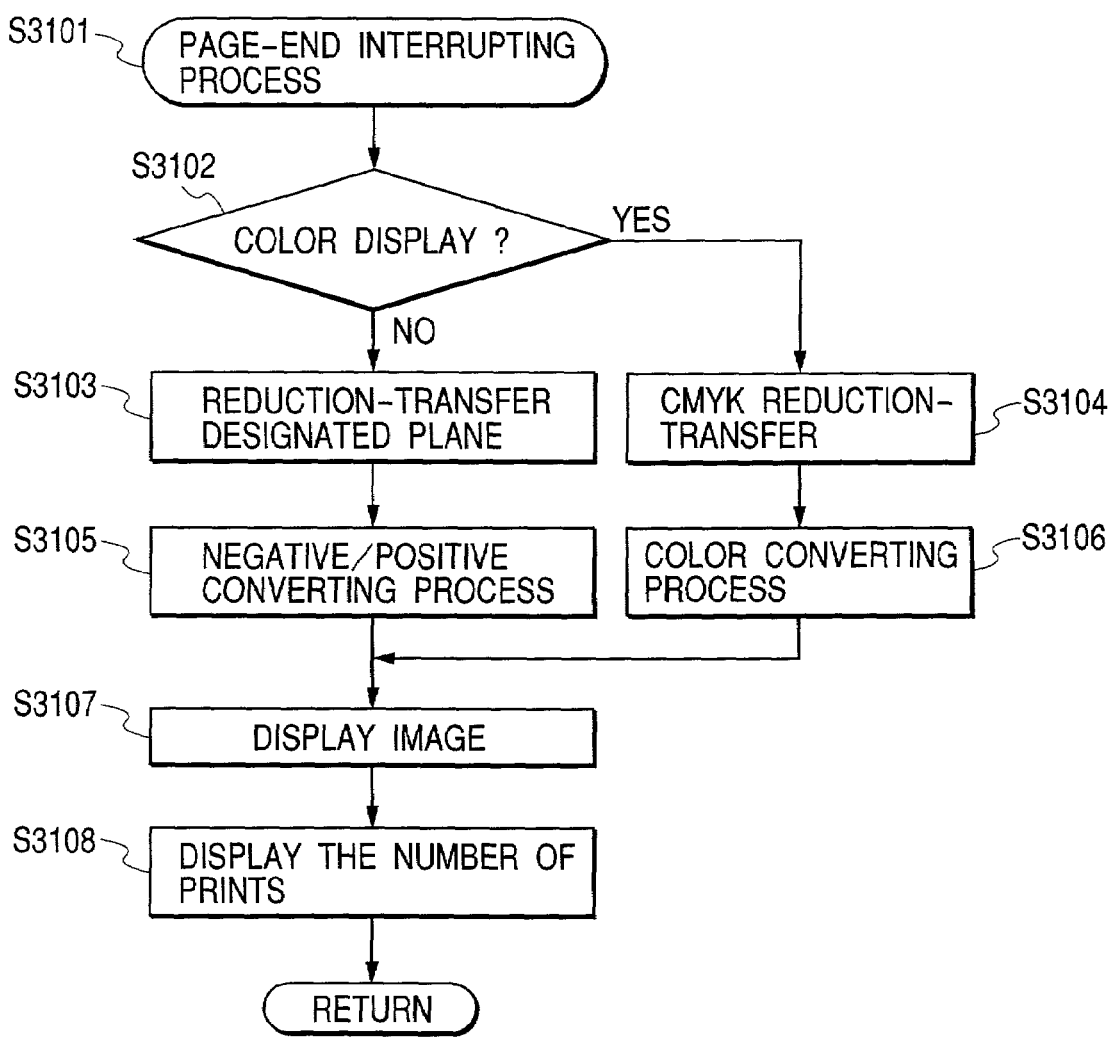
FIG. 31 is a flowchart for an image processing apparatus according to the second embodiment.

FIG. 31 is a flowchart for the page-end interrupting process which is validated in step S2908 in FIG. 29.

In FIG. 31, first, whether the color display has been designated as a display color space or not is discriminated (step S3102). If the color display is not designated, while the designated plane is reduction-converted, the image data accumulated in the image memory is transferred into the work memory of the general computer 24 (step S3103). Since the size of the image display area is often smaller than that of the image data which is outputted from the printer controller, the image data is extracted while it is reduction-converted. Specifically speaking, the high precision image data in which the number of pixels in the main scan is equal to 4864 pixels, the number of lines in the sub-scan is equal to 6849 pixels, and the like and which has been accumulated in the image memory is reduced into ⅛, so that the image data of 608 pixels×856 lines is transferred to the personal computer. Further, in this instance, in order to suppress the influence of aliasing noise or the like due to the sub-sampling, a band limitation is made in a predetermined space filter. Owing to the reduction conversion here, the amount of data which is transferred from the image memory to the image display apparatus is reduced, and high speed operation can be realized. By further reducing the display area, operation at a still higher speed can also be realized. As image data to be extracted, if the display image color space has been set to the C/M/Y/K plane, only the designated plane is extracted. In the case of displaying only the designated plane, since the data transfer amount and the amount of processing are smaller than those in case of color-displaying, the processing ability which is required of the general computer 24 can be lowered. Further, the data of each plane can be observed as it is, plane by plane, as data formed by the controller.

In subsequent step S3105, a negative/positive inverting process is executed in order to improve ease of look, and the inverted image plane is displayed in the image display area (step S3107). The number of displayed image pages, that is, the number of printed pages, is displayed (step S3108). The negative/positive inversion in step S3107 can be also omitted if it is not necessary.

If it is judged that the color display is not designated as a result of the discrimination in step S3102, the image data of each of the CMYK planes is extracted at a predetermined reduction magnification, respectively (step S3104). A color converting process is executed on the extracted image data (step S3106). After that, steps S3107 and S3108 are executed.

According to the color converting process in step S3106, the CMYK image data is converted into the RGB image data for display by means of general converting equations. Examples of the converting equations for color conversion are shown below:

$$R=1-(C+K)$$

$$G=1-(M+K)$$

$$B=1-(Y+K)$$

The RGB image data obtained by those converting equations is color-displayed in the image display area in step S3107. In the case of color display, since there is a difference of the color converting processes, a difference of color reproducibility between a printer engine and a display device such as a CRT, or the like, a CMYK image which is formed by the controller is not reproduced as it is. However, since it is reproduced as a color image, the color converting process is effective in finding out an obvious rasterization error or the like.

By means of the processes in FIG. 31, in accordance with the occurrence of the page-end interruption, in a manner similar to the output to the paper in the case where the printer engine is connected, the image data which is rasterized by the printer controller can be displayed on the display unit in a real-time manner.

Returning to FIG. 29, when the user presses the stop button (YES in step S2909), the application software inhibits the generation of the interrupting process via the manager software and the driver software and instructs the video data control unit 32 to stop the printer emulating process for the printer command. At this time, the system operates in the offline analyzing mode in FIG. 35. In the offline analyzing mode, the function for analyzing the image data of the last page accumulated in the image memory upon operation in the real-time analyzing mode is provided.

Figure 35:
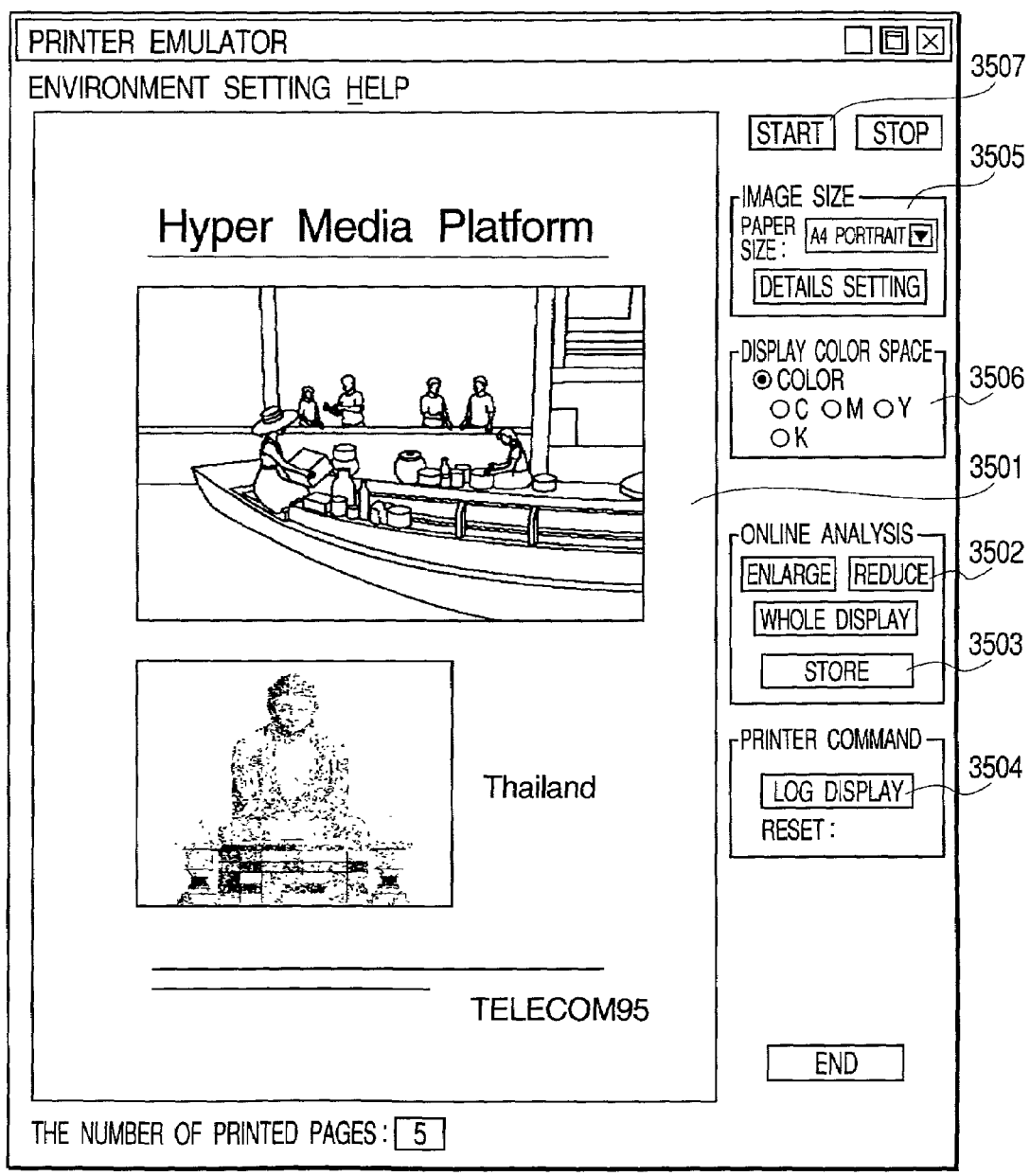
FIG. 35 is a diagram showing display examples of the image processing apparatus in the second embodiment.

FIG. 35 is an explanatory diagram of a display picture plane on the CRT 25 in the offline analyzing mode.

An image of the last page is displayed in an image display area 3501. In the case of the offline analyzing mode, a button for promoting the operation such as enlarging/reducing function 3502, data storing function 3503, log display function 3504, or the like is validated. The user can designate a size and a color space of the image data to be displayed, using a radio button 3506 provided for that purpose. Reference numeral 3505 denotes a combo box for designating a paper size, and 3507, a start button.

Figure 30:
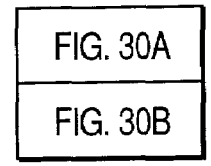
FIG. 30 is comprised of FIGS. 30A and 30B showing flowcharts for an image processing apparatus according to the second embodiment.
Figure 30A:
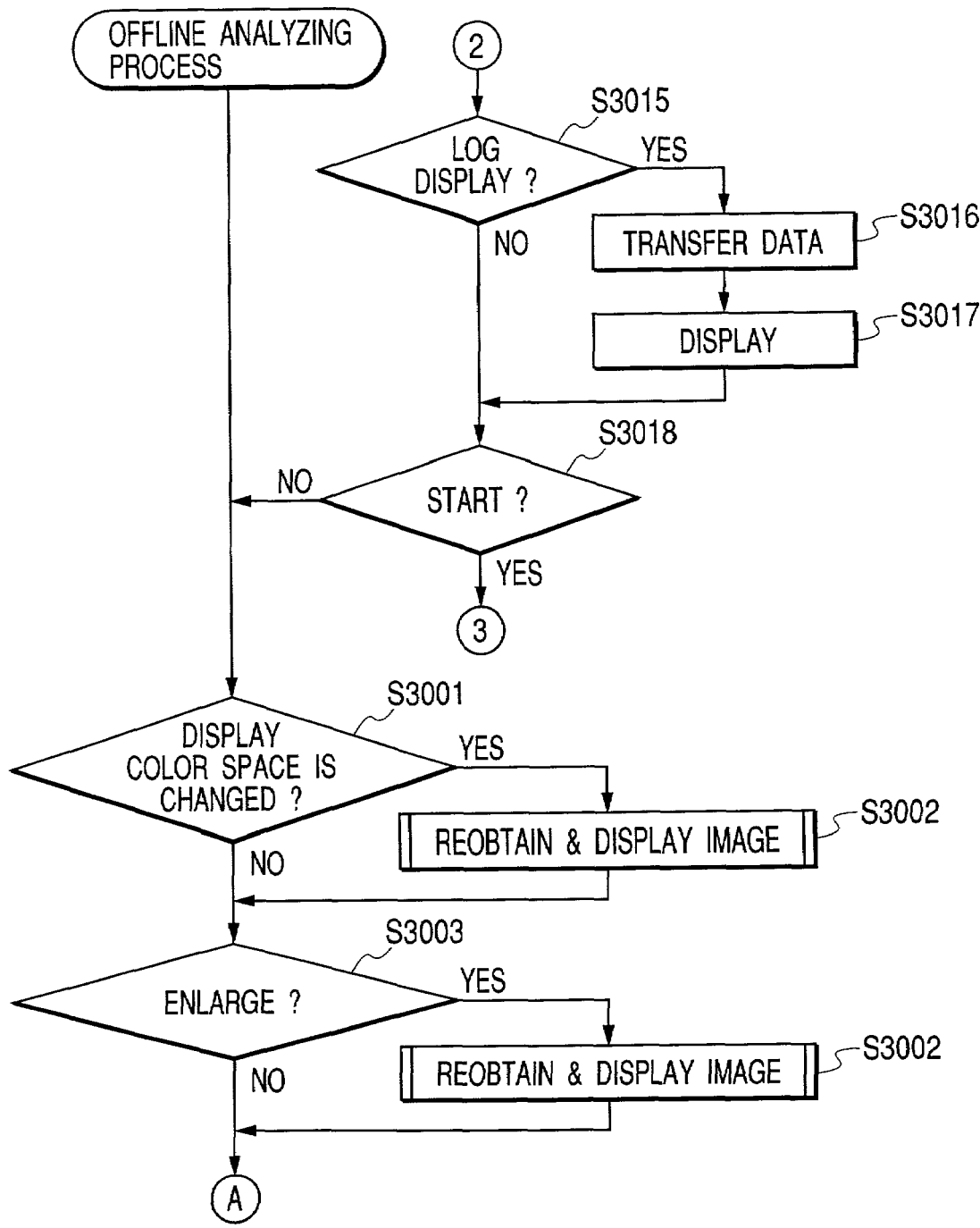
Figure 30B:
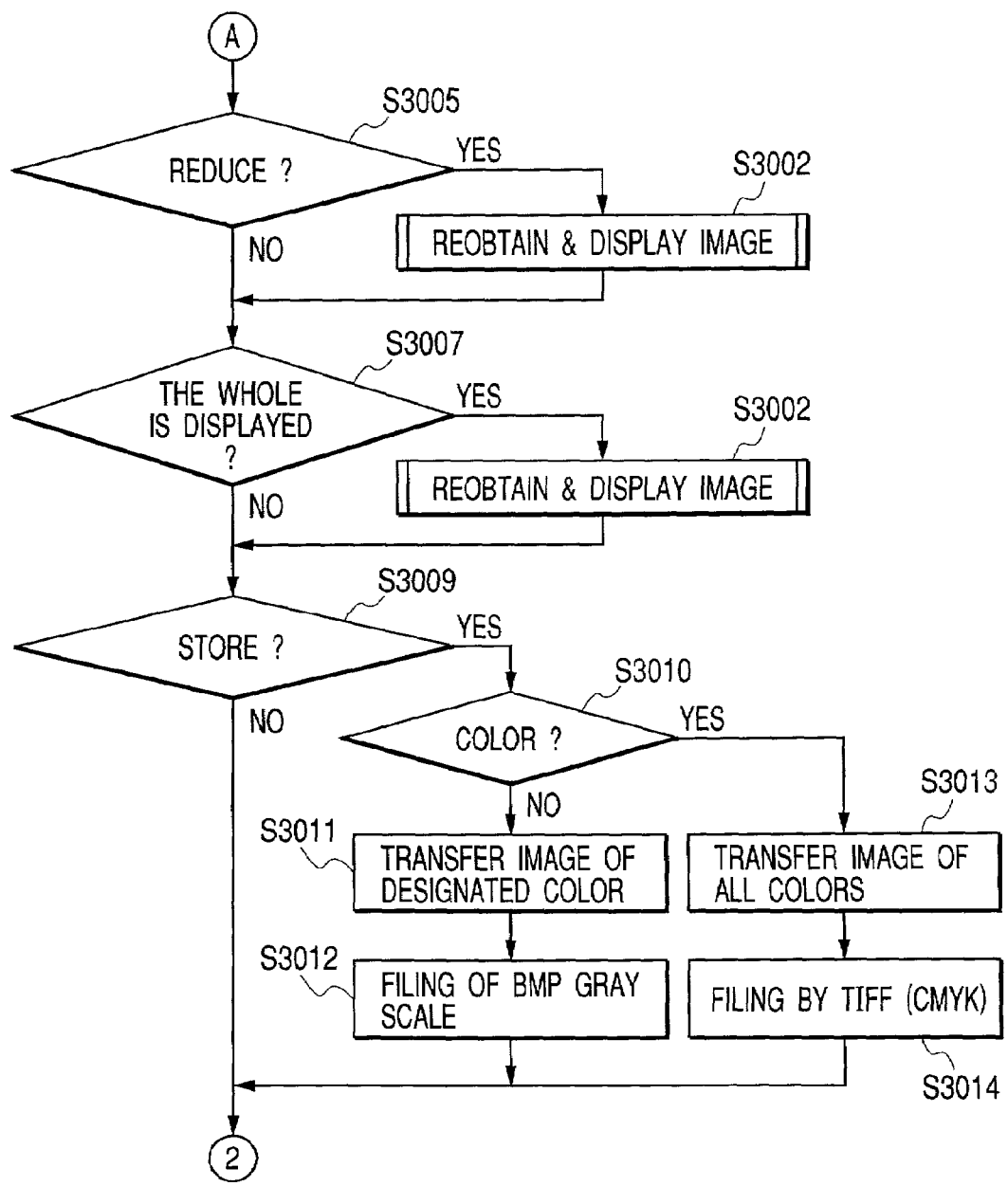

FIGS. 30A and 30B are a flowchart for the offline analyzing process which is executed after completion of the process in FIG. 29.

In FIGS. 30A and 30B, when a change in display color space is instructed (YES in step S3001), an image reobtainment displaying process in FIG. 32, which will be explained hereinlater, is executed (step S3002). Step S3003 follows.

Figure 32:
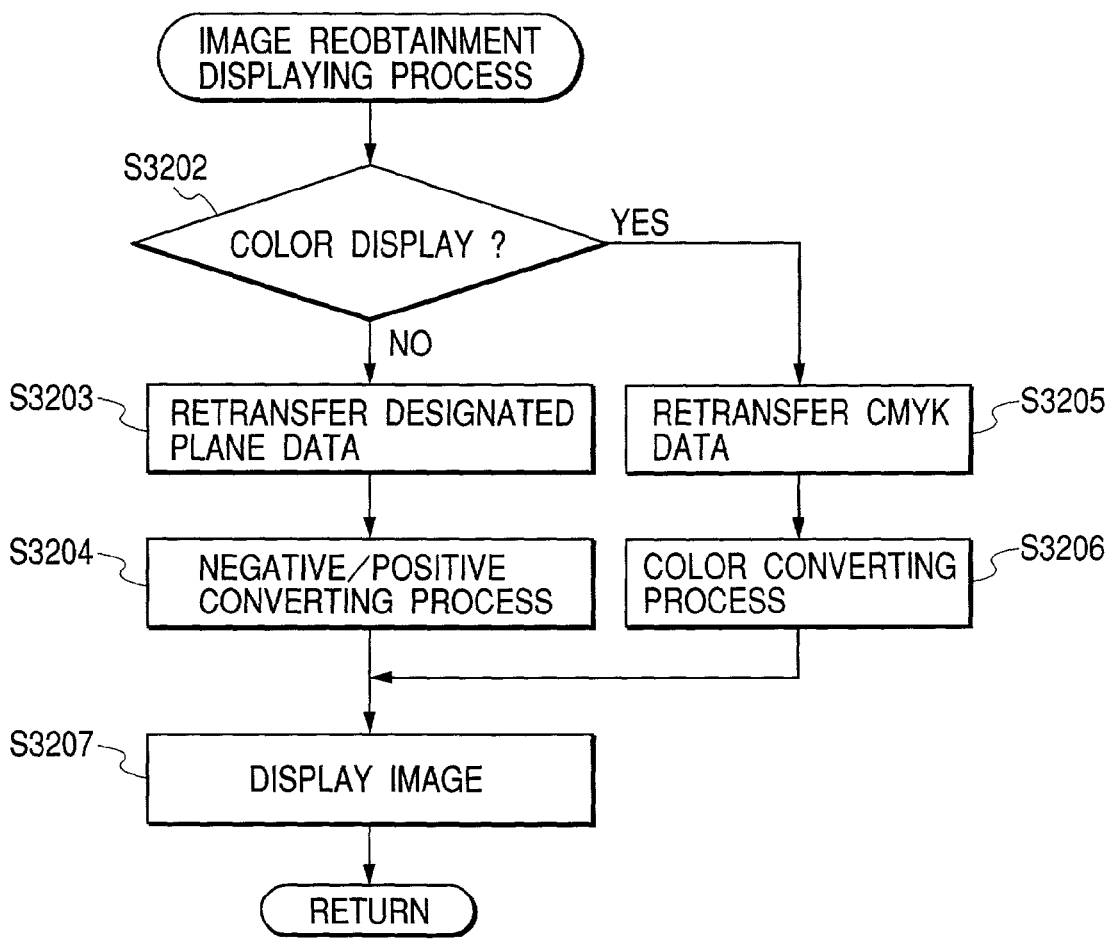
FIG. 32 is a flowchart for an image processing apparatus according to the second embodiment.

FIG. 32 is a flowchart for the image reobtainment displaying process in step S3002 in FIGS. 30A and 30B.

According to this process, image data of a desired plane reduced to a predetermined magnification is transferred from the image memory and displayed in the display area.

In FIG. 32, first, whether the color display has been designated as a display color space or not is discriminated (step S3202). If the color display is not designated but the C/M/Y/K independent plane is designated, while only the image data of the designated plane is reduction-converted at a desired reduction magnification, it is transferred into a memory device of the general computer 24 (step S3203). The transferred image data is negative/positive converted (step S3204). After that, it is displayed as monochromatic gray scale image data into the image display area (step S3207).

If it is judged that the color display is designated as a result of the discrimination in step S3202, while the image data of each of the CMYK planes is reduced to a predetermined magnification, it is transferred to the storing device of the personal computer (step S3205). The color converting process is executed on the transferred image data (step S3206). The obtained RGB data is displayed in the image display area (step S3207).

Returning to FIGS. 30A and 30B, when the enlarge button is pressed (YES in step S3003), the image reobtainment displaying process in FIG. 32 is executed (step S3002) and step S3005 follows. By the user pressing the enlarge button once, the image data enlarged by +10% is retransferred from the image memory. Also in this case, the necessary image data is transferred from the image memory at a predetermined reduction magnification in step S3002.

Figure 36:
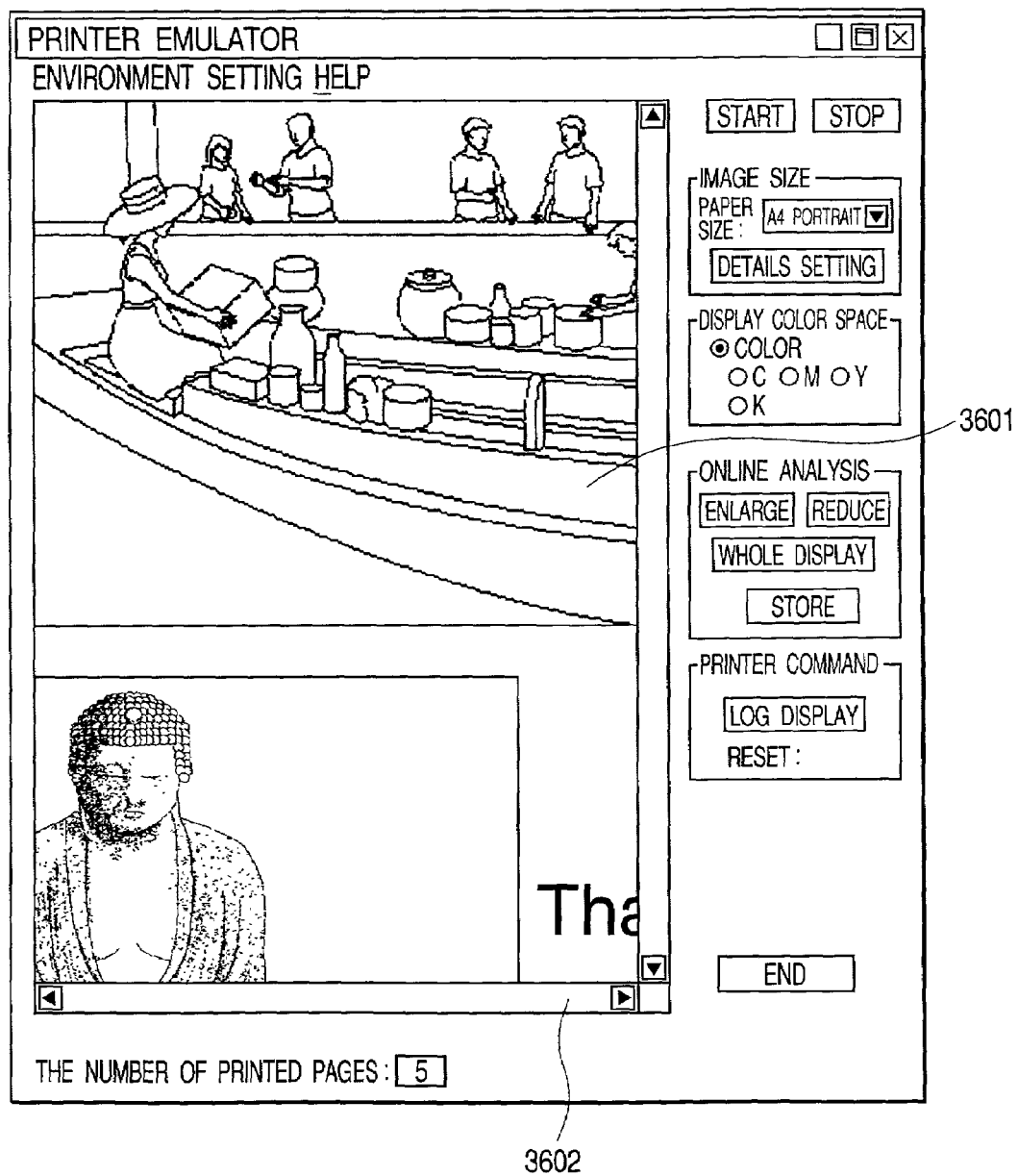
FIG. 36 is a diagram showing display examples of the image processing apparatus in the second embodiment.

FIG. 36 is the explanatory diagram of the display picture plane on the CRT 25 which is displayed when the enlarge button is pressed in step S3003 in FIGS. 30A and 30B.

The image data of high resolution is transferred and displayed by an image display area 3601. In this case, since it is not possible for the entire image to be displayed at one time inside of the image display area, a scroll bar 3602 is automatically displayed. By operating the scroll bar, the whole image can be confirmed.

Returning to FIGS. 30A and 30B, when the reduce button is pressed (YES in step S3005), the image reobtainment displaying process in FIG. 32 is executed (step S3002), and step S3007 follows. By the user pressing the reduce button once, the image data reduced by 10% is retransferred from the image memory.

Subsequently, when the whole display button is pressed (YES in step S3007), the image reobtainment displaying process in FIG. 32 is executed (step S3002) and step S3009 follows. By the user pressing the whole display button, the image data is retransferred from the image memory at the reduction magnification at which the whole image can be displayed in the image display area. Further, the enlargement display by the area designation by the mouse is also possible as shown in FIG. 37.

Figure 37:
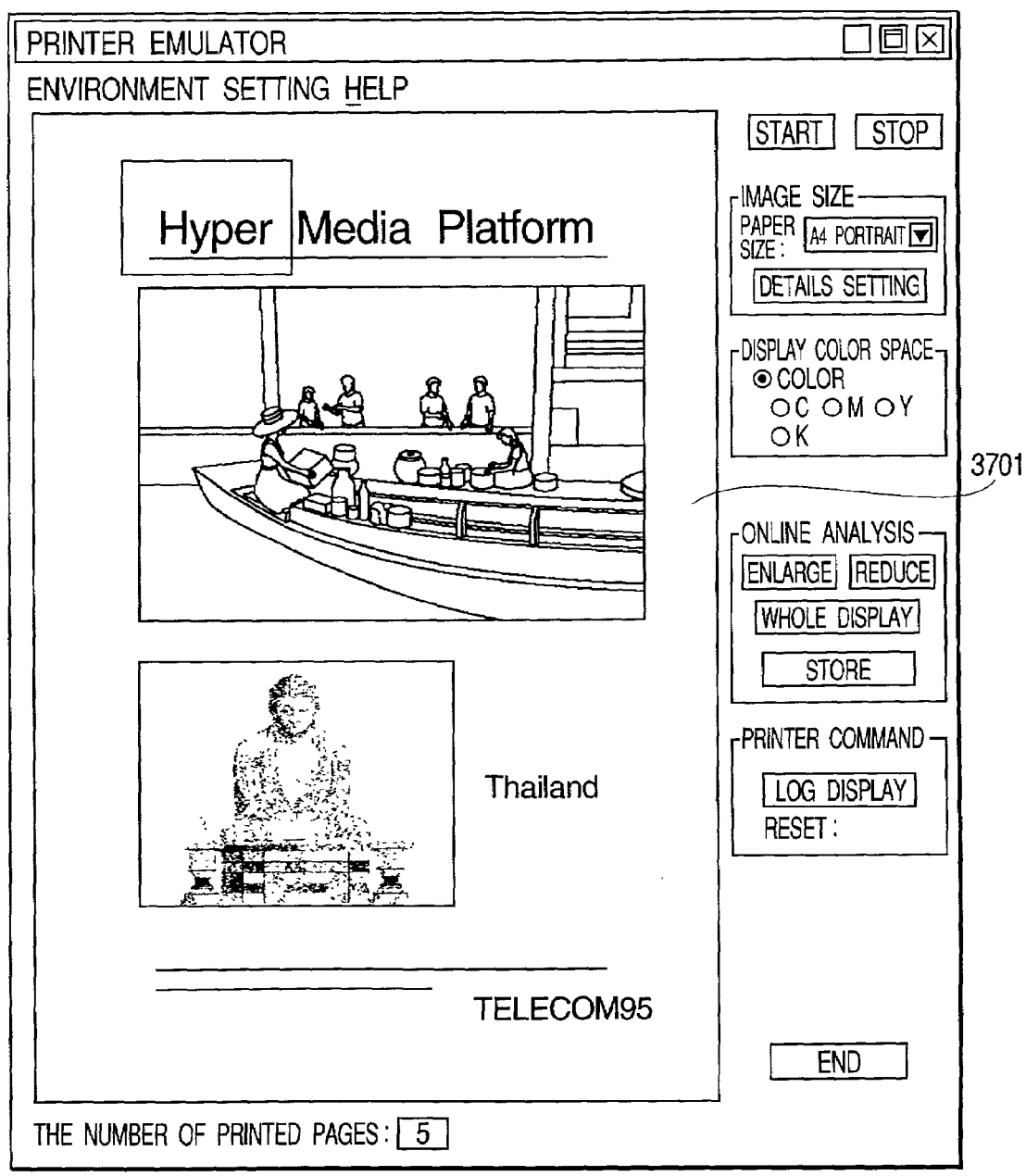
FIG. 37 is a diagram showing display examples of the image processing apparatus in the second embodiment.

FIG. 37 is a diagram showing a state of the area designation by the mouse. Reference numeral 3701 denotes a designated area. The data is retransferred from the image memory at the magnification at which this area is displayed in the whole image display area.

Processing steps regarding the operation by the mouse are not shown in the flowchart of FIGS. 30A and 30B.

Subsequently, when the user presses the store button (YES in step S3009), whether the display color space has been set to the color display or not is discriminated (step S3010).

Figure 38:
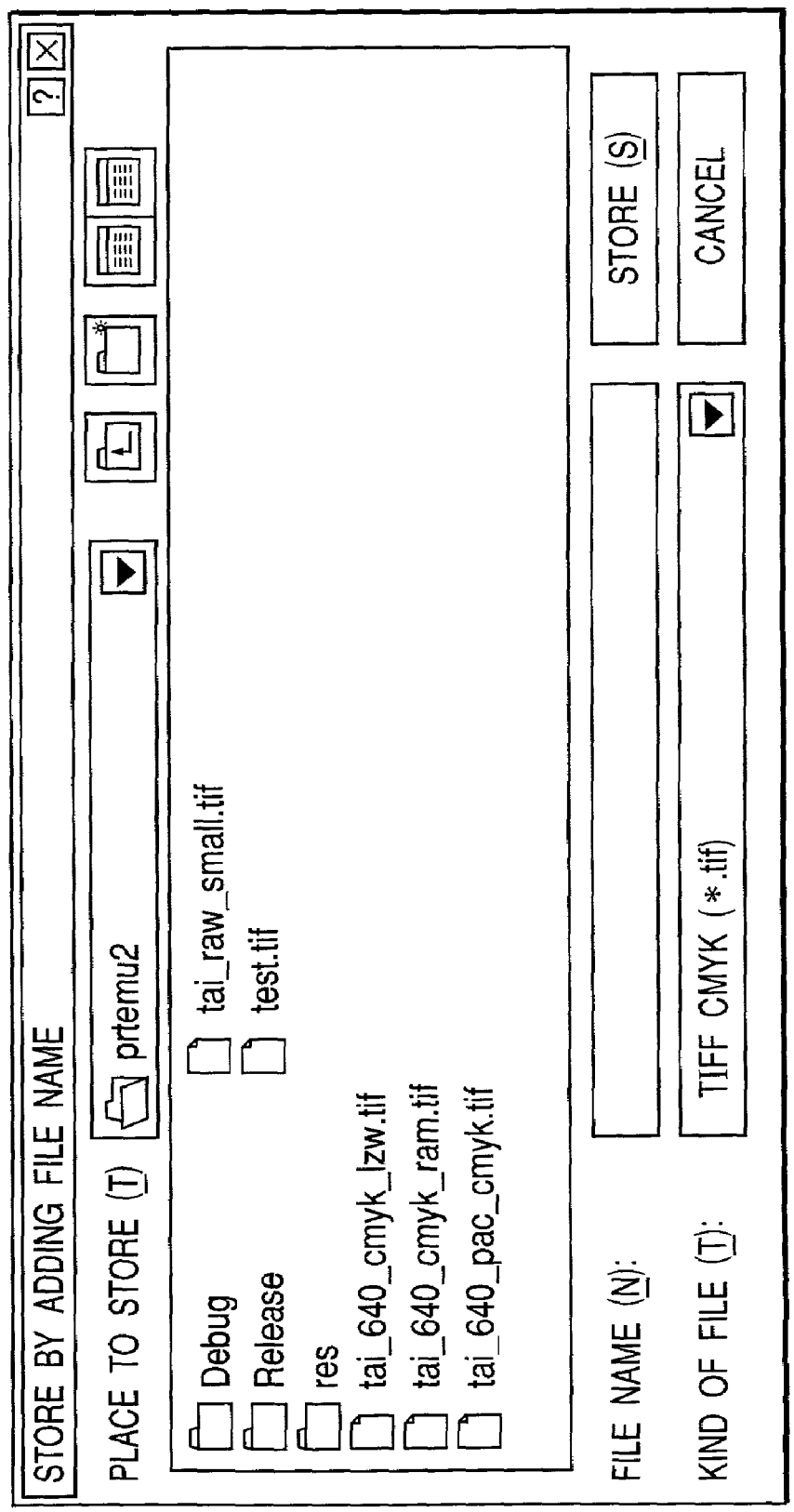
FIG. 38 is a diagram showing display examples of the image processing apparatus in the second embodiment.

When the store button is pressed, for example, if the display color space has been set to the color display, a display picture plane on the CRT 25 is as shown in FIG. 38 (storage in the TIFF (CMYK) format).

If the display color space has been set to the color display as a result of the discrimination in step S3010, the CMYK image data of all colors accumulated in the image memory is transferred to the main storing unit of the general computer 24 (step S3013), filed in the TIFF (CMYK) format, and recorded on the hard disk or the like of the general computer 24 (step S3014).

If it is judged that the designation of the C/M/Y/K plane is set instead of the color as a result of the discrimination in step S3010, only the whole image data of the designated plane is transferred from the image memory to the main storing unit of the general computer 24 (step S3011) and recorded as a DIB format image file of the monochromatic (BMP) gray scale (step S3012). By means of this process, the image data which was rasterized by the printer controller can be filed in a general format in accordance with the display color space of the image data displayed in the display area. Thus, the image data can be also analyzed by using another analyzing tool or the like.

In subsequent step S3015, when the log display button is pressed (YES in step S3015), the video data control unit 32 stores a command train (commands issued from the printer controller) into a predesignated area on the image memory at the time of the real-time analyzing operation (step S3016). The accumulated command train is transferred to the general computer and displayed (step S3017).

Figure 39:
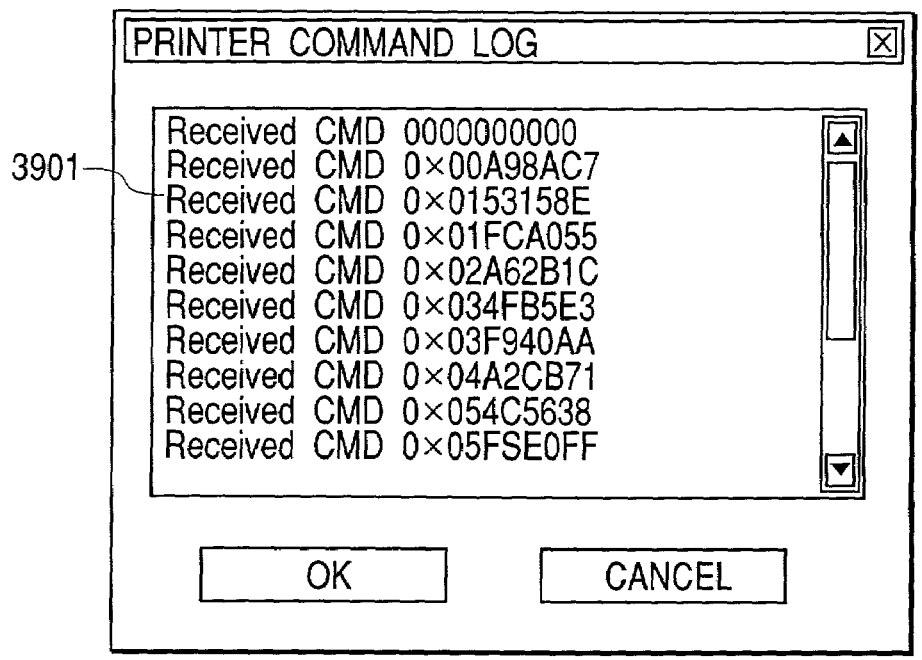
FIG. 39 is a diagram showing display examples of the image processing apparatus in the second embodiment.
Figure 40:
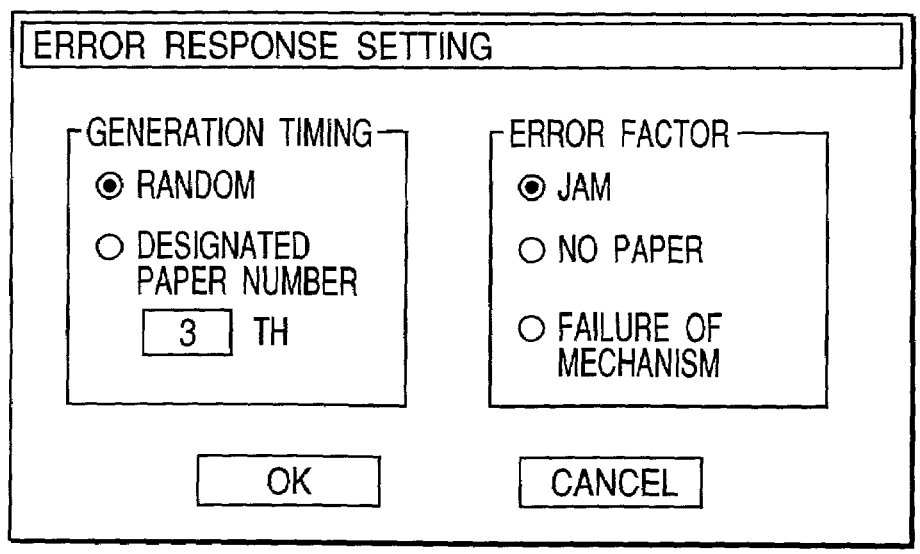
FIG. 40 is a diagram showing display examples of the image processing apparatus in the second embodiment.

When the log analysis button is pressed, the display picture plane on the CRT 25 becomes as shown in FIG. 39. The received command train is displayed as it is by the hexadecimal indication. By confirming the command train which is issued by the printer controller, whether the printer controller is operating normally or not or the like can be verified.

In the offline analyzing mode, those analyzing operations can be performed on the image data accumulated in the image memory. Thus, the verification or the like of a pixel level unit for the image data can be performed by means of an easy operation immediately after the stop of the real-time analyzing mode. That is, a situation of the continuous operation in the real-time analyzing mode is observed and, if it is determined that an abnormality has occurred, merely by the user pressing the stop button, the target image data can be analyzed in detail in an offline manner.

Subsequently, when the start button is pressed (YES in step S3018), the processing routine advances to step S2908 in order immediately to shift the operating mode to the real-time analyzing mode. When it is shifted to the real-time analyzing mode, in a manner similar to that upon activation, the raster image data which is outputted by the printer controller is accumulated into the image memory and displayed to the image display unit in a real-time manner in accordance with the page-end interrupting process.

By the above operation, while the operating mode is shifted to the real-time analyzing mode or the offline analyzing mode at arbitrary timing, the verifying operation of the printer controller can be repeatedly executed by means of a simple operation.

Although the second embodiment has been described with respect to the case where the laser beam printer is used as a target printer, the invention is not limited to it but can be used for development of various printer controllers or the like such as a bubble jet (registered trademark) type printer and the like. In this case, by changing the video interface unit in accordance with a video interface system of the printer or the like, the invention can be used for development of various printer controllers.

Although the above embodiment has been described with respect to the case where the hexadecimal data is displayed as it is as a display example of the print command log, the command can be also decoded and displayed so that it can be more easily understood in accordance with a command table. Further, a user interface for returning an error response such as no paper, jam, or the like can be also provided (FIG. 26). In this case, an error response (in this case, "no paper", "jam", "failure of mechanism") designated, for example, at the time of the print of the nth paper or at random timing is generated. That is, it is set so as to generate the error factor designated at predetermined designated generation timing. Thus, not only the verification of the rasterizing function of the printer controller but also the verification of the response processing function to the printer command can be made.

Although the present embodiment has been described with respect to the case of using Windows™ of Microsoft Corporation in U.S.A. as an operating system, the invention is not limited to it but can also be implemented in various environments.

Although the present embodiment has been described with respect to the case of constructing the system by combining with the personal computer, the invention is not limited to it but can be also realized by combining other various apparatuses.

The object of the invention is also accomplished by a method whereby a memory medium in which program codes of the software for realizing the functions of the embodiment mentioned above have been stored is supplied to a system or an apparatus, and a computer (or a CPU or an MPU) of the system or apparatus reads out and executes the program codes stored in the memory medium. In this case, the program codes themselves read out from the memory medium realize the functions of the embodiment mentioned above. The memory medium in which the program codes have been stored is then an embodiment of the invention.

As a memory medium for supplying the program codes, for example, it is possible to use a floppy (registered trademark) disk, a hard disk, an optical disk, a magnetooptic disk, a CD-ROM, a CD-R, a magnetic tape, a non-volatile memory card, a ROM, or the like.

The invention incorporates not only a case where a computer executes the read-out program codes, so that the functions of the embodiment mentioned above are realized, but also a case where an OS (operating system) or the like which is operating on the computer executes a part or all of the actual processes on the basis of instructions of the program codes, and the functions of the embodiment mentioned above are realized by those processes.

Further, the invention also incorporates a case where the program codes read out from the memory medium are written into a memory equipped for a function expanding board inserted into a computer or a function expanding unit connected to a computer, and thereafter, a CPU or the like provided for the function expanding board or function expanding unit executes a part or all of the actual processes on the basis of instructions of the program codes, and the functions of the embodiment mentioned above are realized by those processes.

The program codes in this instance may be MPU native codes, codes which have been described in a predetermined interpreter language and are converted into the MPU native codes at the run time, or codes which are script data described in a predetermined format and interpreted and executed by the operating system or the like.

As described in detail above, according to the invention, when developing the image output apparatus comprising the controller unit for forming the output image data and the engine unit for outputting the output image data to a media such as paper or the like, it is possible to provide the image processing apparatus which visualizes the image data, in a real-time manner, which is formed by the controller unit which is used in place of the engine unit. Thus, the verifying operation of the controller unit can be performed even in a situation where the engine unit is not completed, so that developing speed can be improved and developing costs can be reduced. Further, the data formed by the controller unit can be analyzed on the display apparatus. The analysis of the pixel level which cannot be discriminated from the print result can be performed by the simple operation.

Third Embodiment

The third embodiment will now be described.

Explanation will be made also by using FIGS. 1 to 6 used in describing the first embodiment.

Figure 41:
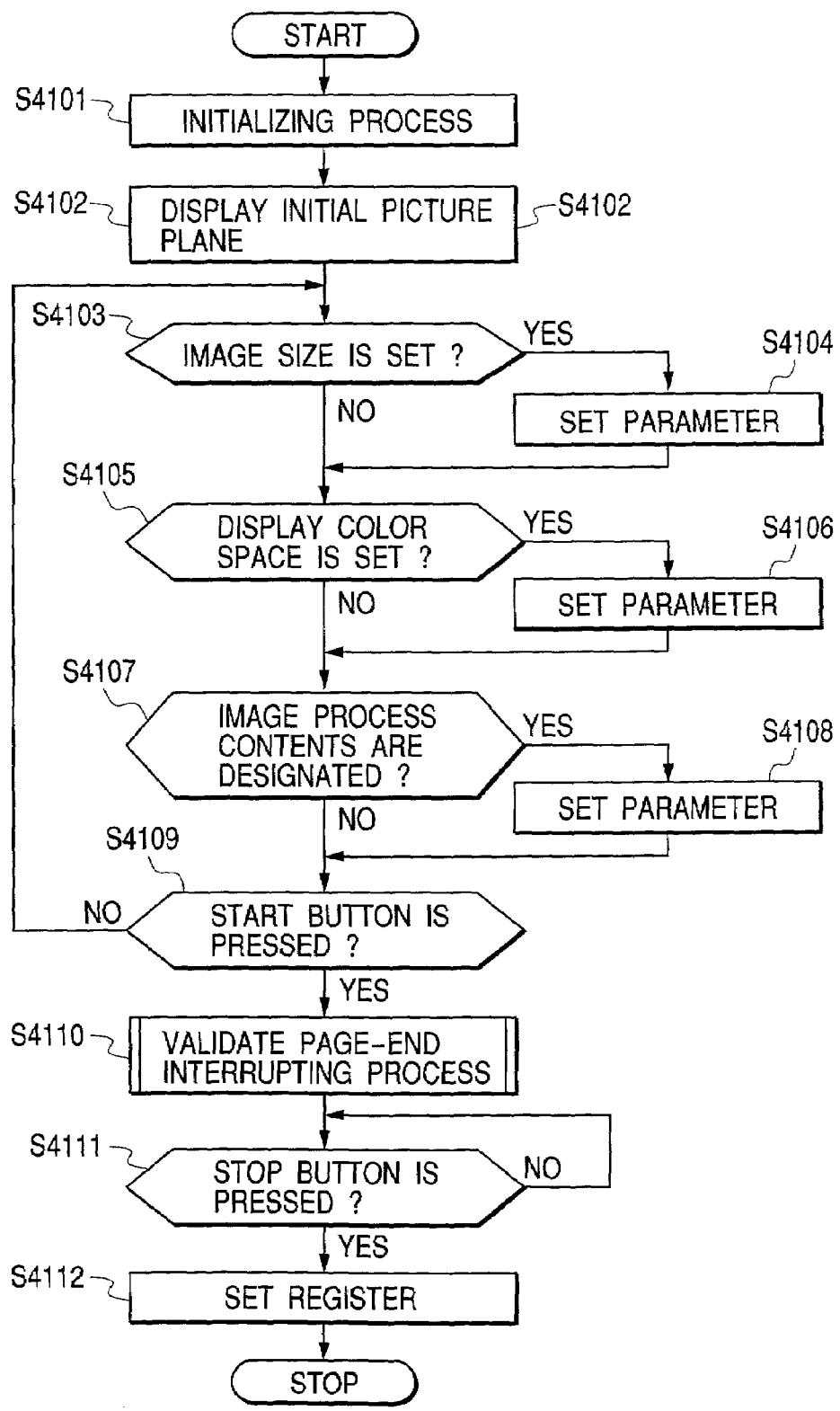
FIG. 41 is a flowchart for an image processing apparatus according to the third embodiment.

FIG. 41 is a flowchart for a program of the real-time analyzing process which is executed by the image processing apparatus in FIG. 1.

All software shown by this flowchart is software which operates on the general computer 24. This software provides a GUI to the user and controls the interface unit 22.

In FIG. 41, when this software is activated, an initializing process is executed (step S4101). This initializing process executes not only initialization of variables or the like regarding the software but also an initializing process of hardware such as setting or the like of a register regarding the video data control unit 200. In subsequent step S4102, an initial picture plane of FIG. 44 is displayed by the CRT 25.

Figure 44:
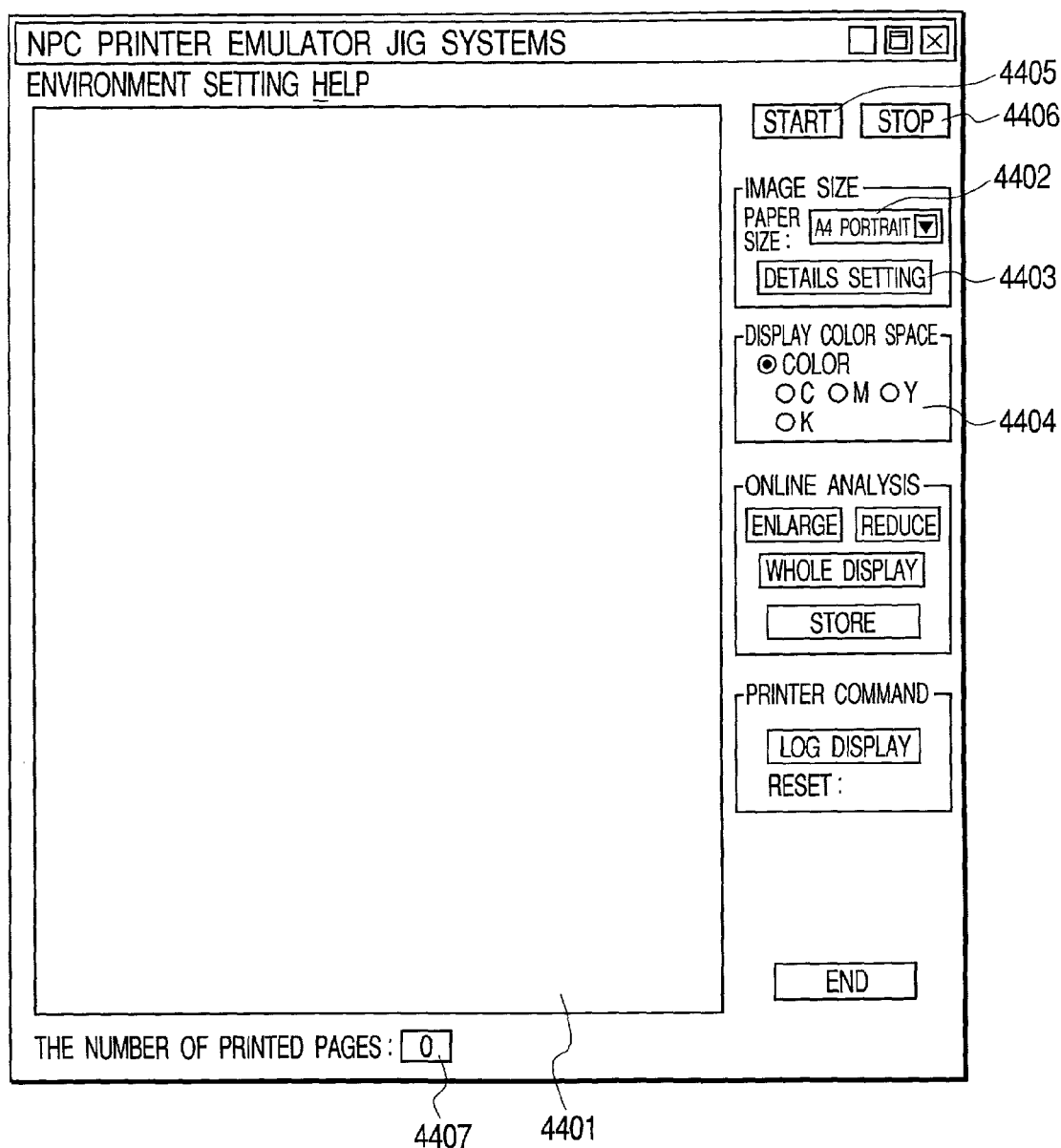
FIG. 44 is a diagram showing display examples of the image processing apparatus in the third embodiment.

FIG. 44 is an explanatory diagram of the initial picture plane on the CRT 25 which is displayed in step S4102 in FIG. 41.

In FIG. 44, reference numeral 4401 denotes an image display area. The image data which is formed by the printer controller 21 is displayed in the area 4401. First, the user designates a size and a color space of image data to be displayed. Reference numeral 4402 denotes a combo box for designating a paper size. The number of pixels in the main scan, a start position of the main scan, the number of lines in the sub-scan, and a start position of the sub-scan corresponding to the preset paper size are set in the area 4402. Reference numeral 4403 denotes a button for displaying a user interface for setting details. By the user pressing the button 4403, a details setting window shown in FIG. 45 is displayed. Preset parameters can be changed here. In addition, printed pages can be indicated at 4407.

Returning to FIG. 41, when a change in image size is instructed (YES in step S4103), parameters are set so as to display the designated image data (step S4104). After that, step S4105 follows. The video data control unit 200 holds only the image data of a valid area in the frame memory 206 (image memory) in accordance with the set parameters.

When a change in display color space is instructed (YES in step S4105), parameters are set so as to display the designated image data (step S4106). After that, step S4107 follows. As a display color space, one of five kinds of display color spaces of a color, a C plane, an M plane, a Y plane, and a K plane can be selected (radio button 4404). Since the image data which is outputted by the printer controller 21 usually corresponds to a CMYK color space, if the color is selected here, CMYK image data accumulated in the image memory is extracted, color-converted into RGB data, and subsequently displayed in the display area. In the case of displaying the C/M/Y/K plane, only necessary color plane data is extracted from the image memory and displayed. After completion of the setting of the image size and the display color space as mentioned above, the actual image fetching operation can be started. Since default values have been set into those parameters, there is no need to reset them unless the default values are inappropriate.

Figure 43:
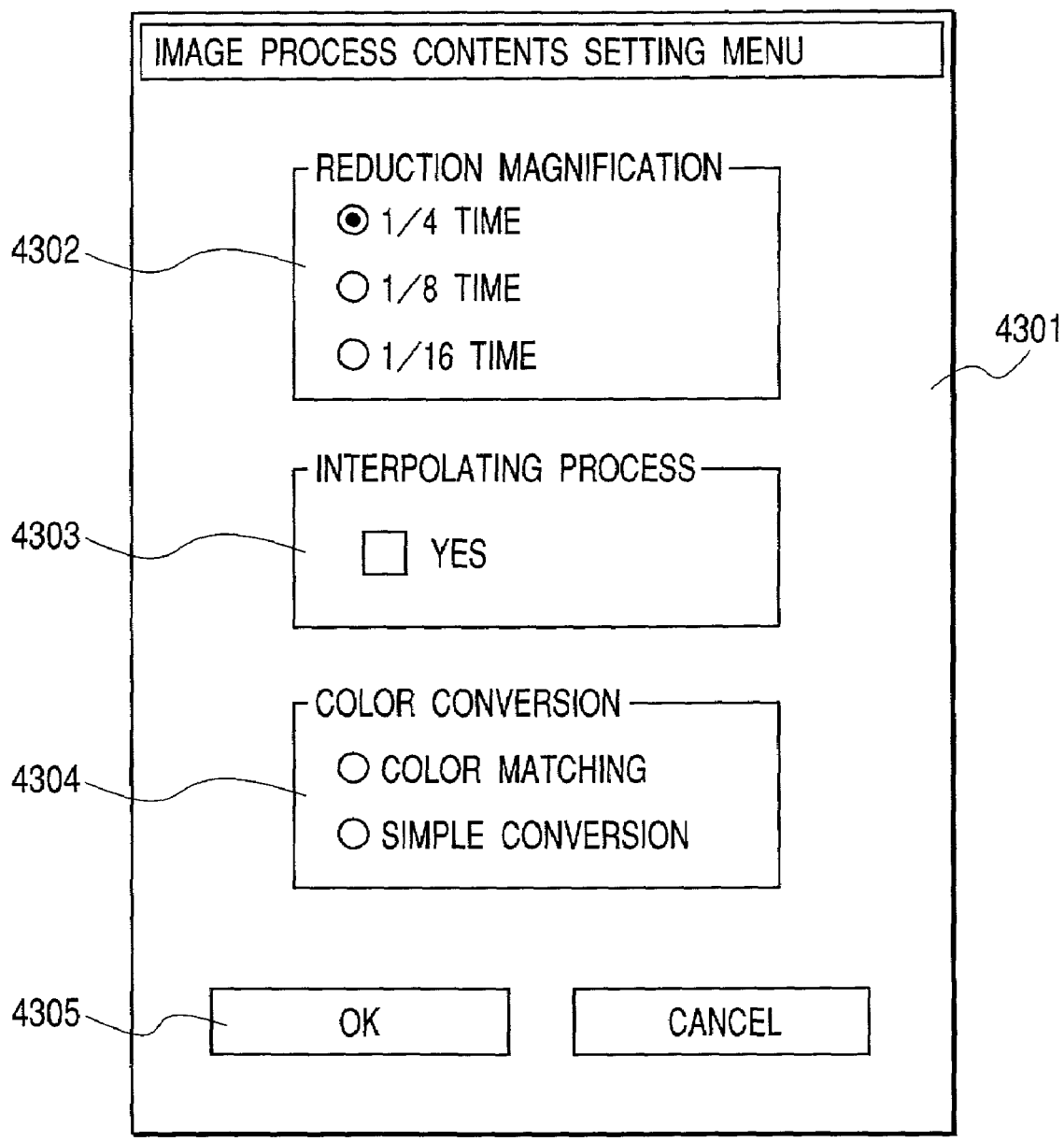
FIG. 43 is a diagram showing display examples of the image processing apparatus in the third embodiment.

Subsequently, when the designation of contents of the image process is instructed (YES in step S4107), a designating picture plane of image process contents in FIG. 43 is displayed by the CRT 25. Image process contents at the time of displaying the image data accumulated in the frame memory 206 are designated (step S4108). After that, step S4109 follows.

FIG. 43 is an explanatory diagram of a designating picture plane of image process contents on the CRT 25 which is displayed in step S4108 in FIG. 41.

In FIG. 43, a menu 4301 denotes a window which is called from an environment setting menu of the application window shown in FIG. 44. Reference numeral 4302 denotes a radio button for setting a reduction magnification. The image data in the frame memory 206 is reduction-converted at the designated magnification and transferred to the memory on the general computer 24. Reference numeral 4303 denotes a check box for designating the presence or absence of an interpolating process. When the check box 4303 is marked, a band limitation filtering process for sub-sampling is executed upon creation of the display image. Reference numeral 4304 denotes a radio button for designating a color converting system. When color matching is selected here, a color converting process in which the display image is color corrected so as to approach an image that is printed by a printer engine is executed. When a simple converting process is selected, a simple CMYK→RGB color converting process, which will be explained hereinlater, is executed. By the user pressing an "OK" button 4305, those selection parameters are held in the memory of the general computer 24.

Returning to FIG. 41, whether the depression of a start button 4405 has been detected or not is discriminated in step S4109. If it is not detected (NO in step S4109), processes in step S4103 and subsequent steps are repeated. If it has been detected (YES in step S4109), start of the image data obtaining operation is set into the control unit by application software via the software of the manager layer. Simultaneously with the setting of a process starting register of the video data control unit 200, a page-end interrupting process of FIG. 42, which will be explained hereinlater, on the present software is validated (step S4110).

Figure 42:
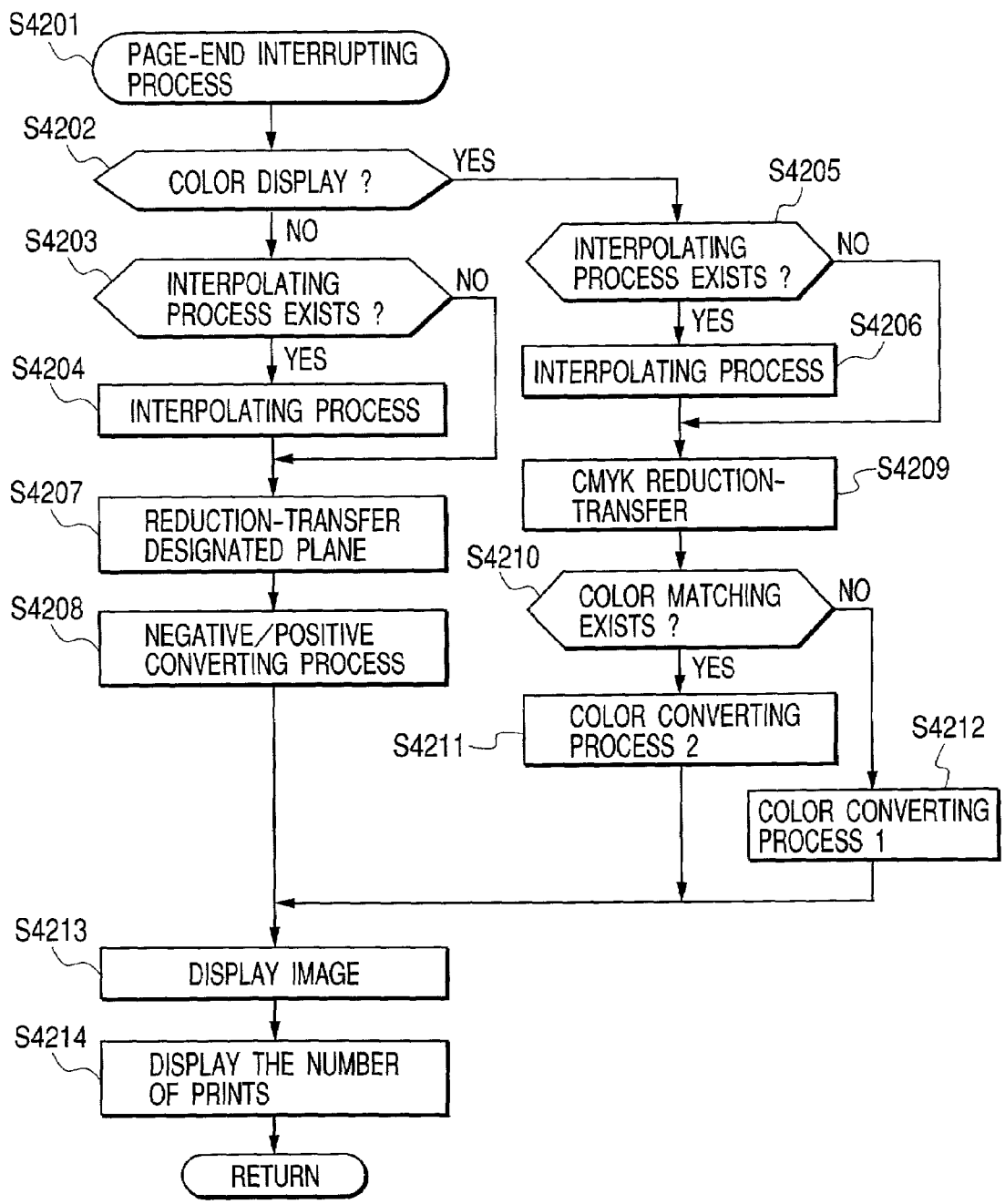
FIG. 42 is a flowchart for an image processing apparatus according to the third embodiment.

The page-end interrupting process in FIG. 42 is executed to allow the video data control unit 200 to notify the software of the completion of the accumulation of the image data of one page. After the page-end interruption is validated, the present software keeps waiting for this interrupting process until stop button 4406 is pressed.

FIG. 42 is a flowchart for the page-end interrupting process (steps S4201 et seq.) which is validated in step S4110 in FIG. 41.

In FIG. 42, first, whether the color display has been designated as a display color space or not is discriminated (step S4202). Irrespective of a result of the discrimination in this step, while a designated plane of the image data accumulated in the image memory is reduction-converted, it is transferred into the work memory of the general computer 24. Since a size of image display area is often smaller than that of the image data which is outputted from the printer controller 21, the image data is extracted while it is reduction-converted (steps S4207, S4209). As a reduction magnification here, a magnification instructed in step S4108 in FIG. 41 is used.

For example, if the reduction magnification has been set to ⅛ time by the radio button 4302, the high precision image data in which the number of pixels in the main scan is equal to 4864 pixels, the number of lines in the sub-scan is equal to 6849 pixels, and the like and which has been accumulated in the image memory is reduced into ⅛, so that the image data of 608 pixels×856 lines is transferred to the general computer 24. By selecting the reduction magnification in step S4108, an amount of data which is transferred is reduced and the image processing apparatus which emulates a high speed printer engine by using the general computer 24 of low processing ability can be constructed.

In the case of constructing the image processing apparatus by a personal computer of high processing ability or in the case of performing an emulation of a printer engine of a low print speed, a high precision image display can be realized by setting a predetermined reduction magnification.

Further, if the interpolating process has been validated in step S4108 in FIG. 41 (YES in step S4203, YES in step S4205), in order to suppress the influence of aliasing noises or the like due to sub-sampling, a band limitation is made in a predetermined space filter (step S4204) (interpolating process). Since the user can select the presence or absence of the interpolating process by the check box 4303, in a case of using the general computer 24 of low performance or if the user wants to perform the emulation of a printer engine of a higher speed, a processing load of the general computer 24 can be reduced by omitting the interpolating process. Although the case of selecting the presence or absence of the interpolating process has been described here, a plurality of kinds of interpolating processing filters can be also selected.

If it is judged that the color display has been designated (YES in step S4202) as a result of the discrimination in step S4202, the image data of each of the CMYK planes is extracted at each predetermined reduction magnification (step S4209; CMYK reduction transfer) via steps S4205 and S4206. A color converting process is executed the image display area (step S4213). The number of displayed image pages, that is, the number of printed pages is displayed (step S4214). The processing routine is returned. Also in the selection of the color converting process (step S4210), the color converting system instructed in step S4108 in FIG. 41 is selected.

If the presence of the color matching has been set (YES in step S4210) as a result of the discrimination in step S4210, a color space converting process which has been color-management processed by using color profile data or the like of the image display apparatus connected to the image processing apparatus and the general computer 24 is executed (step S4211) (color converting process 2). In the case of performing the color matching, although an image near a print image can be displayed on the image display apparatus, processing load borne by the computer 24 increases.

If the absence of the color matching has been set (NO in step S4210), the CMYK image data is converted into the RGB image data for display by simple converting equations which are generally used (step S4212; color converting process 1). Examples of the converting equations for color conversion are shown below:

$$R=1-(C+K)$$

$$G=1-(M+K)$$

$$B=1-(Y+K)$$

The RGB image data obtained by means of those converting equations is color-displayed in the image display area in step S4213 (image display). In this case, since there is a difference of the color converting processes, a difference of color reproducibility between the printer engine and the display device such as a CRT, or the like, a CMYK image which is formed by the controller unit 100 is not reproduced as it is. However, the processing load necessary for the general computer 24 can be reduced. Also, in this case, it is sufficiently effective in finding out an obvious rasterization error or the like.

In step S4207, if the display image color space of the image data to be extracted has been set to the C/M/Y/K independent plane, only the designated plane is extracted (designated plane reduction transfer). In the case of displaying only the extracted designated plane, since the data transfer amount and the process amount are smaller than those in the case of performing the color display, the processing ability that is required of the general computer 24 can be further reduced. The data of each plane can be observed as it is, plane by plane, as data formed by the controller unit 100. In subsequent step S4208, a negative/positive inverting process is executed in order to improve ease of look and the inverted image plane is displayed in the image display area. The number of displayed prints, that is, the number of printed pages is displayed. The negative/positive inversion in step S4208 can be also omitted if it is not necessary.

By the process in FIG. 42, each time the page-end interruption occurs, in a manner similar to the output to the paper in the case where the printer engine is connected, the image data which is rasterized by the printer controller 21 can be displayed to the display unit in a real-time manner.

Returning to FIG. 41, when the stop button 4406 is pressed by the user (YES in step S4111), the application 604 inhibits the occurrence of the interrupting process via the manager 603 and driver 602, instructs the video data control unit 200 to stop the printer emulating process in response to the printer command, and sets the register (step S4112). The processing routine is stopped.

According to the foregoing embodiment, image process contents upon image transfer from the frame memory 206 to the computer 24 are discriminated from the processing performance of the computer 24 and engine performance (print speed) to be emulated, and it is possible to perform suitable setting. Thus, the image processing apparatus which corresponds to the printer engine of a higher speed can be constructed or the image processing apparatus can be cheaply constructed by using a computer of low performance.

(Modification 1 of the third embodiment)

A modification 1 of the third embodiment will now be described with respect only to points different from those of the embodiments described above.

Figure 46:
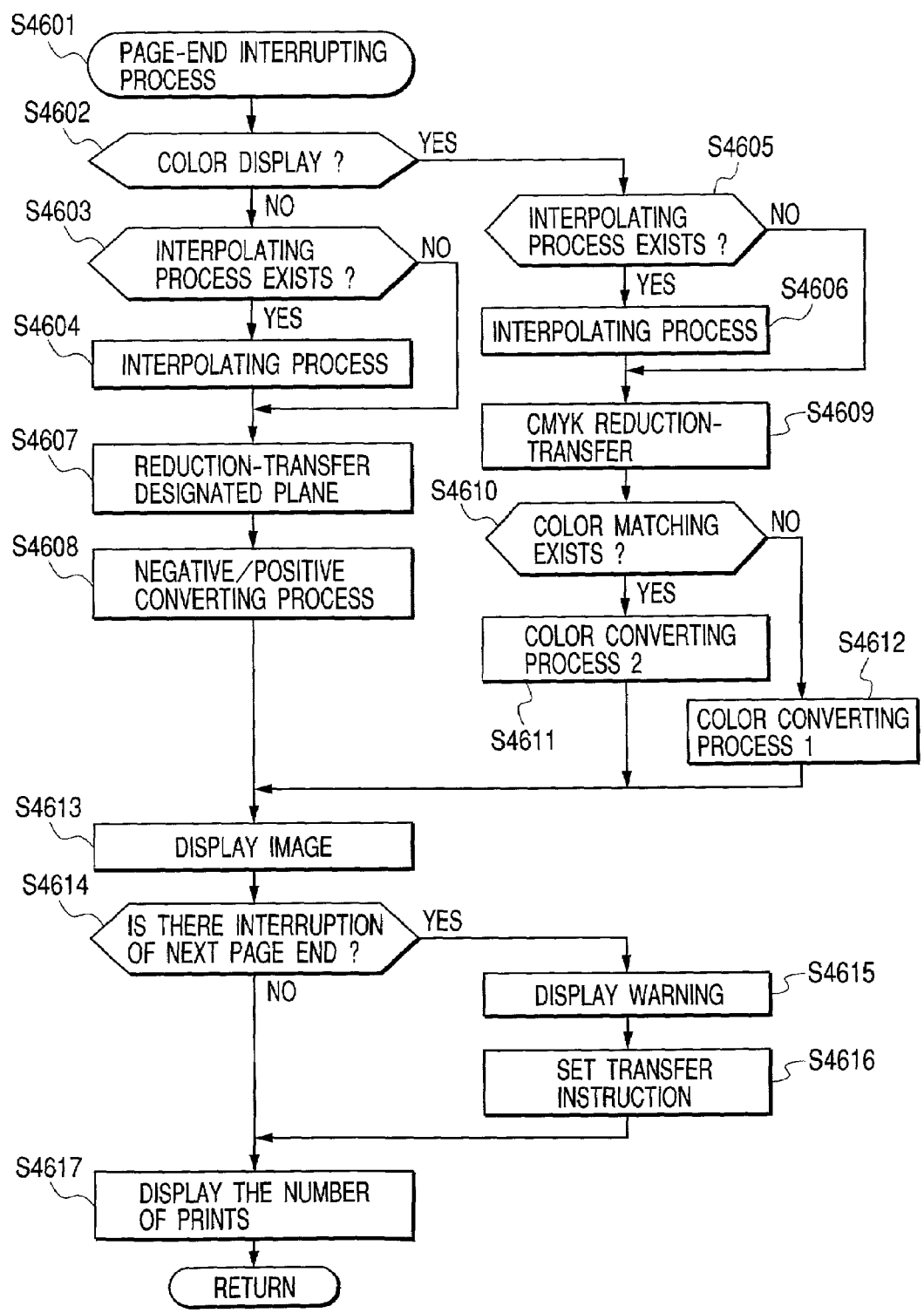
FIG. 46 is a flowchart for a page-end interrupting process in a modification 1 of the third embodiment.

FIG. 46 is a flowchart for a page-end interrupting process in modification 1.

The page-end interrupting process in FIG. 46 (steps S4601 through S4617) is constructed by newly adding steps S4614 to S4616 to the page-end interrupting process in FIG. 42 according to the first embodiment. Therefore, steps S4602 to S4613 and S4617 in FIG. 46 are substantially equivalent to steps S4202 to S4214 in FIG. 42.

In FIG. 46, whether the image process and image transfer designated in step S4108 in FIG. 41 are matched with the print speed or not is detected in step S4614. Whether the page-end interruption of the next page has occurred during the page-end interrupting process or not is discriminated. That is, an interruption factor flag or the like is confirmed. If it could be confirmed that the next page-end interruption does not occur (NO in step S4614), it is decided that the process has been in time. A normal process is executed in step S4617. The interrupting process is finished. If the next page-end interruption has already occurred (YES in step S4614), a warning is displayed (step S4615). A transfer instruction at the time of abnormality is set (step S4616). After that, a process in step S4617 is executed. The present interrupting process is finished.

Figure 47:
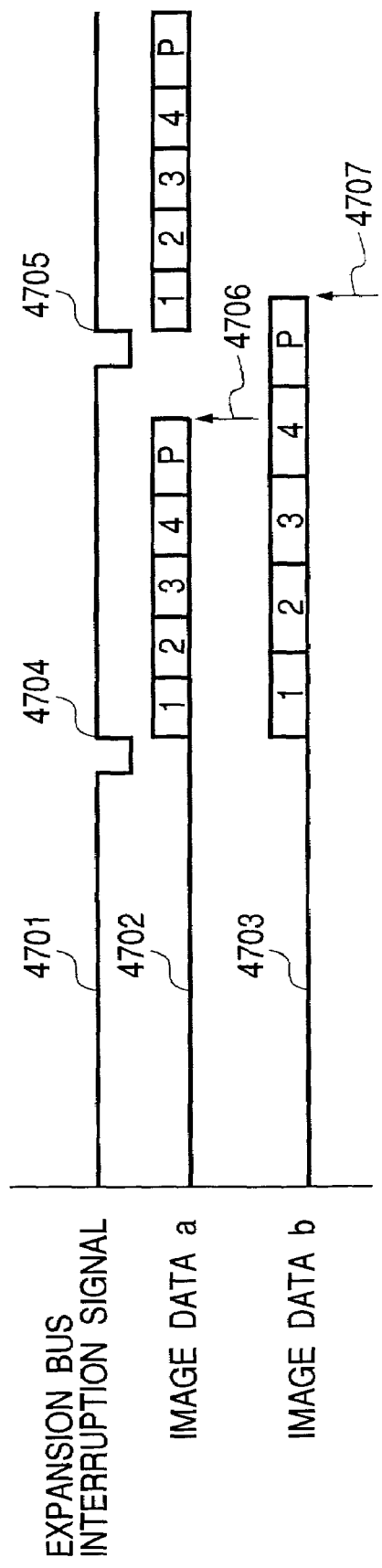
FIG. 47 is a diagram showing data transfer processing timing in modification 1 of the third embodiment.

FIG. 47 is a diagram showing data transfer processing timing in modification 1 of the third embodiment.

In FIG. 47, in response to an expansion bus interruption signal 4701, the transfer and image process of the image data are started by setting page-end interruption 4704 and 4705 to start timing. In the diagram, "1", "2", "3", and "4" indicate an image transfer time and an image processing time of the CMYK color plane, respectively. The image processing time is time which is required for an independent image process (space filtering process or the like) for each color plane. "P" indicates a processing time necessary for processing and displaying the image data transferred to the memory of the general computer 24. The processing time includes a color space conversion processing time, a transfer time to the frame buffer for image display, and the like.

Image data (a) 4702 shows timing for the normal operation. In the image data (a) 4702, the process and transfer are started by the page-end interruption 4704. Before the page-end interruption 4705 of the next page occurs, the creation of the display data has been completed at a process end point 4706. Image data (b) 4703 shows timing in the case where the operation is not in time. In the image data (b) 4703, after the display image forming process was started by setting the page-end interruption 4704 to a start point, the page-end interruption 4705 of the next page has occurred before a series of process end points 4707.

Returning to FIG. 46, in step S4614, an abnormal state is recognized from the time of completion of the creation of the display image (process end point) and the timing for the page-end interruption. An interval of the page-end interruption corresponds to the print speed of the printer and is specified by the speed of the printer engine or the processing speed of the printer controller 21 (corresponds to the value of the lower one of those speeds).

The creating time of the display image is specified by the processing performance of the general computer 24. Specifically speaking, when a size of image which is transferred for display is large due to the setting of the reduction magnification, the transfer time which is necessary when the data is transmitted via the expansion bus 300 is long. The processing time is extended due to the designation of an interpolation filtering process upon reduction, the color space converting process for display, or the like.

If it is determined that the process is not in time as a result of the discrimination in step S4614, that is, when the creating and transfer time of the display image is longer than the interval of the page-end interruption (image data sync signal) (YES in step S4614), a warning is displayed in step S4615, thereby notifying the user of this fact.

Figure 48:
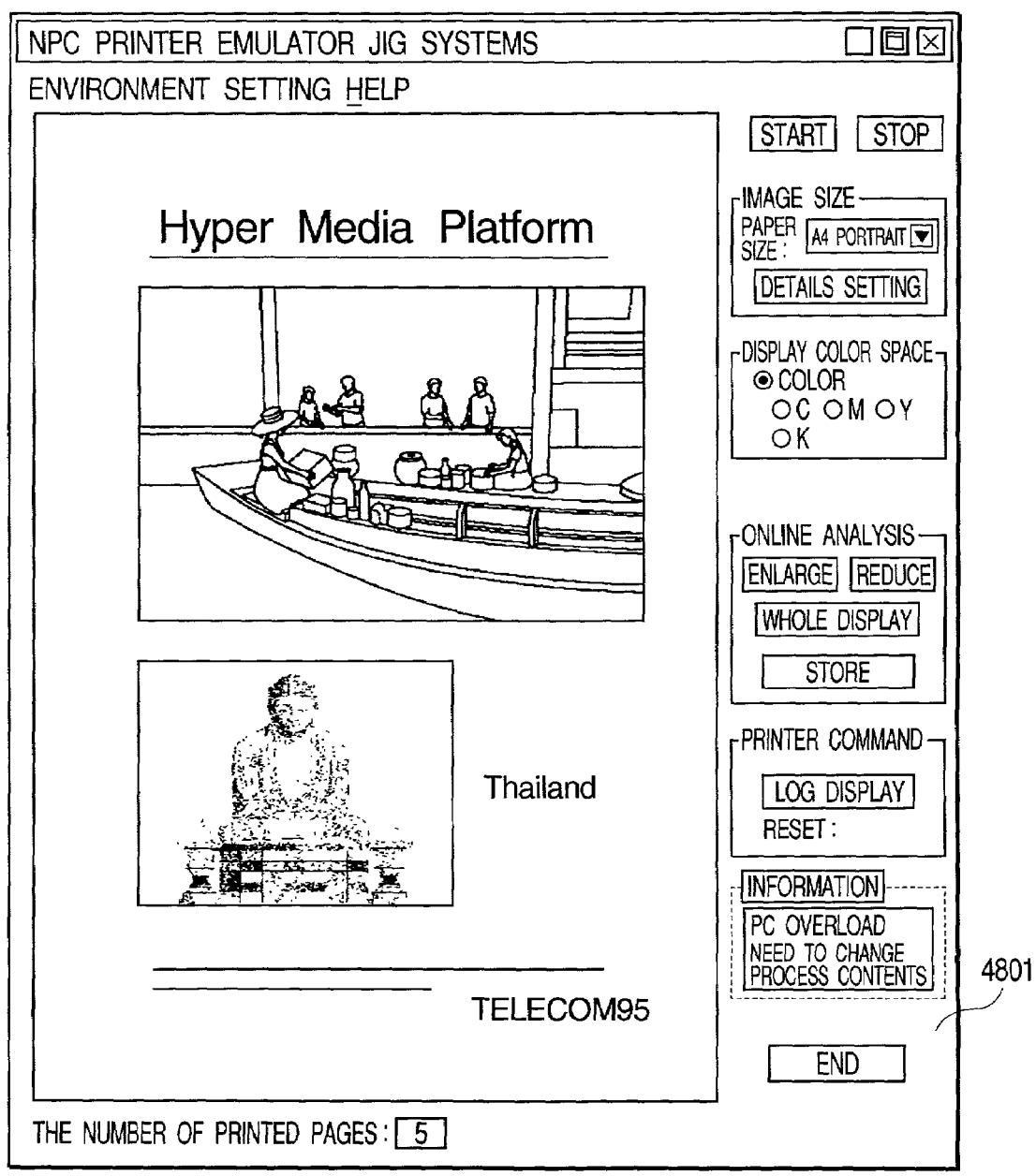
FIG. 48 is a diagram showing a display example of an image processing apparatus in modification 1 of the third embodiment.

FIG. 48 is an explanatory diagram of a picture plane on the CRT 25 which is displayed in step S4615 in FIG. 46.

In FIG. 48, a message showing that the process of the computer is an overload is notified into an information display area shown at 4801, thereby instructing the user to change the image process contents.

Returning to FIG. 46, when the abnormality is detected, the image transfer of the next page is skipped and a process is executed in step S4616.

According to modification 1, when the forming process of the display image is executed in accordance with the image process contents designated by the user, the user can recognize a situation in which the process is not in time for a predetermined print speed. Thus, if an abnormality occurs in the image data displayed to the image processing apparatus, the user can know whether there is a problem in the controller unit 100 as a test target or there is a problem in the setting of the testing apparatus regarding the invention.

(Modification 2 of the Third Embodiment)

FIG. 49 is a flowchart for a deciding process of the image process contents in modification 2.

In this embodiment, prior to the setting (FIG. 43) of the image process contents by the user, the general computer 24 discriminates the processing ability and estimates the processing load necessary for the image process.

In FIG. 49, in step S4901, the data accumulated in the frame buffer (test data, or "pseudo-image", whose contents are not specified) of an amount corresponding to a predetermined size is transferred to the image memory of the general computer 24, and a transfer time is measured (pseudo-image transfer). The transfer time can be easily measured by using a timer or the like of the general computer 24. The transfer time necessary when the image data is actually transferred can be predicted to a certain degree from a ratio of the measured transfer data size and the size of image data which is actually transferred. The prediction transfer time is obtained by the following equation:

Prediction transfer time=(measured time)×(the total number of pixels of the image data/transfer amount of the test data)

Subsequently, a processing load necessary for the image process is presumed (step S4902) (measurement of the processing ability). Specifically speaking, in a manner similar to the measurement of the transfer speed, various image processes are falsely executed on the data of a predetermined size. A processing time (processing load) that will be required for actually processing the image data is predicted by using the time required for the process. To predict the processing time of the image process portion, processing steps and resources (a kind, an operating clock, and the like of the CPU) of the general computer 24 are used. However, another method can also be used.

FIG. 50 is an explanatory diagram of a processing load prediction window displayed in step S4903 in FIG. 49.

In FIG. 50, in a processing load prediction window 5001, the prediction processing time of the process contents is displayed for every display image magnification for the print image data held in the frame memory 206. For example, when the display image magnification is equal to ⅛ time, the image transfer time is equal to 1.5 second, the interpolation processing time is equal to 4 seconds, and the processing time for the color converting process 1 is equal to 0.4 second, so that the total time is equal to 5.9 seconds. In this case, the page-end interruption interval in the case of emulating a printer of 10 ppm (Page Per Minute) is equal to 10 seconds, and the system is operating normally.

Returning to FIG. 49, in step S4903, selection of a preferable image processing method is presented to the user from the obtained measurement result (presentation of the processing load). In step S4904, a preferable combination obtained from the prediction value of the processing load is used as a default value, and the image process setting menu shown in FIG. 43 is displayed (setting of the processing mode).

In the processing load prediction window 5001 in FIG. 50, the window of FIG. 43 is formed in a state where the parameters have been designated to "reduction magnification: ⅛ time", "interpolating process: yes", and "color conversion: simple conversion". When the user appreciates those set items and presses the "OK" button 4305, information regarding the selection of the designated image process contents is held in the system. If the user gives a priority to the image quality, when "color conversion: color matching" is selected, other items are automatically set to "reduction magnification: 1/16 time" and "interpolating process: yes" by using the result of FIG. 50.

According to the foregoing embodiment, when the image processing apparatus is realized by using various general computers 24, preferable image process contents can be designated by means of a simple operation in accordance with the print speed of the printer to be emulated and the processing performance of the computer. The convenience is further improved, and developing efficiency can be improved.

Although the third embodiment has been described with respect to three kinds of processes such as resolution conversion, interpolation filtering, and color conversion as contents of the image process to be selected, the invention is not limited to them, but the invention can be also similarly applied to a case of using another image processing method. Further, the invention can be also applied to a case of designating details (various processing parameters such as filter coefficients, resolution converting system, etc.) of the process contents.

Although the third embodiment has been described with respect to the method whereby the selection contents of the image process which are obtained from the prediction result are presented to the user and the image process is determined, it is also possible to use a method of automatically setting a preferable combination in accordance with predesignated conditions (information such as image size preference, picture quality preference, etc.).

Although this embodiment has been described with respect to the case of using the laser beam printer as a target printer, the invention is not limited to it, but can be also used for development of other various printer controllers 21 and the like such as a printer of a bubble jet (registered trademark) system and the like. In this case, the invention can be also used for development of various printer controllers 21 by changing a video interface unit in accordance with a video interface system of the printer or the like.

Although this embodiment has been described with respect to the case of using Windows™ of Microsoft Corporation in U.S.A. as a basic operating system, the invention is not limited to it, but can be also implemented in various other environments.

Although this embodiment has been described with respect to the case of constructing the system by combining with the personal computer, the invention is not limited to it, but can be also realized by combining with other various apparatuses.

The object of the invention is also accomplished by a method whereby a memory medium in which program codes of the software for realizing the functions of the embodiment mentioned above have been stored is supplied to a system or an apparatus, and a computer (or a CPU or an MPU) of the system or apparatus reads out and executes the program codes stored in the memory medium. In this case, the program codes themselves read out from the memory medium realize the functions of the embodiment mentioned above. The memory medium in which the program codes have been stored is thus itself an embodiment of the invention.

As a memory medium for supplying the program codes, for example, it is possible to use a flexible disk, a hard disk, an optical disk, a magnetooptic disk, a CD-ROM, a CD-R, a magnetic tape, a non-volatile memory card, a ROM, or the like.

The invention incorporates not only a case where a computer executes the read-out program codes, so that the functions of the embodiment mentioned above are realized, but also a case where an OS (operating system) or the like which is operating on the computer executes a part or all of the actual processes on the basis of instructions of the program codes, and the functions of the embodiment mentioned above are realized.

Further, the invention also incorporates a case where the program codes read out from the memory medium are written into a memory equipped for a function expanding board inserted into a computer or a function expanding unit connected to a computer, and thereafter, a CPU or the like provided for the function expanding board or function expanding unit executes a part or all of the actual processes on the basis of instructions of the program codes, and the functions of the embodiment mentioned above are realized by those processes.

The program codes in this instance may be MPU native codes, codes which have been described in a predetermined interpreter language and are converted into the MPU native codes at the run time, or codes which are script data described in a predetermined format and interpreted and executed by the operating system or the like.

As described in detail above, according to the invention, in the image processing apparatus for verifying the operation of the controller unit which outputs the output image data and constructs the image output apparatus in cooperation with the engine unit for outputting the outputted output image data to a media, when the image processing apparatus is constructed by using computers of various performances, a preferable system can be set by means of a simple operation. Further, a preferable system can be similarly set by means of a simple operation in accordance with a change in performance of the engine unit to be emulated.

What is claimed is:

1. A testing apparatus for verifying an operation of a controller unit which forms output image data, outputs a command signal to an engine unit, and serves as an image output apparatus in cooperation with the engine unit for outputting the formed output image data onto a medium, by emulating the engine unit, comprising:
    interface means, provided on an extension bus unit of a general-purpose computer, for connecting to a video interface of the controller unit, and for making data communication with the controller unit;
    obtaining means for obtaining the command signal outputted by the controller unit via said interface means;
    a timer for providing a notification of an elapse of a predetermined time indicating a pseudo-engine timing as a virtual engine unit;
    setting means for setting a state of the virtual engine unit as a state of the engine unit in accordance with the notification of the elapsed time by said timer and the obtained command signal;
    transmitting means for transmitting a response signal via said interface means in accordance with the state of the virtual engine unit and the obtained command signal; and
    generating means for generating a pseudo-image sync signal as the virtual engine unit to the controller unit in accordance with the state of the virtual engine unit,
    wherein said testing apparatus is connected to the controller unit as the virtual engine unit in place of the engine unit, when verification of the operation of the controller unit is executed.

2. An apparatus according to claim 1, further comprising display means for displaying the state of the virtual engine unit.

3. An apparatus according to claim 1, wherein said timer has setting means for setting the predetermined time corresponding to specifications of the engine unit.

4. An apparatus according to claim 1, wherein said setting means holds the state of the virtual engine unit.

5. An apparatus according to claim 1, wherein said setting means holds a time when the state of the virtual engine unit changes.

6. An apparatus according to claim 1, wherein said obtaining means holds a time when command signal is obtained.

7. An apparatus according to claim 1, wherein said transmitting means holds the transmitted response signal.

8. An apparatus according to claim 1, wherein said transmitting means holds a time when the response signal is transmitted.

9. An apparatus according to claim 1, wherein said transmitting means holds a combination of the received command signal and the transmitted response signal.

10. An apparatus according to claim 1, further comprising designating means for designating an error state as the virtual engine unit in response to a designation by an operation via a user interface, and
    wherein said setting means sets the state of the virtual engine unit to the error state designated by said designating means.

11. An apparatus according to claim 1, further comprising:
    additional obtaining means for obtaining the output image data which is outputted from the controller unit via said interface means;
    an image memory for holding the obtained image data; and
    visualizing means for visualizing the held image data.

12. A testing method for a testing apparatus of verifying an operation of a controller unit which forms output image data, outputs a command signal to an engine unit, and serves as an image output apparatus in cooperation with the engine unit for outputting the formed output image data onto a medium, by emulating the engine unit, comprising:
    a step of using interface means, provided on an extension bus unit of a general-purpose computer, for connecting to a video interface of the controller unit, and for making data communication with the controller unit;
    an obtaining step of obtaining the command signal outputted from the controller unit via the interface means;
    a setting step of setting a state of the virtual engine unit as a state of the engine unit in accordance with a notification of an elapsed time by a timer for providing a notification of the elapse of a predetermined time and the obtained command signal;
    a transmitting step of transmitting a response signal via the interface means in accordance with the state of the virtual engine unit and the obtained command signal; and
    a generating step of generating a pseudo-image sync signal as the virtual engine unit to the controller unit in accordance with the state of the virtual engine unit,
    wherein the testing apparatus is connected to the controller unit as the virtual engine unit in place of the engine unit, when verification of the operation of the controller unit is executed.

13. A method according to claim 12, further comprising a display step of displaying the state of the virtual engine unit.

14. A method according to claim 12, wherein the timer sets the predetermined time.

15. A method according to claim 12, wherein, in said setting step, the state of the virtual engine unit is held.

16. A method according to claim 12, wherein, in said setting step, a time when the state of the virtual engine unit changes is held.

17. A method according to claim 12, wherein, in said obtaining step, a time when the command signal is obtained is held.

18. A method according to claim 12, wherein, in said transmitting step, the transmitted response signal is held.

19. A method according to claim 12, wherein, in said transmitting step, a time when the response signal is transmitted is held.

20. A method according to claim 12, wherein, in said transmitting step, a combination of the received command signal and the transmitted response signal is held.

21. A method according to claim 12, further comprising a designating step of designating an error state, and
wherein, in said setting step, the state of the virtual engine unit is set to the error state designated in said designating step.

22. A method according to claim 12, further comprising:
another obtaining step of obtaining the output image data which is outputted from the controller unit via the interface means;
a holding step of holding the obtained image data; and
a visualizing step of visualizing the held image data.

23. A computer-readable storage medium, storing a computer program for executing a testing method for a testing apparatus of verifying an operation of a controller unit which forms output image data, outputs a command signal to an engine unit, and serves as an image output apparatus in cooperation with the engine unit for outputting the formed output image data onto a medium, by emulating the engine unit, the method comprising:
a step of using interface means, provided on an extension bus unit of a general-purpose computer, for connecting to a video interface of the controller unit, and for making data communication with the controller unit;
an obtaining step of obtaining the command signal outputted from the controller unit via the interface means;
an step of setting a state of the virtual engine unit in accordance with a notification of an elapsed time by a timer for providing notification of the elapse of a predetermined time and the obtained command signal;
a transmitting step of transmitting a response signal via the interface means in accordance with the state of the virtual engine unit and the obtained command signal; and
a generating step of generating a pseudo-image sync signal as the virtual engine unit to the controller unit in accordance with the state of the virtual engine unit,
wherein the testing apparatus is connected to the controller unit as the virtual engine unit in place of the engine unit, when verification of the operation of the controller unit is executed.

24. A testing apparatus for verifying the operation of a controller unit of an image output apparatus for outputting output image data and a command signal to an engine unit by emulating the engine unit for printing the output image data on a medium, comprising:
interface means, provided on an extension bus unit of a general-purpose computer, for connecting to a video interface of the controller unit, and making data communication with the controller unit;
first obtaining means for obtaining the image data which is outputted for printing by the controller unit via said interface means;
second obtaining means for obtaining the command signal outputted by the controller unit via said interface means;
image sync signal generating means for generating an image data sync signal for verifying an operation of the controller unit in accordance with the command signal obtained by said second obtaining means;
an image memory for holding the image data obtained by said first obtaining means;
display control means for controlling a general computer to display the image data held by said image memory;
system control means for controlling a whole system of said image output apparatus; and
synchronizing means for synchronizing the holding operation of the image data by said image memory with the displaying operation of the image data by said display control means in accordance with the image data sync signal generated by said image sync signal generating means,
wherein said testing apparatus is connected to the controller unit as a virtual engine unit in place of the engine unit, when verification of the operation of the controller unit is executed.

25. An apparatus according to claim 24, wherein said image memory has a size of two pages or more, and said synchronizing means synchronizes the obtaining operation of the image data by said first obtaining means with the displaying operation of said display control means displaying the image data.

26. An apparatus according to claim 24, wherein the image data is color image data, and said apparatus further comprises designating means for designating a color plane which is displayed by said display control means from the image data held in said image memory.

27. A control method of a testing apparatus for verifying the operation of a controller unit of an image output apparatus for outputting output image data and a command signal to an engine unit by emulating the engine unit for printing the output image data on a medium, comprising:
a control step of controlling an interface, provided on an extension bus unit of a general-purpose computer, for connecting to a video interface of the controller unit, and making data communication with the controller unit;
a first obtaining step of obtaining the image data which is outputted by the controller unit via the interface;
a second obtaining step of obtaining the command signal which is outputted from the controller unit via the interface;
an image sync signal generating step of generating an image data sync signal to the controller unit in accordance with the command signal;
a holding step of holding the obtained image data in an image memory;
a display control step of controlling a general computer to display the held image data;
a system control step of controlling a whole system of the image output apparatus; and
a synchronizing step of synchronizing the holding operation of the image data by the image memory with the displaying operation of the image data in said display step in accordance with the generated image data sync signal,
wherein the testing apparatus is connected to the controller unit as a virtual engine unit in place of the engine unit, when verification of the operation of the controller unit is executed.

28. A testing apparatus for verifying an operation of a controller unit which outputs output image data and a command signal to an engine unit and serves as an image output apparatus in cooperation with the engine unit for printing the output image data onto a medium by, emulating the engine unit, comprising:

interface means, provided on an extension bus unit of a general-purpose computer, for connecting to a video interface of the controller unit and making data communication with the controller unit;

first obtaining means for obtaining the image data which is outputted for printing by the controller unit via said interface means;

second obtaining means for obtaining the command signal outputted from the controller unit via said interface means;

image sync signal generating means for generating an image data sync signal for verifying an operation of the controller unit in accordance with the command signal obtained by said second obtaining means;

an image memory for holding the image data obtained by said first obtaining means;

image processing means for performing a predetermined image process on the image data held by said image memory;

deciding means for deciding contents of the predetermined image process performed by said image processing means;

display control means for controlling a general computer to display the image data on which the predetermined image process is performed by said image processing means;

system control means for controlling a whole system of said image output apparatus; and synchronizing means for synchronizing the holding operation of the image data by said image memory, the image processing operation by said image processing means, and the displaying operation of the image data by said display control means in accordance with the image data sync signal generated by said image synch signal generating means, wherein said testing apparatus is connected to the controller unit as a virtual engine unit in place of the engine unit, when verification of the operation of the controller unit is executed, and wherein said deciding means comprises discrimination means for discriminating a processing ability of said system control means and for presuming a processing load necessary for the image process.

29. An apparatus according to claim 28, wherein said contents which are decided by said deciding means are designated by the user.

30. An apparatus according to claim 28, wherein, in a case of performing the predetermined image process on the held image data, when time which is necessary for the processed image data to be transferred to said display control means and displayed is longer than an interval of the generated image data sync signal, said discrimination means presumes that the processing load for said system control means is excessive and notifies the user of an error.

31. An apparatus according to claim 28, wherein said deciding means decides the contents of said predetermined image process by using a result of the presumption.

32. A testing method of a testing apparatus for verifying an operation of a controller unit which outputs output image data and a command signal to an engine unit and serves as an image output apparatus in cooperation with the engine unit for printing the output image data on a medium, by emulating the engine unit, comprising:

an interface step of connecting to a video interface of the controller unit, the video interface being provided on an extension bus unit of a general-purpose computer, for connecting to a video interface of the controller unit, and making data communication with the controller unit;

a first obtaining step of obtaining the image data which is outputted for printing by the controller unit in said interface step;

a second obtaining step of obtaining the command signal outputted from the controller unit in said interface step;

an image sync signal generating step of generating an image data sync signal for verifying an operation of the controller unit in accordance with the command signal obtained in said second obtaining step;

a holding step of holding the obtained image data obtained in said first obtaining step in an image memory;

an image processing step of performing a predetermined image process on the image data held by the image memory;

a deciding step of deciding contents of the predetermined image process performed in said image processing step;

a display control step of controlling a general computer to display the image-processed image data on which the predetermined image process is performed;

a system control step of controlling a whole system of the image output apparatus; and a synchronizing step of synchronizing the holding operation of the image data in said holding step, the image processing operation in said image processing step, and the displaying operation of the image data in said display step in accordance with the generated image data sync signal generated in said image sync signal generating step, wherein the testing apparatus is connected to the controller unit as a virtual engine unit in place of the engine unit, when verification of the operation of the controller unit is executed, and wherein said deciding step includes a discriminating step of discriminating a processing ability of system control means that perform said system control step and for presuming a processing load necessary for the image process.

33. A method according to claim 32, wherein the contents which are decided in said deciding step are designated by the user.

34. A method according to claim 32, wherein, in said system control step, in a case of performing the predetermined image process on the held image data, when a time which is necessary for image-processed image data to be transferred and displayed is longer than an interval of the generated image data sync signal, then in said discriminating step it is presumed that the processing load for the system control means is excessive, and the user is notified of an error.

35. A method according to claim 32, wherein, in said deciding step, the contents of said predetermined image process is decided by using a result of the presumption.

36. A testing apparatus according to claim 24, wherein said apparatus sends a pseudo-error response as the virtual engine unit in response to the command signal output by said controller unit.

37. A computer-readable storage medium storing, in executable form, a computer program for executing a control method for a testing apparatus for verifying an operation of a controller unit of an image output apparatus for outputting output image data and a command signal to an engine unit by emulating the engine unit for printing the output image data on a medium, comprising:

a control step of controlling an interface, provided on an extension bus unit of a general-purpose computer, for connecting to a video interface of the controller unit, and making data communication with the controller unit;

a first obtaining step of obtaining the image data which is outputted by the controller unit via the interface;

a second obtaining step of obtaining the command signal which is outputted from the controller unit via the interface;

an image sync signal generating step of generating an image data sync signal to the controller unit in accordance with the command signal;

a holding step of holding the obtained image data in an image memory;

a display control step of controlling a general computer to display the held image data;

a system control step of controlling a whole system of the image output apparatus; and a synchronizing step of synchronizing the holding operation of the image data by the image memory with the displaying operation of the image data in said display step in accordance with the generated image data sync signal, wherein the testing apparatus is connected to the controller unit as a virtual engine unit in place of the engine unit, when verification of the operation of the controller unit is executed.

38. A computer-readable storage medium storing, in executable form, a computer program for executing a testing method for a testing apparatus for verifying an operation of a controller unit which outputs output image data and a command signal to an engine unit and serves as an image output apparatus in cooperation with the engine unit for printing the output image data on a medium, by emulating the engine unit, comprising:

an interface step of connecting to a video interface of the controller unit, the video interface being provided on an extension bus unit of a general-purpose computer, for connecting to a video interface of the controller unit, and making data communication with the controller unit;

a first obtaining step of obtaining the image data which is outputted for printing by the controller unit in said interface step;

a second obtaining step of obtaining the command signal outputted from the controller unit in said interface step;

an image sync signal generating step of generating an image data sync signal for verifying an operation of the controller unit in accordance with the command signal obtained in said second obtaining step;

a holding step of holding the obtained image data obtained in said first obtaining step in an image memory;

an image processing step of performing a predetermined image process on the image data held by the image memory;

a deciding step of deciding contents of the predetermined image process performed in said image processing step;

a display control step of controlling a general computer to display the image-processed image data on which the predetermined image process is performed;

a system control step of controlling a whole system of the image output apparatus; and a synchronizing step of synchronizing the holding operation of the image data in said holding step, the image processing operation in said image processing step, and the displaying operation of the image data in said display step in accordance with the generated image data sync signal generated in said image sync signal generating step, wherein the testing apparatus is connected to the controller unit as a virtual engine unit in place of the engine unit, when verification of the operation of the controller unit is executed, and wherein said deciding step includes a discriminating step of discriminating a processing ability of system control means that perform said system control step and for presuming a processing load necessary for the image process.

39. A testing apparatus for verifying the operation of a controller unit of an image output apparatus for outputting output image data and a command signal to an engine unit by emulating the engine unit for printing the output image data on a medium, comprising:

interface means, provided on an extension bus unit of a general-purpose computer, for connecting to a video interface of the controller unit, and making data communication with the controller unit;

first obtaining means for obtaining the image data which is outputted for printing by the controller unit via said interface means;

second obtaining means for obtaining the command signal outputted by the controller unit via said interface means;

image sync signal generating means for generating an image data sync signal for verifying an operation of the controller unit in accordance with the command signal obtained by said second obtaining means;

an image memory for holding the image data obtained by said first obtaining means;

display control means for controlling a general computer to display the image data held by said image memory;

system control means for controlling a whole system of said image output apparatus; and synchronizing means for synchronizing the holding operation of the image data by said image memory with the displaying operation of the image data by said display control means in accordance with the image data sync signal generated by said image sync signal generating means, wherein said testing apparatus is connected to the controller unit as a virtual engine unit in place of the engine unit, when verification of the operation of the controller unit is executed, wherein said system control means is a part of the general-purpose computer, wherein said interface means, said first obtaining means and said second obtaining means form an interface unit, and wherein the interface unit is provided on the extension bus unit of the general-purpose computer.

40. A testing apparatus for verifying an operation of a controller unit which outputs output image data and a command signal to an engine unit and serves as an image output apparatus in cooperation with the engine unit for printing the output image data onto a medium, by emulating the engine unit, comprising:

interface means, provided on an extension bus unit of a general-purpose computer, for connecting to a video interface of the controller unit and making data communication with the controller unit;

first obtaining means for obtaining the image data which is outputted for printing by the controller unit via said interface means;

second obtaining means for obtaining the command signal outputted from the controller unit via said interface means;

image sync signal generating means for generating an image data sync signal for verifying an operation of the controller unit in accordance with the command signal obtained by said second obtaining means;

an image memory for holding the image data obtained by said first obtaining means;

image processing means for performing a predetermined image process on the image data held by said image memory;

deciding means for deciding contents of the predetermined image process performed by said image processing means;

display control means for controlling a general computer to display the image data on which the predetermined image process is performed by said image processing means;

system control means for controlling a whole system of said image output apparatus; and synchronizing means for synchronizing the holding operation of the image data by said image memory, the image processing operation by said image processing means, and the displaying operation of the image data by said display control means in accordance with the image data sync signal generated by said image synch signal generating means, wherein said testing apparatus is connected to the controller unit as a virtual engine unit in place of the engine unit, when verification of the operation of the controller unit is executed, wherein said deciding means comprises discrimination means for discriminating a processing ability of said system control means and for presuming a processing load necessary for the image process, wherein said system control means is a part of the general-purpose computer, wherein said interface means, said first obtaining means and said second obtaining means form an interface unit, and wherein the interface unit is provided on the extension bus unit of the general-purpose computer.

\* \* \* \* \*